United States Patent
Chen

(10) Patent No.: US 11,126,283 B2
(45) Date of Patent: Sep. 21, 2021

(54) SYSTEMS, METHODS, AND COMPUTER-READABLE MEDIA FOR HANDLING USER INPUT GESTURES ON AN EXTENDED TRACKPAD OF AN ELECTRONIC DEVICE

(71) Applicant: Apple Inc., Cupertino, CA (US)

(72) Inventor: Denis G. Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/432,760

(22) Filed: Jun. 5, 2019

(65) Prior Publication Data
US 2020/0387245 A1  Dec. 10, 2020

(51) Int. Cl.
| | | |
|---|---|---|
| G06F 3/0354 | (2013.01) | |
| G06N 20/00 | (2019.01) | |
| G06F 3/01 | (2006.01) | |
| G06F 3/02 | (2006.01) | |
| G06F 3/041 | (2006.01) | |

(52) U.S. Cl.
CPC .......... *G06F 3/03547* (2013.01); *G06F 3/016* (2013.01); *G06F 3/0202* (2013.01); *G06F 3/0416* (2013.01); *G06N 20/00* (2019.01)

(58) Field of Classification Search
CPC .... G06F 3/016; G06F 3/0202; G06F 3/03547; G06F 3/0416; G06N 20/00
See application file for complete search history.

(56) References Cited

U.S. PATENT DOCUMENTS

| | | | |
|---|---|---|---|
| 7,659,887 B2 | 2/2010 | Larsen et al. | |
| 9,019,207 B1 | 4/2015 | Hamburgen et al. | |
| 9,520,036 B1 * | 12/2016 | Buuck | G08B 6/00 |
| 9,715,307 B1 * | 7/2017 | Barsness | G06F 3/0416 |
| 10,203,767 B2 | 2/2019 | Wackers et al. | |
| 2008/0266143 A1 * | 10/2008 | Ohshita | G06F 3/016 341/22 |
| 2009/0225052 A1 * | 9/2009 | Liu | G06F 3/021 345/173 |
| 2009/0322683 A1 * | 12/2009 | Tsuji | G06F 1/169 345/168 |
| 2010/0265183 A1 * | 10/2010 | Mail | G06F 3/0238 345/168 |
| 2012/0242578 A1 * | 9/2012 | Laubach | G06F 3/0213 345/160 |
| 2012/0256839 A1 * | 10/2012 | Suggs | G06F 3/0202 345/168 |
| 2014/0368455 A1 * | 12/2014 | Croisonnier | G06F 3/0414 345/173 |
| 2016/0098107 A1 * | 4/2016 | Morrell | G06F 3/044 345/173 |
| 2017/0285848 A1 * | 10/2017 | Rosenberg | G06F 3/03543 |
| 2018/0059792 A1 * | 3/2018 | Hajati | G08B 6/00 |
| 2018/0218859 A1 * | 8/2018 | Ligtenberg | H01H 13/85 |

(Continued)

OTHER PUBLICATIONS

International Search Report received for PCT Patent Application No. PCT/US2020/023352, dated Nov. 6, 2020, 5 pages.

(Continued)

*Primary Examiner* — Alexander Eisen
*Assistant Examiner* — Nathaniel P Brittingham
(74) *Attorney, Agent, or Firm* — Kubota & Basol LLP

(57) ABSTRACT

Systems, methods, and computer-readable media for handling user input gestures on an extended trackpad of an electronic device are provided.

21 Claims, 21 Drawing Sheets

(56) References Cited

U.S. PATENT DOCUMENTS

2018/0232093 A1* 8/2018 Roberts-Hoffman ........................ G06F 3/04886
2019/0187792 A1* 6/2019 Basehore ................ G06F 3/016

OTHER PUBLICATIONS

Invitation to Pay Additional Fees received for PCT Patent International Application No. PCT/US2020/023352, dated Jun. 17, 2020, 8 pages.

* cited by examiner

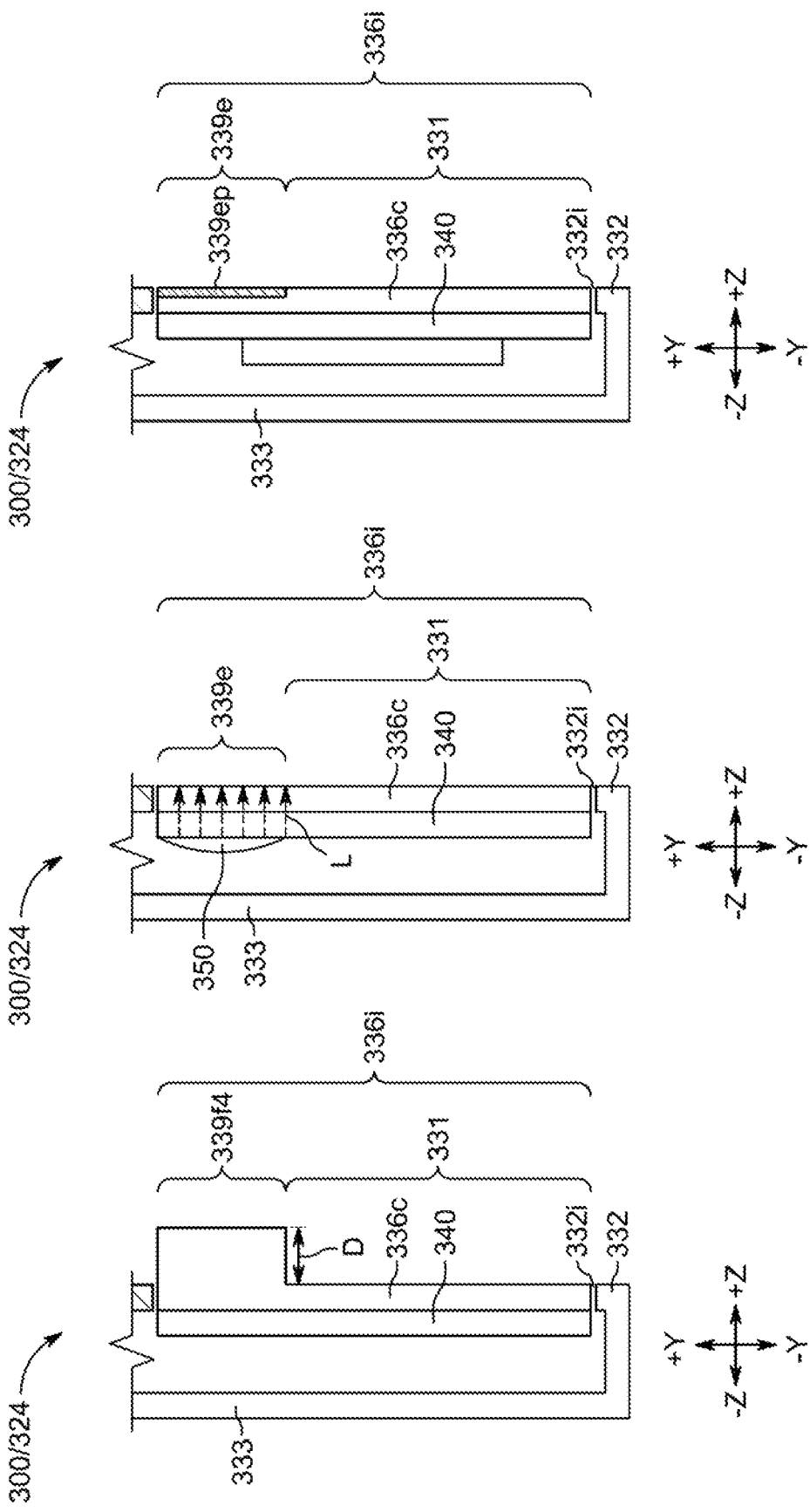

SYSTEMS, METHODS, AND COMPUTER-READABLE MEDIA FOR HANDLING USER INPUT GESTURES ON AN EXTENDED TRACKPAD OF AN ELECTRONIC DEVICE

TECHNICAL FIELD

This can relate to systems, methods, and computer-readable media for handling user input gestures on an extended trackpad of an electronic device.

BACKGROUND

Some electronic device input systems include both a keyboard and a trackpad. However, both often contribute to a dimension of the input system that can limit the portability of the electronic device.

SUMMARY

Systems, methods, and computer-readable media for handling user input gestures on an extended trackpad of an electronic device are provided.

In some embodiments, there is provided a system that may include a trackpad component including a trackpad interface, wherein the trackpad interface provides a first interface section and a second interface section, wherein the first interface section and a first portion of the second interface section are in a shared plane, and a second portion of the second interface section is outside the shared plane. The system may also include a sensor assembly configured to detect user inputs on the trackpad interface.

In other embodiments, there is provided a method for monitoring a system including a trackpad assembly. When a user input event is detected on a first region of an interface of the trackpad assembly, the method may include determining a type of digit of the detected user input event, and, when the determined type of digit is a thumb, carrying out a first functionality, and, when the determined type of digit is a finger, carrying out a second functionality that is different than the first functionality. When a user input event is detected on a second region of the interface of the trackpad assembly that is different than the first region, the method may include carrying out the second functionality.

In yet other embodiments, there is provided a product including a non-transitory computer-readable medium and computer-readable instructions, stored on the computer-readable medium, that, when executed, may be effective to cause a computer to access, for a user input gesture detected on a trackpad, user input sensor category data for each one of a first user input sensor category and a second user input sensor category, determine, using a learning engine and the accessed user input sensor category data, a user digit used to provide the user input gesture detected on the trackpad, and re-train the learning engine using the accessed user input sensor category data and the determined user digit, wherein the first user input sensor category is associated with data indicative of a gesture location on the trackpad, and wherein the second user input sensor category is associated with data indicative of a gesture force on the trackpad.

This Summary is provided to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 3A shows a cross-sectional view of the electronic device of FIG. 3, taken from line IIIA-IIIA of FIG. 3;

FIG. 3B shows a cross-sectional view of the electronic device of FIGS. 3 and 3A, taken from line IIIB-IIIB of FIG. 3;

FIG. 3C shows a cross-sectional view of the electronic device of FIGS. 3-3B, taken from line IIIC-IIIC of FIG. 3;

DETAILED DESCRIPTION

Systems, methods, and computer-readable media may be provided for handling user input gestures on an extended trackpad of an electronic device. The trackpad may be provided with an interface defined by a dedicated trackpad region that may be used for detecting trackpad user input gestures, a dedicated virtual keyboard region that may be used for detecting keyboard user input gestures, and a hybrid region that may be used for detecting either trackpad user input gestures or keyboard user input gestures depending on whether a thumb or a finger is determined to have provided the user input gesture(s). Such a hybrid region may be positioned between two or more dedicated virtual keyboard regions and may abut such a dedicated trackpad region, such that the hybrid region and virtual keyboard regions may combine to replicate and replace at least one row of a particular keyboard design (e.g., the bottom row of keys of a QWERTY keyboard design), and such that the hybrid region and the dedicated trackpad region may combine to provide an extended trackpad region (e.g., the hybrid region and the dedicated trackpad region may be co-planar, while one or more of the virtual keyboard regions may be raised from such a shared plane for tactilely distinguishing the extended trackpad region from the one or more virtual keyboard regions). One or more models may be trained and then used for distinguishing between a thumb user input gesture or a finger user input gesture, such as by using any suitable user input gesture touch and/or location data and/or any suitable user input gesture force data that may be sensed by any suitable sensor assembly of the trackpad.

Figure 1:
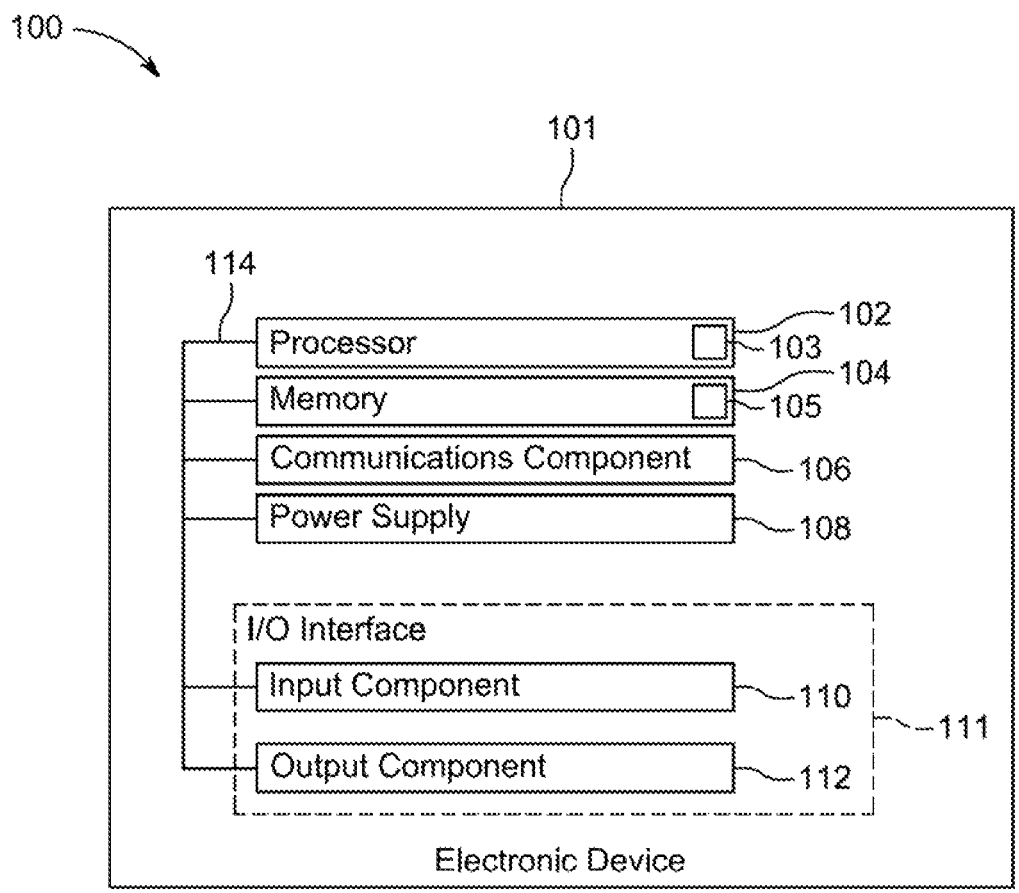
FIG. 1 is a schematic view of an illustrative electronic device with an extended trackpad, in accordance with some embodiments.

FIG. 1 is a schematic view of an illustrative electronic device 100 that may include an extended trackpad. Electronic device 100 can include, but is not limited to, a computer (e.g., a desktop (e.g., an iMac™ available by Apple Inc.), laptop (e.g., a MacBook™ available by Apple Inc.), tablet (e.g., an iPad™ available by Apple Inc.), server, etc.), music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, monitor, television, stereo equipment, set up box, set-top box, boom box, modem, router, printer, or any combination thereof. Electronic device 100 may be any portable, mobile, hand-held, or miniature electronic device that may be configured to handle user input gestures on an extended trackpad wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ available by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include a processor 102, memory 104, a communications component 106, a power supply 108, an input component 110, and an output component 112. Electronic device 100 may also include a bus 114 that may provide one or more wired or wireless communication links or paths for transferring data and/or power to, from, or between various other components of device 100. In some embodiments, one or more components of electronic device 100 may be combined or omitted. Moreover, electronic device 100 may include any other suitable components not combined or included in FIG. 1 and/or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of components that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, pass information (e.g., transportation boarding passes, event tickets, coupons, store cards, financial payment cards, etc.), any suitable user input gesture data of device 100 (e.g., as may be stored in any suitable user input gesture cluster data 105 of memory assembly 104 that may include one or more suitable models (e.g., model 105$m$)), any other suitable data, or any combination thereof.

Communications component 106 may be provided to allow device 100 to communicate with one or more other electronic devices or servers or other remote entities using any suitable communications protocol. For example, communications component 106 may support Wi-Fi™ (e.g., an 802.11 protocol), ZigBee™ (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any suitable cellular communications protocol (e.g., broadband cellular network technologies (e.g., 3G, 4G, 5G, etc.)), any other communications protocol, or any combination thereof. Communications component 106 may also include or may be electrically coupled to any suitable transceiver circuitry that can enable device 100 to be communicatively coupled to another device (e.g., a server, host computer, scanner, accessory device, etc.) with that other device wirelessly, or via a wired connection (e.g., using a connector port). Communications component 106 may be configured to determine a geographical position of electronic device 100 and/or any suitable data that may be associated with that position. For example, communications component 106 may utilize a global positioning system ("GPS") or a regional or site-wide positioning system that may use cell tower positioning technology or Wi-Fi™ technology, or any suitable location-based service or real-time locating system, which may leverage a geo-fence for providing any suitable location-based data to device 100.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device).

One or more input components 110 may be provided to permit a user or device environment to interact or interface with device 100. For example, input component 110 can take a variety of forms, including, but not limited to, a touchpad or trackpad, dial, click wheel, scroll wheel, touch screen, one or more buttons (e.g., a mechanical keyboard), mouse, joy stick, track ball, microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector (e.g., ambient light sensor), biometric sensor (e.g., a fingerprint reader or other feature recognition sensor, which may operate in conjunction with a feature-processing application that may be accessible to electronic device 100 for authenticating a user), line-in connector for data and/or power, and combinations thereof. An input component may be any suitable sensor assembly that may be configured to detect any suitable property or parameter of the device, the environment surrounding the device, people or things interacting with the device (or nearby the device), or the like, and that may take one of various forms, including, but not limited to, any suitable temperature sensor (e.g., thermistor, thermocouple, thermometer, silicon bandgap temperature sensor, bimetal sensor, etc.) for detecting the temperature of a portion of electronic device 100, a performance analyzer for detecting an application characteristic related to the current operation of one or more components of electronic device 100 (e.g., processor 102), one or more single-axis or multi-axis accelerometers, angular rate or inertial sensors (e.g., optical gyroscopes, vibrating gyroscopes, gas rate gyroscopes, or ring gyroscopes), magnetometers (e.g., scalar or vector magnetometers), pressure sensors, force sensors, touch sensors, light sensors (e.g., ambient light sensors ("ALS"), infrared ("IR") light sensors, ultraviolet ("UV") light sensors, etc.), linear velocity sensors, thermal sensors, microphones, proximity sensors, capacitive proximity sensors, acoustic sensors, sonic or sonar sensors, radar sensors, image sensors, video sensors, position and/or orientation sensors (e.g., global positioning system ("GPS") detectors), radio frequency ("RF") detectors, RF or acoustic Doppler detectors, RF triangulation detectors, electrical charge sensors, peripheral device detectors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, event counters, and any combinations thereof. Each input component 110 can be configured to provide one or more dedicated control functions for making selections or issuing commands associated with operating device 100. Any suitable input and/or sensor function of any suitable input component 110 may use network and/or communications systems (e.g., communications component 106) to provide input and/or sensing functionality, such as to receive commands, data, information, content (e.g., audio, video, images, webpages), or the like, from other devices or systems.

As a particular example, an input component 110 may be provided as a touch sensor input component or touch sensor assembly that may be configured to detect various types of touch-based inputs and generate signals or data that may be able to be accessed using processor instructions. Such a touch sensor assembly may use any suitable components and may rely on any suitable phenomena to detect physical inputs. For example, any suitable touch sensor(s) of such a touch sensor assembly may include, but is not limited to, one or more capacitive touch sensors, resistive touch sensors, acoustic wave sensors, or the like. Such a touch sensor assembly may include any suitable components for detecting touch-based inputs and generating signals or data that may be able to be accessed using processor instructions, including electrodes (e.g., electrode layers), physical components (e.g., substrates, spacing layers, structural supports, compressible elements, etc.), processors, circuitry, firmware, and the like. Such a touch sensor assembly may be used in conjunction with various other input mechanisms to detect various types of inputs. For example, such a touch sensor assembly may be used to detect touch inputs (e.g., gestures, multi-touch inputs, taps, etc.), keyboard inputs (e.g., actuations of mechanical or virtual keys), and the like. Such a touch sensor assembly may be integrated with or otherwise configured to detect touch inputs applied to a top case of a computing device. Such a touch sensor assembly may operate in conjunction with any suitable force sensors or force sensor assembly to generate signals or data in response to touch inputs.

As another particular example, an input component 110 may be provided as a force sensor input component or force sensor assembly that may be configured to detect various types of force-based inputs and generate signals or data that are able to be accessed using processor instructions. Such a force sensor assembly may use any suitable components and may rely on any suitable phenomena to detect physical inputs. For example, such a force sensor assembly may include any suitable force sensor(s), including, but not limited to, one or more strain-based sensors, piezoelectric-based sensors, piezoresistive-based sensors, capacitive sensors, resistive sensors, inductive sensors, or the like. Such a force sensor assembly may include any suitable components for detecting force-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. Such a force sensor assembly may be used in conjunction with various other input mechanisms to detect various types of inputs. For example, such a force sensor assembly may be used to detect clicks, presses, or other force inputs applied to a trackpad, a keyboard, a virtual key region, a touch- or force-sensitive input region, or the like, any or all of which may be located on or integrated with a top case of a computing device. Such a force sensor assembly may be configured to determine a magnitude of a force input (e.g., representing an amount of force along a graduated scale, rather than a mere binary "force/no-force" determination). Such a force sensor assembly and/or associated circuitry may compare the determined force magnitude against a threshold value to determine what, if any, action to take in response to the input. Force thresholds may be selected dynamically or otherwise changed based on the location of the input, the digit(s) used by the user for the input, and/or any other suitable factor(s). Such a force sensor assembly may operate in conjunction with any suitable touch sensor assembly to generate signals or data in response to touch- and/or force-based inputs.

Any suitable touch sensor input assembly and/or any suitable force sensor input assembly may be considered part of a sensing system or user sensing system (e.g., which may also be referred to as a touch and force sensing assembly or system). Such a sensing system may include touch sensors alone, force sensors alone, or both touch and force sensors. Moreover, such a sensing system may provide touch sensing functions and/or force sensing functions using any configuration or combination of hardware and/or software components, systems, subsystems, and the like. For example, some force sensing components and associated circuitry may be capable of determining both a location of an input as well as a magnitude of force (e.g., a non-binary measurement) of the input. In such cases, a distinct physical touch-sensing mechanism may be omitted. In some examples, physical mechanisms and/or components may be shared by touch sensors and force sensors of such a sensing system. For example, an electrode layer that may be used to provide a drive signal for a capacitive force sensor may also be used to provide the drive signal of a capacitive touch sensor. In some examples, a device may include functionally and/or physically distinct touch sensors and force sensors to provide a desired sensing functionality.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, line-out connectors for data and/or power, visual displays (e.g., for transmitting data via visible light and/or via invisible light), infrared ports, flashes (e.g., light sources for providing artificial light for illuminating an environment of the device), tactile/haptic outputs (e.g., rumblers, vibrators, etc.), and combinations thereof. One or more suitable haptic output components may be provided to include one or more of a variety of haptic technologies such as, but not necessarily limited to, rotational haptic devices, linear actuators, piezoelectric devices, vibration elements, stiffness modulators, and so on. Generally, a haptic output component may be configured to provide punctuated and distinct feedback to a user of the device. More particularly, a haptic output component may be adapted to produce a knock or tap sensation and/or a vibration sensation. Such haptic outputs may be provided in response to detection of touch- and/or force-based inputs, such as detection of key actuations on a virtual or mechanical keyboard, detection of force inputs on a trackpad region, or the like. Haptic outputs may be local or global, as described herein, and may be imparted to a user through various physical components, such as a top case of a notebook computer, as described herein.

It should be noted that one or more input components and one or more output components may sometimes be referred to collectively herein as an input/output ("I/O") component or I/O interface (e.g., input component 110 and output component 112 as I/O component or I/O interface). For example, input component 110 and output component 112 may sometimes be a single I/O interface 111, such as a touch screen that may receive input information through a user's touch of a display screen and that may also provide visual information to a user via that same display screen, and/or such as a haptic user interface that may receive touch and/or force input information through a user's interaction with a user interface (e.g., trackpad region and/or keyboard region) and that may also emit light (e.g., illumination and/or graphical information to a user) and/or haptic feedback via that same user interface.

Processor 102 of electronic device 100 may include any suitable processing circuitry that may be operative to control the operations and performance of one or more components of electronic device 100. For example, processor 102 may receive input signals from one or more input components 110 and/or drive output signals through one or more output components 112. As shown in FIG. 1, processor 102 may be used to run one or more applications, such as an application 103. Application 103 may include, but is not limited to, one or more operating system applications, firmware applications, media playback applications, media editing applications, pass applications, calendar applications, state determination applications, biometric feature-processing applications, compass applications, health applications, mindfulness applications, sleep applications, thermometer applications, weather applications, thermal management applications, video game applications, comfort applications, device and/or user activity applications, or any other suitable applications. For example, processor 102 may load application 103 as a user interface program to determine how instructions or data received via an input component 110 and/or any other component of device 100 (e.g., communications component 106 and/or power supply 108) may manipulate the one or more ways in which information may be stored at memory 104 and/or provided to a user or the ambient environment via an output component 112 and/or to a remote device via a communications component 106. Application 103 may be accessed by processor 102 from any suitable source, such as from memory 104 (e.g., via bus 114) or from another device or server or any other suitable remote source via communications component 106. Processor assembly 102 may load any suitable application 103 as a background application program or a user-detectable application program in conjunction with any suitable user input gesture cluster data 105 or any other suitable data to determine how any suitable input assembly data received via any suitable input assembly 110 and/or any other suitable data received via any other suitable assembly of device 100 may be used to determine any suitable user input sensor states or events or gestures (e.g., sensor state data 522 of FIG. 5) that may be used to control or manipulate at least one functionality of device 100 (e.g., a performance or mode of device 100 that may be altered in a particular one of various ways (e.g., particular adjustments may be made by an output assembly and/or the like)).

Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes. As described herein, the term "processor" is meant to encompass a single processor or processing unit, multiple processors, multiple processing units, or any other suitably configured computing element or elements.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing). To the extent that multiple functionalities, operations, and structures are disclosed as being part of, incorporated into, or performed by device 100, it should be understood that various embodiments may omit any or all such described functionalities, operations, and structures. Thus, different embodiments of device 100 may have some, none, or all of the various capabilities, apparatuses, physical features, modes, and operating parameters discussed herein.

An integrated interface system may be provided with one or more sensors, including touch sensors and/or force sensors, that can detect various types of inputs applied to various regions of an input surface or input surfaces of an input interface of a device. In some instances, the touch and/or force sensors may be formed into a unified structure that may be configured to detect touch inputs applied to a non-keyboard region as well as key inputs applied to a keyboard region, which may include mechanical keys, virtual keys, and/or a combination of mechanical keys and virtual keys. For example, a device housing's top case may provide a keyboard region configured to detect keyboard gestures, such as key presses or the like at one or more keys (e.g., mechanical and/or virtual keys) of the keyboard region. Additionally or alternatively, a device housing's top case may provide a trackpad region configured to detect trackpad gestures, such as trackpad clicks and/or trackpad swipes and/or trackpad drag events and/or the like along a surface of the trackpad region. Additionally or alternatively, a section of a trackpad region may be configured to detect not only trackpad gestures but also keyboard gestures. For example, such a section of a trackpad region may be configured to detect keyboard gestures for a first type of user input digit (e.g., a thumb of a user) interacting with the section of the trackpad region and to detect trackpad gestures for a second type of user input digit (e.g., a finger of a user) interacting with the section of the trackpad region, allowing the section of the trackpad region to function as either a keyboard or a trackpad. Additionally or alternatively, in some embodiments, an integrated interface system may also be used to detect trackpad gestures applied to keycaps of a mechanical keyboard region, allowing the keycaps and keyboard region to function as a trackpad.

An integrated interface system may also provide various types of output functionality, including visual outputs, haptic outputs, and the like. For example, images of affordances (e.g., keys, keyboards, buttons, sliders, dials, etc.) may be displayed on a housing's top case (e.g., with a display device) to indicate where a touch or force input may be provided. As another example, a top case of an integrated interface system may be configured to move or oscillate to provide tactile or haptic outputs in response to the detection of touch or force inputs. An integrated interface system may thus provide comprehensive input and output functionality via an integrated input/output surface.

A component that may define an input surface of an integrated interface system may be formed from a continuous and/or seamless sheet of a dielectric material, such as glass, plastic, or ceramic (e.g., it may be a single glass member). The sheet may have properties that may enable diverse input and output functions. For example, the sheet may be strong and may have a high resistance to scratching, and may provide a surface finish having a superior appearance and/or tactile feel as compared with other materials or components. The sheet may also be a dielectric and/or substantially non-conductive, thereby allowing touch and force inputs to be detected through the sheet, and/or thereby allowing electromagnetic waves and/or fields (e.g., radio frequency signals, inductive power, inductive signals, and other wireless communications or electromagnetic energy transfer) to pass through without substantial attenuation. The sheet may be continuous or seamless, which may help prevent the ingress of liquid or other foreign debris. The sheet may also be light transmissive to allow images or light to be visible therethrough. As used herein, light transmissive may be used to refer to something that is transparent or translucent, or otherwise allows light to propagate therethrough. In some cases, transparent materials or components may introduce some diffusion, lensing effects, distortions, or the like (e.g., due to surface textures) while still allowing objects or images to be seen through the materials or components, and such deviations are understood to be within the scope of the meaning of transparent. Also, materials that are transparent may be coated, painted, or otherwise treated to produce a non-transparent (e.g., opaque) component. In such cases the material may still be referred to as transparent, even though the material may be part of an opaque component. Translucent components may be formed by producing a textured or frosted surface on an otherwise transparent material (e.g., clear glass). Translucent materials may also be used, such as translucent polymers, translucent ceramics, or the like.

Figure 1A:
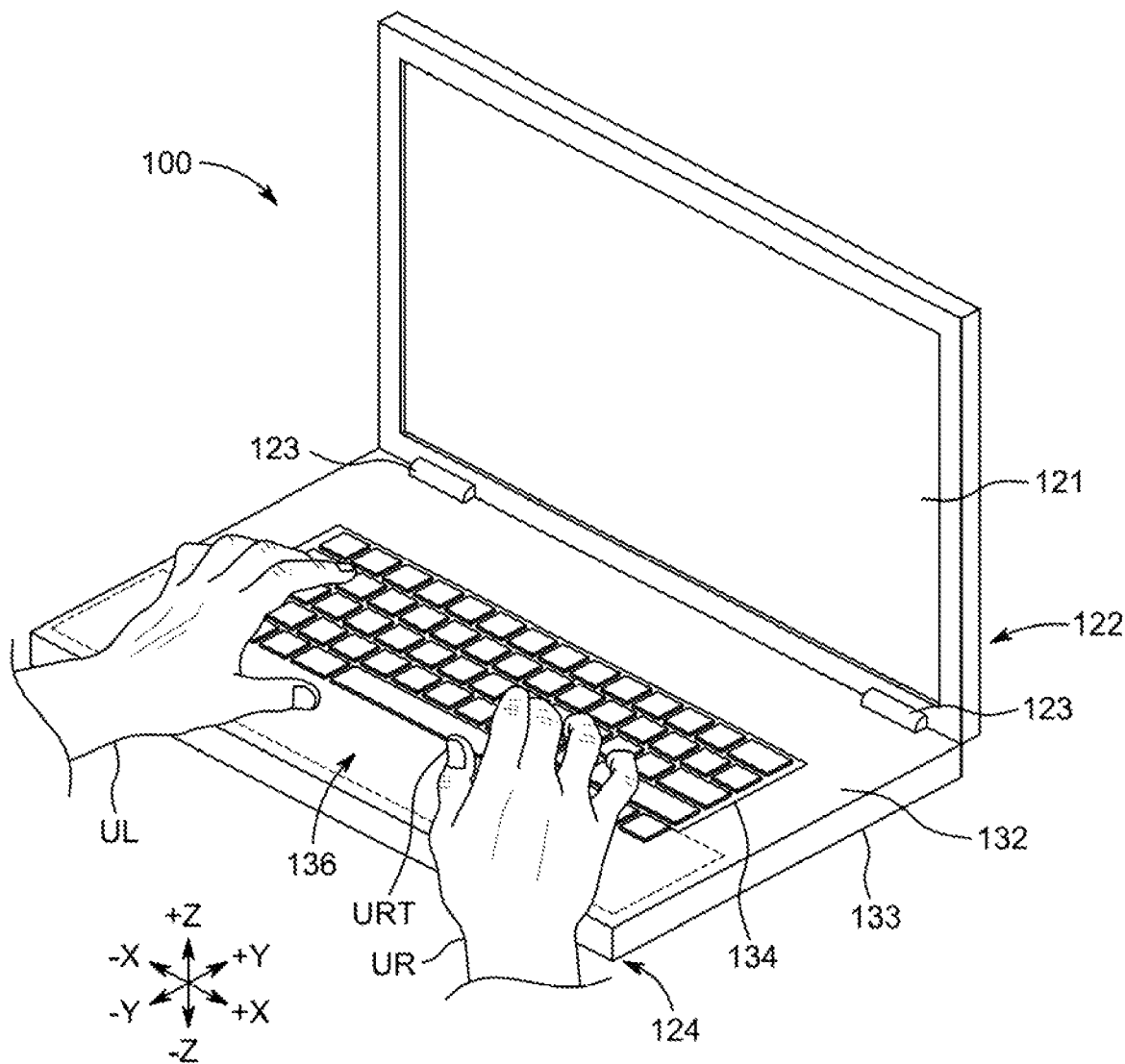
FIGS. 1A and 1B are perspective views of an illustrative embodiment of the electronic device of FIG. 1 in use by a user, in accordance with some embodiments.

For example, as shown in FIGS. 1A and B, a particular implementation of electronic device 100 may be provided as or may resemble a portable computer, also known as a notebook or laptop computer, that may include a display portion 122 and a base portion 124 that may be flexibly or pivotally coupled to display portion 122 (e.g., so that display portion 122 may be able to rotate, pivot, flex, articulate, or otherwise move relative to base portion 124). Display portion 122 may include a display 121 (e.g., a display output component 112), which may also be referred to as a primary display, that may provide a primary interface of conveying visual information to the user, such as by displaying graphical user interfaces. Base portion 124 may be configured to receive various types of user inputs, such as keyboard inputs (e.g., typing), touch inputs (e.g., gestures, multi-touch inputs, swipes, taps, etc.), and the like. Base portion 124 may also provide outputs for conveying information to a user, such as with indicator lights, haptic output devices, displays mounted in base portion 124, or the like. In some cases, providing various types of input and output via base portion 124 may be facilitated or enabled by using a continuous top surface on base portion 124. In particular, base portion 124 of device 100 may include a top case 132 that may define a portion of an enclosure (e.g., housing 101) and also may form or be part of an integrated interface system.

Figure 1B:
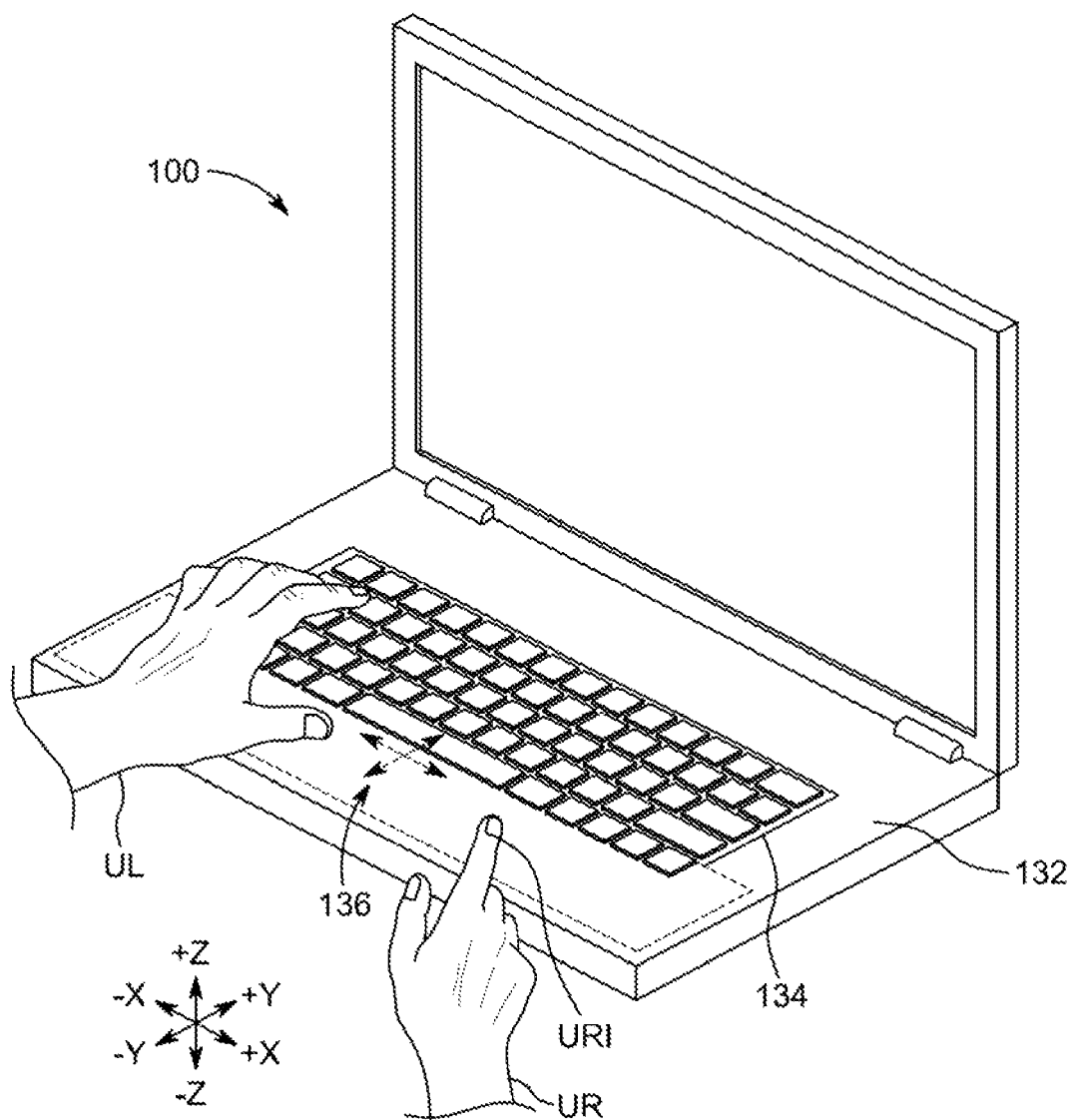

Display portion 122 and base portion 124 may be coupled to one another such that they can be positioned in an open position (e.g., as shown in FIGS. 1A and 1B), a closed position, or potentially somewhere in between. In the open position, a user may be able to provide inputs to device 100 via base portion 124 while simultaneously viewing information on display portion 122. In the closed position, display portion 122 and base portion 124 may be collapsed against one another. More particularly, display portion 122 and base portion 124 may be hinged together (e.g., via a pivot mechanism or hinge 123) to form a clamshell device that can be moved between an open and a closed configuration.

Information and/or data may be transferred between display portion 122 and base portion 124. For example, display data, such as data or signals that may cause display portion 122 (e.g., display 121) to display images, user interfaces, application data, or the like, may be sent to display portion 122 from base portion 124. Similarly, input data may be sent from display portion 122 to base portion 124. Input data may include data relating to touch inputs applied to a touchscreen within display portion 122, sensor data (e.g., from sensors in display portion 122, such as light sensors, accelerometers, etc.), camera data (e.g., from a camera in display portion 122), or the like. Device 100 may include any appropriate communication system for transferring data between display portion 122 and base portion 124, such as wired or wireless communications systems (e.g., any suitable bus 114 and/or communications component(s) 106). Wireless communications systems may include a first transmitter/receiver in display portion 122, and a second transmitter/receiver in base portion 124 that may communicate with the first transmitter/receiver. The first and second transmitter/receiver may communicate in any suitable way and use any suitable wireless frequency or frequencies (e.g., 2.4 GHz, 60 GHz, etc.), communication protocol(s), and/or the like. The first and second transmitter/receiver may also communicate via an optical communication link.

Power may also be transferred between display portion 122 and base portion 124. For example, either or both of display portion 122 and base portion 124 may include batteries or other power sources. Power can be sent from one portion to another portion as needed based on the power demands and power supplies of each portion. For example, display portion 122 and base portion 124 may include batteries as well as components that require power. Power may be distributed from any battery to any circuit or component that requires power, regardless of the location of the battery or the circuit or component. Power may be transferred between display portion 122 and base portion 124 using any suitable components and techniques. For example, a wired or physical power connection may couple display portion 122 to base portion 124. As another example, power may be transferred wirelessly, such as via inductive or capacitive power transfer systems.

Base portion 124 may include a top case 132 that may define or be part of an integrated interface system of device 100. For example, top case 132 may define a top, exterior surface of base portion 124, and may be configured to receive touch inputs, force inputs, keyboard inputs, and the like. In some cases, the entire top surface or substantially all of the top surface of top case 132 may be touch and/or force sensitive, and may detect touch inputs substantially anywhere along its top surface, including in a keyboard region as well as surrounding regions. In cases where the entire top case 132 is touch and force sensitive, numerous types of inputs may be enabled via top case 132. For example, touch inputs including cursor-control gestures may be applied anywhere on the top case, including on the keys of a virtual or mechanical keyboard. As another example, the addition of force sensing across a keyboard region as well as non-keyboard regions may facilitate the detection of typing inputs when multiple fingers are resting on a virtual keyboard, as the force sensing systems may allow the device to differentiate between a finger resting on a key versus a finger actually tapping or pressing on a key.

In addition to receiving or detecting inputs, top case 132 may be configured to provide outputs to a user. For example, top case 132 may include or be integrated with displays, light sources, haptic actuators, or the like, that provide outputs that may be detectable via top case 132 (e.g., at any location or substantially any location along a top surface of top case 132). More particularly, a display may be configured to produce an image on top case 132, and a haptic actuator may be configured to move top case 132 in a manner that may be detectable by a user in contact with top case 132. The composition and configuration of top case 132 may facilitate and integrate these and/or other input and output functions. For example, a continuous, non-conductive top case 132 (e.g., formed from a dielectric such as glass, plastic, ceramic, composites, or combinations of materials) may allow inputs to be detected through top case 132 while also providing an effective platform for haptic and visual outputs.

Top case 132 may define or include any suitable input regions, such as a keyboard region 134 and a touch-input region or trackpad input region 136. Keyboard region 134 may correspond to or include a virtual keyboard and/or a mechanical keyboard.

Top case 132 may define a continuous top surface of base portion 124, which may be the top exterior surface of base portion 124. A continuous top surface (and a continuous top case more generally) may refer to a surface or member that has no seams, openings, through-holes, or other discontinuities. In the context of top case 132, a continuous top case or continuous top surface may therefore lack seams, openings, through-holes, or other discontinuities in the portion of top case 132 that may form an exterior top surface of base portion 124. More particularly, top case 132 may lack openings for keys, keyboards, trackpads, buttons, or the like. Top case 132 may extend substantially to the outer edges of base portion 124. Accordingly, top case 132 may prevent or reduce the possibility of liquid, dust, dirt, or other contaminants or debris from entering base portion 124 through the top surface of top case 132. Also, such a continuous surface may provide a desirable aesthetic and a touch sensitive, haptic, and visual output surface that can utilize the entire exposed top surface of top case 132.

Top case 132 may be formed from or include a light-transmissive material, such as glass, plastic, or light-transmissive ceramics. In some cases, top case 132 may be a single member, such as a single glass member, a single plastic member, or a single member formed from or including any other suitable material. In other cases, top case 132 may be formed from multiple members, either of the same material or different materials, that may be bonded, adhered, joined, or otherwise coupled together to define top case 132.

In some cases, all or some of top case 132 may be masked to form opaque regions. The masking may be formed using any suitable technique, such as depositing an ink, dye, film, or otherwise positioning an opaque material below top case 132 (and above any other components or layers that may be intended to remain hidden or occluded). The masking or other opaque material or layer may be any desired color. Indeed, because top case 132 may be light-transmissive (e.g., transparent), there may be fewer limitations on the achievable colors than with conventional devices. In some cases, images, photographs, paintings, or other graphic content may be visible through a light-transmissive top case 132.

Touch-input region or trackpad input region 136 may be configured to detect touch- and/or force-based inputs, and may be or may include any portion of top case 132, including substantially the entire top case 132, including keyboard region 134 (e.g., with mechanical keys, virtual keys, or a combination of mechanical keys and virtual keys), a specific trackpad region of or through top case 132, optional sidewalls of the top case, or any other portion of top case 132. In some cases, substantially the entirety of top case 132, from edge to edge, may define a touch-sensitive input region. In this way, touch or trackpad inputs, such as clicks, taps, gestures (e.g., swiping, pinching, etc.), and multi-touch inputs, may be detected on any portion of top case 132, including, in some embodiments, within keyboard region 134. Moreover, even where keyboard region 134 includes mechanical key mechanisms, touch-input region 136 may detect touch inputs (e.g., gestures) that are applied to the keycaps and not to the top case 132 directly. As used herein, a "key" may refer to a mechanical key, a virtual key (e.g., a key displayed by an underlying display), a key region (e.g., defined by a mask layer on a top case), or any other suitable type of key described herein, as well as any associated mechanisms, keycaps, or support structures.

Device 100, and in particular top case 132, may also include or define output regions, such as visual-output regions and/or haptic-output regions and/or audio-output regions and/or the like. Haptic-output regions may include regions of top case 132 that may move or can otherwise induce tactile sensations in a user. Visual-output regions may include regions in which visual outputs may be produced, such as regions that may be associated with lights or displays (e.g., to display virtual and/or dynamic keys). Thus, device 100 may include a top case that may define an integrated interface system, which may provide various input and output functions, including keyboard inputs, touch inputs, visual outputs, and/or haptic outputs.

Base portion 124 may include top case 132 as well as a bottom case 133, which together may define an interior volume of base portion 124. Base portion 124 may also include one or more various types of components positioned at least partially within such an interior volume, such as processors, memory devices, circuit boards, input/output devices, haptic actuators, wired and/or wireless communication devices, communication ports, disk drives, and/or the like. Bottom case 133 may include a bottom member and one or more sidewalls. In some cases, bottom case 133 may include one, two, three, or four sidewalls. Of course, other configurations of sidewalls are also possible. Bottom case 133 may be formed from or include any suitable material, such as metal (e.g., steel, aluminum, titanium), glass, plastic, ceramic, composite, or any other suitable other material or combination of these or other materials. In some cases, bottom case 133 may be a single (e.g., monolithic) component or member, such as a single sheet of glass, metal, plastic, or the like. For example, bottom case 133 may be a single component formed from a single piece of metal, and may be formed by stamping, drawing, machining, hydroforming, molding, or any other suitable process. Where bottom case 133 may be a single component, its bottom member and sidewall(s) may be an integral structure (e.g., a monolithic component). Top case 132 may be coupled to bottom case 133 in any suitable way. Various examples of the coupling between the top case 112 and the bottom case 110, as well as various configurations and shapes of the top and bottom cases 112, 110 are described herein. Similarly, example configurations of the display 204 and the display housing (and techniques for joining them) are described herein.

Any mechanical keys of keyboard region 134 may include any suitable mechanisms and components for receiving inputs, providing a tactile response and/or motion in response to the inputs, and/or for allowing device 100 to detect key actuations. One, some, or each mechanical key may be coupled to top case 132 in any suitable way, such as with adhesive, mechanical clips, fasteners, or the like. Any virtual keys of keyboard region 134 may include or be associated with one or more displays that may be positioned under top case 132 (e.g., within an interior volume of base portion 124) and/or may include or be associated with one or more touch sensors that may detect touch inputs applied to the virtual key. One, some, or each virtual key may be configured to dynamically display different buttons, keys, affordances, images, or the like, based on different operating modes of device 100. For example, virtual keys may display a first set of affordances (and optionally other information) when a user of device 100 is interacting with a first application, and a second set of affordances (and optionally other information) when the user is interacting with a second application. When an input, such as a touch or force input, is detected at a position on a virtual key, device 100 may take a particular action based on the affordance that is displayed on that position at the time the input was detected. Thus, if a virtual key is displaying a function key (e.g., one of the F1-F12 keys), an input on a particular function key may cause device 100 to take actions associated with that particular function key, but if the virtual key is displaying a slider for controlling a volume of device 100, an input on the slider (e.g., a swipe or gesture input) may result in device 100 adjusting its output volume.

As mentioned, a top surface of top case 132 may be substantially flat (e.g., planar), and, in particular, top case 132 may be substantially featureless, lacking substantial recesses, openings, or areas of high and/or low relief. For example, top case 132 may be a substantially smooth, planar sheet of glass or ceramic. In such cases, the mechanical keys of a mechanical keyboard portion or entirety of keyboard region 134 may extend above the top surface of top case 132, which may interfere with display portion 122 when device 100 is in a closed configuration. In such cases, top case 132 (e.g., the entire top case) may be recessed relative to a rim or edge of bottom case 133, such that a gap may exist between top case 132 and display portion 122 when device 100 is closed. Such a mechanical keyboard may have a size or height to fit inside the gap without contacting display portion 122.

Where a transparent glass or ceramic (or other material) is used, top case 132 may be suited for use with keyboards that have both mechanical keys and virtual keys, as the transparency may allow top case 132 to act as a cover (and input surface) for a display of a virtual keyboard. An entirety of top case 132 may be a touch-input region (e.g., both keyboard and non-keyboard regions of the case (e.g., keyboard region 134 and trackpad region 136) may be a touch-input region). A trackpad input region may all be part of or define at least a portion or the entirety of a touch-input region.

Key input functionality may be provided by an integrated interface system in various ways. For example, an integrated interface system may include or be configured to detect inputs from a keyboard having mechanical keys. Alternatively or additionally, an integrated interface system may include or be configured to detect inputs from a virtual keyboard displayed on a top case of an integrated interface system. More particularly, an integrated interface system may include a display that produces images of keys or other affordances on an otherwise featureless (e.g., flat) surface, such as the top case of an integrated interface system. A virtual keyboard may also or instead include static key regions (e.g., defined by paint, masks, or other visual indicia) on a featureless surface of a top case. Also, various combinations of these types of keyboards may be used in a single integrated interface system. For example, one portion of a keyboard for an integrated interface system may include mechanical keys, while another portion may include a virtual keyboard or one or more virtual keys, buttons, or other affordances. Top cases of integrated interface systems, such as continuous top cases formed of glass or ceramic materials, may be configured to accommodate any one or any combination of these types of keyboards.

Figure 2A:
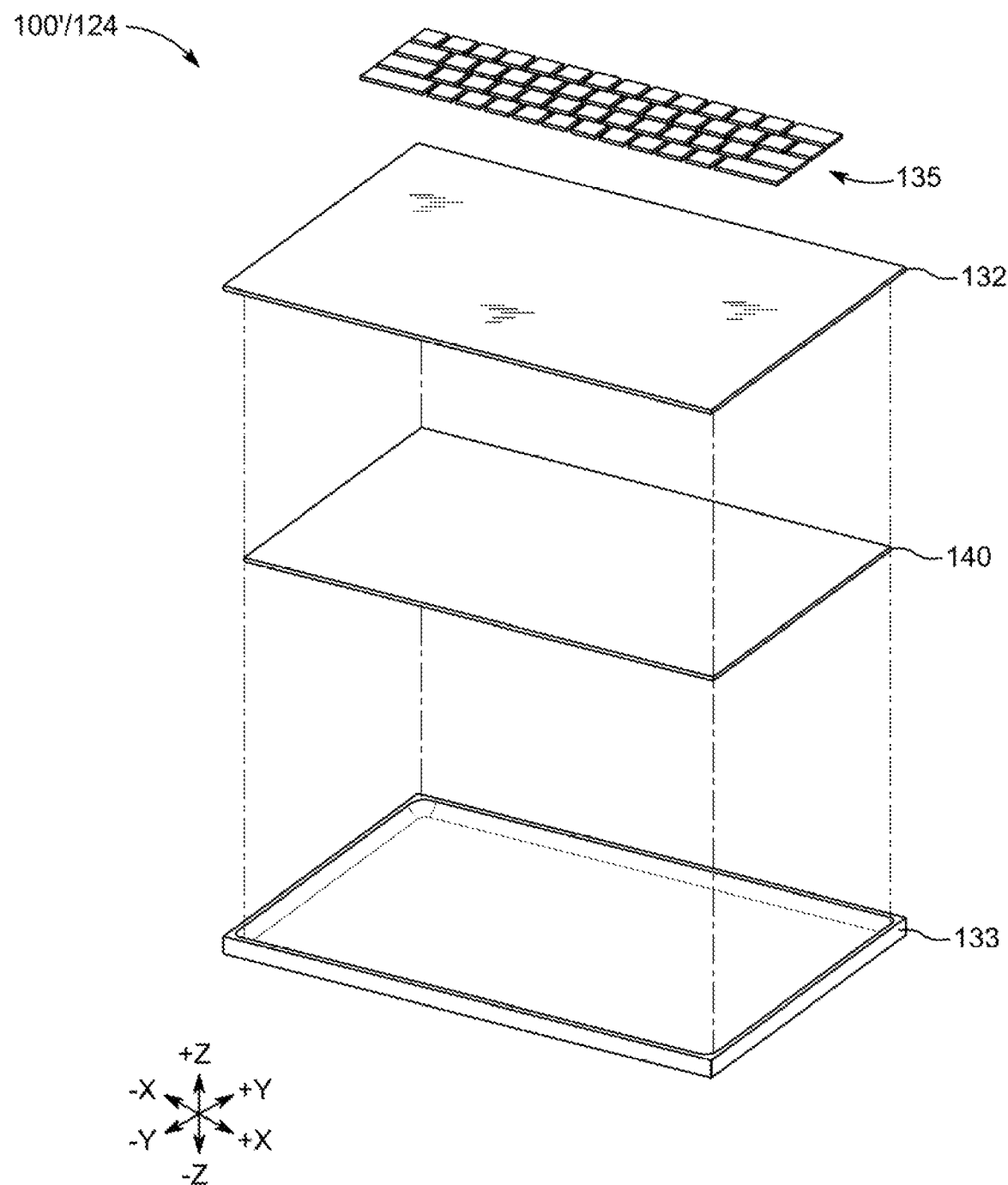
FIGS. 2A-2C are exploded views of various portions of various electronic devices, similar to the electronic device of FIGS. 1-1B, in accordance with some embodiments.

FIG. 2A is an exploded view of an electronic device 100' that may be similar to device 100 according to some embodiments. Base portion 124 of device 100' may include a mechanical keyboard 135 of keyboard region 134, top case 132, bottom case 133, and a touch and/or force sensor assembly 140 below top case 132, where touch and/or force sensor assembly 140 may be disposed within an interior volume defined by top case 132 and bottom case 133.

Mechanical keyboard 135 may include multiple discrete keys and/or key mechanisms, or it may be a pre-assembled structure that includes the keys held captive to a base plate or otherwise coupled together. The discrete keys or the pre-assembled key structure may be coupled directly to a top surface of top case 132.

Touch and/or force sensor assembly 140 may include various touch and/or force sensing components, such as capacitive sensing elements, resistive sensing elements, and/or the like. Touch and/or force sensor assembly 140 may be configured to sense inputs applied to top case 132, and may sense selections (e.g., presses) of keys of mechanical keyboard 135, selections of affordances on any virtual key region of keyboard region 134, and/or touch inputs (e.g., clicks, taps, gestures, multi-touch inputs, etc.) applied to other areas of top case 132 (e.g., to a touch-input region or trackpad input region). Touch and/or force sensor assembly 140 may be configured to detect inputs without regard to a force component, such as detecting only a location of one or more touch inputs. Touch and/or force sensor assembly 140 may also or instead be configured to detect a force component of one or more touch inputs, such as by determining an amount of deflection of top case 132 caused by a touch input. For simplicity, touch and/or force sensor assembly 140 may be referred to herein simply as touch sensors, force sensors, or TF sensors. It will be understood that these sensors may provide touch input functionality, force input functionality, or both.

With respect to detecting selections of mechanical keys of mechanical keyboard 135, top case 132 of device 100' may be a continuous sheet of material, and as such may lack openings or holes allowing the keys to mechanically couple to components within base portion 124. As a result, it may not be possible to use traditional key mechanisms for detecting key presses, because there may be no direct access to the electronic components of device 100 through top case 132 of device 100'. Accordingly, touch and/or force sensor assembly 140 of device 100' may use the same sensing technology (e.g., capacitive sensing) that may be used to detect touch inputs in non-keyboard regions (e.g., a trackpad region) to determine when a key has been selected. Where top case 132 is glass or ceramic or another dielectric material, the dielectric properties of top case 132 may permit the touch and/or force sensor assembly 140 to detect the presence and/or location of fingers on mechanical keyboard 135 as well as the non-keyboard regions of base portion 124 of device 100'.

Sensor assembly 140 may be substantially planar, or may include a substantially planar subassembly, that may be adjacent (or otherwise proximate) top case 132. Such a planar shape of sensor assembly 140 may complement the planar surface of top case 132. In cases where top case 132 has ribs, frames, or other reinforcements on the interior-facing surface of top case 132, sensor assembly 140 may have openings, discontinuities, recesses, or other features that accommodate the reinforcements while allowing substantially planar portions of sensor assembly 140 to be adjacent corresponding planar portions of top case 132.

Figure 2B:
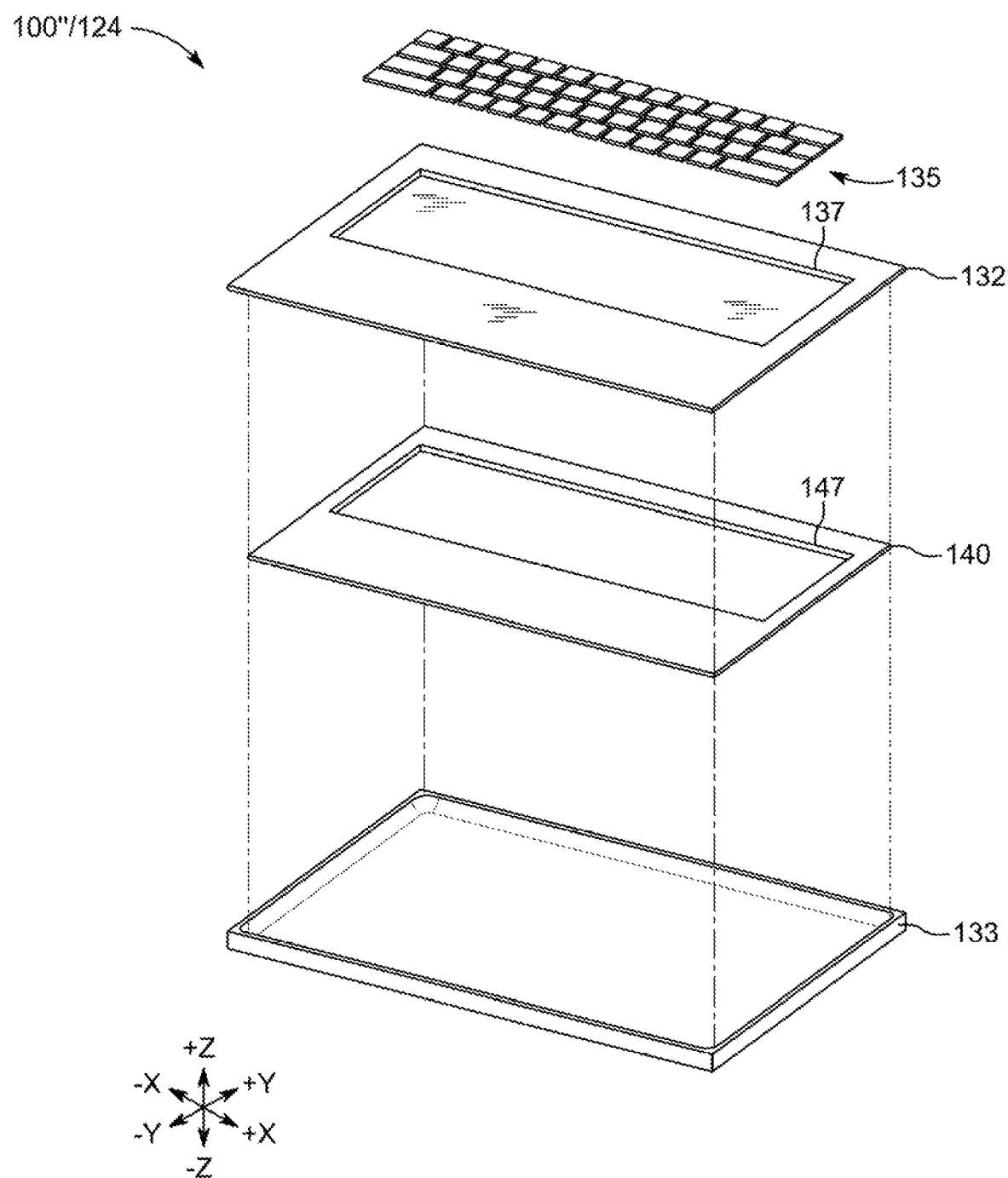

FIG. 2B is an exploded view of an electronic device 100" that may be similar to device 100 according to some embodiments. Such a device 100" may include base portion 124 that may include bottom case 133 and top case 132. Device 100" may also include a mechanical keyboard 135 of keyboard region 134. Top case 132 of device 100" may define a recessed region 137 in which mechanical keyboard 135 may be positioned. Recessed region 137 may have any suitable depth. For example, recessed region 137 may be between about 0.5 millimeters and 5.0 millimeters deep. In some cases, recessed region 137 has a depth that results in the tops of the keycaps of the keys of mechanical keyboard 135 being substantially flush with or set slightly below non-recessed or surrounding areas of the keyboard. In such cases, the keycaps may not contact the display portion of device 100" when the display portion is in a closed position relative to base portion 124 of device 100" (e.g., when device 100" is closed).

Recessed region 137 may have any suitable dimensions. As shown in FIG. 2B, recessed region 137 may define an area that is only slightly larger than mechanical keyboard 135. However, recessed region 137 may be larger. For example, recessed region 137 may provide more clearance (e.g., a larger gap) between mechanical keyboard 135 and the surrounding non-recessed regions of top case 132 (e.g., along the outer perimeter of mechanical keyboard 135). Moreover, recessed region 137 may be deeper or shallower than is shown. Recessed region 137 is also shown as defining a substantially planar recessed surface. The surfaces of other recessed regions may not be planar, and may define additional recesses, protrusions, features, or the like.

FIG. 2B also shows a sensor assembly 140 below top case 132 (e.g., disposed within an interior volume that may be defined by top case 132 and bottom case 133). Mechanical keyboard 135 may include key mechanisms that may be coupled directly to top case 132 of device 100", or it may be a keyboard assembly such as the keyboard assembly described with respect to FIG. 2C. A force sensing system may also be integrated with the base portion to facilitate detection of key presses, clicks, or the like, applied to the keyboard and/or non-keyboard regions of the base portion.

Sensor assembly 140 of device 100" may define a recessed region 147 that may substantially correspond to and/or conform to recessed region 137 in top case 132 of device 100". Accordingly, sensor assembly 140 may conform to the shape of top case 132, allowing sensor assembly 140 to be in close proximity with (e.g., in direct contact with) an underside of top case 132. By maintaining the surfaces of sensor assembly 140 in close proximity with both the keyboard and the non-keyboard regions of top case 132, touch and/or force sensing can be provided across substantially all of top case 132. More particularly, the sensor assembly 140 can detect inputs in the keyboard region (e.g., key presses, gestures on or over the keys, etc.) as well as outside the keyboard region (e.g., clicks, taps, gestures, and other touch inputs applied to a palm rest region or any other touch or force sensitive region). A force sensing system may also be integrated with base portion 124 to facilitate detection of key presses, clicks, or the like, applied to the keyboard and/or non-keyboard regions of the base portion. In other embodiments, a force and/or touch sensor assembly may not be positioned under the entirety or some or any of a mechanical keyboard but may only be positioned under a touch-input region or trackpad input region.

Figure 2C:
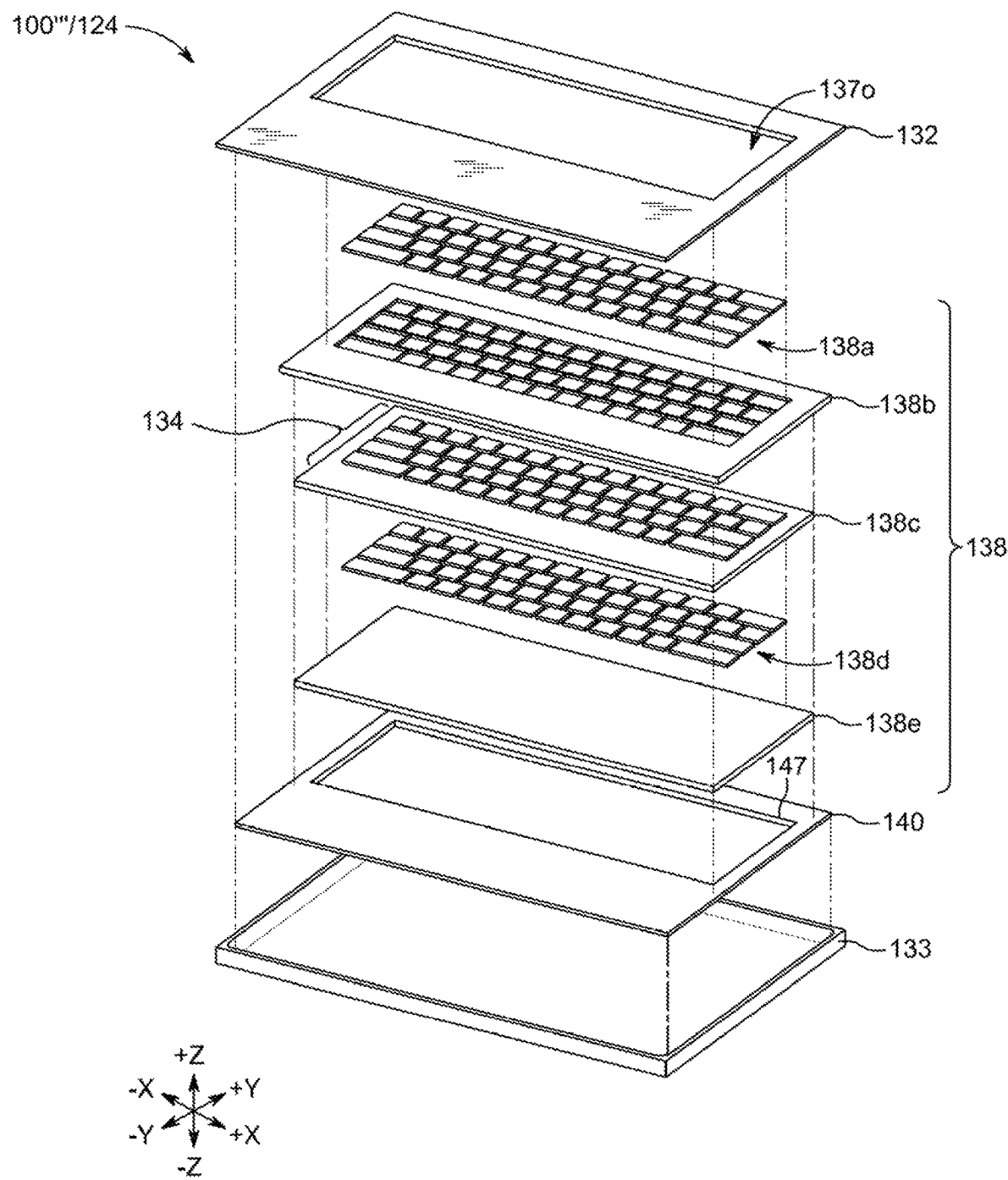

FIG. 2C is an exploded view of a base portion 124 of a device 100''' that may be similar to device 100 according to some embodiments. In device 100''', a keyboard assembly 138 of a keyboard region may be positioned in or accessible through an opening 137o (e.g., a keyboard opening) in top case 132 that may include an opening 137o rather than recess 137. Opening 137o may be provided in top case 132 to accommodate and allow access to keyboard assembly 138. Base portion 124 may also include bottom case 133 and sensor assembly 140 below top case 132 (e.g., disposed within an interior volume defined by top case 132 and bottom case 133). Sensor assembly 140 may include recess 147 to accommodate keyboard assembly 138. Alternatively, sensor assembly 140 may omit recess 147 (e.g., it may be substantially flat or planar). Keyboard assembly 138 may be positioned adjacent rather than on top of any sensor assembly 140. Sensor assembly 140 may detect touch and/or force inputs applied anywhere to top case 132, including touch inputs applied to keyboard assembly 138 and actuations of the keys of keyboard assembly 138. A force sensing system may also be integrated with the base portion to facilitate detection of key presses, clicks, or the like, applied to the keyboard and/or non-keyboard regions of the base portion.

Keyboard assembly 138 may include key mechanisms 138d, which may include keycap support mechanisms, domes, switches, scissor mechanisms, biasing mechanisms, springs, butterfly hinges, and/or other suitable components. Key mechanisms 138d may provide electrical and/or mechanical functionality (e.g., a tactile, moving key mechanism) for the keys of keyboard assembly 138. Keyboard assembly 138 may also include a base plate 138e to which key mechanisms 138d may be coupled and an optional key web 138b that may define key openings that frame the keys. Key web 138b may also help prevent debris from entering base portion 124 of device 100' from its keyboard. Keyboard assembly 138 may also include a cover 138c positioned over key mechanisms 138d. Cover 138c may be a flexible sheet, layer, or membrane, and may be formed of or include plastic, a fabric, or the like. Where the cover is a fabric cover, the fabric may be organic materials, synthetic materials, woven materials, knit materials, composite materials, coated fabrics, sealed fabrics, watertight fabrics, multi-layer fabrics, or the like. Cover 138c may be attached to base plate 138e and/or key mechanisms 138d. Cover 138c may substantially seal keyboard assembly 138 from the ingress of liquids, debris, or other contaminants. Cover 138c may be sufficiently flexible to allow key mechanisms 138d to travel in response to actuation of a corresponding key. For example, the material of cover 138c may be sufficiently flexible, or an otherwise substantially inflexible material may include seams, folds, channels, crenellations, or other features or configurations that allow key mechanisms 138d to travel in response to an actuation of a key.

Keyboard assembly 138 may further include keycaps 138a that may be positioned in key openings in key web 138b and coupled to cover 138c. Keycaps 138a may be adhered to cover 138c directly over corresponding key mechanisms 138d. For example, a key mechanism 138d may include or define a keycap support that may be movably supported relative to base plate 138e by a support mechanism (e.g., a butterfly hinge, scissor mechanism, etc.). Cover 138c may overlie a keycap support and/or may be adhered or otherwise affixed to the keycap support. A keycap may be affixed to a portion of cover 138c that may overlie the keycap support. For example, the keycap may be affixed to cover 138c using ultrasonic welding, adhesive, mechanical engaging features, or the like. Accordingly, cover 138c may be sandwiched between the keycap support and the keycap. By adhering, bonding, or otherwise attaching cover 138c to the keycap supports and the keycaps, a substantially continuous, unbroken cover 138c may be used, thereby maintaining a sealing function of cover 138c while still allowing a mechanical coupling between key mechanisms 138d and keycaps 138a.

Cover 138c may have openings therethrough to allow a mechanical engagement between the keycap supports and the keycaps. In such cases, the openings may be smaller than the keycaps and the keycap supports, such that the keycaps and keycap supports may cover and/or seal the openings. Accordingly, exposed areas of cover 138c (e.g., areas between the keycaps) may be substantially continuous and/or unbroken, thereby sealing the keyboard and preventing or limiting ingress of liquids, debris, or other contaminants into the key mechanisms and/or base portion 124 of device 100'''.

Base plate 138e may be a circuit board with electrical interconnects that may couple keyboard assembly 138 to components of device 100''', such as a processor, memory, input interfaces, and the like. The electrical interconnects may allow electrical signals from key mechanisms 138d to be detected by the device to register key inputs. In cases where sensor assembly 140 may be provided and configured to detect key presses or actuations, key mechanisms 138d may not include switches or other make-sensing components, and base plate 138e may not include electrical interconnects. In such cases, key mechanisms 138d, base plate 138e, and, optionally, key web 138b may be formed from or include dielectric or non-conductive materials such that fingers or other objects can be sensed by sensor assembly 140 through keyboard assembly 138.

Figure 2D:
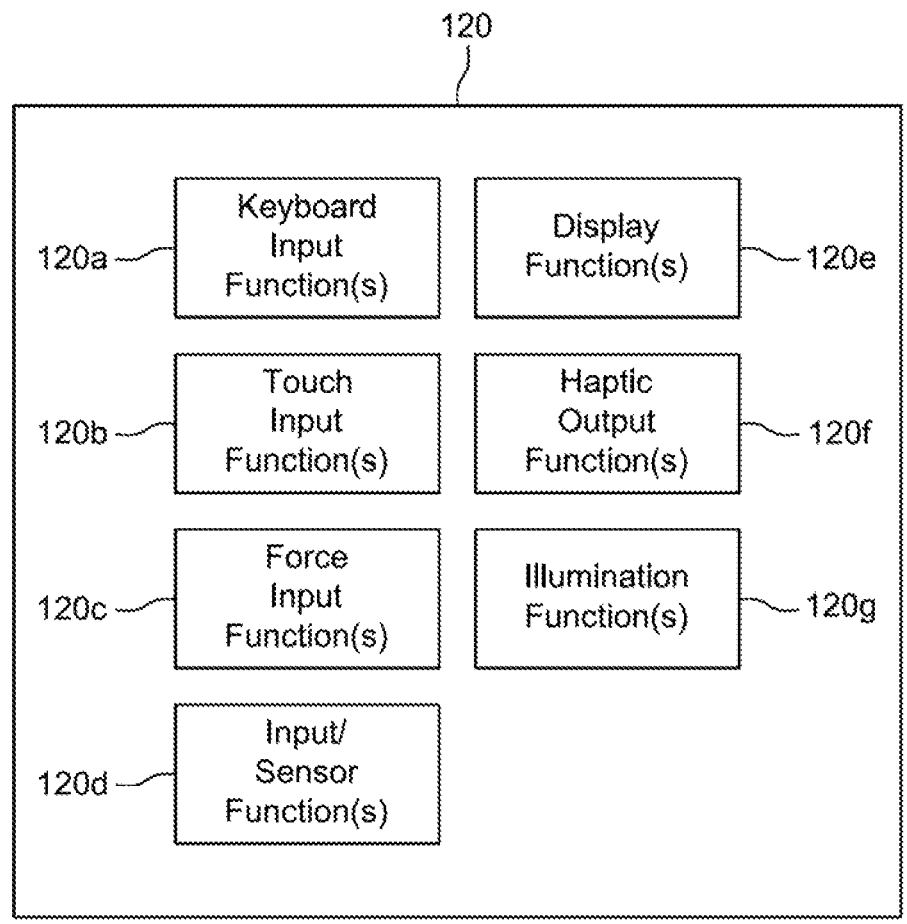
FIG. 2D is a simplified function block diagram of an interface system of an electronic device with an extended trackpad, in accordance with some embodiments.

FIG. 2D is a simplified block diagram showing functional aspects of an example integrated interface system 120 of any one or more of devices 100, 100', 100'', and 100''', and/or of any other device described herein. The functions of integrated interface system 120 may be performed by any of the components and structures described herein, including, but not limited to, touch sensors, force sensors, haptic actuators, displays, mechanical keys, light sources, and/or the like. A single device may include two or more integrated interface systems or two distinct system regions, such as a first region that may include mechanical keyboard keys and a second region that may include a touch-input interface.

With reference to FIG. 2D, integrated interface system 120 may provide any suitable keyboard input function(s) 120a, which may include the detection of key-based or similar inputs, including inputs that may be typically provided via a keyboard (e.g., alphanumeric and/or symbolic character input, function key selections, arrow key selections, etc.). A device (e.g., device 100) may use any suitable input mechanism(s) to perform keyboard input function 120a, such as mechanical keys, touch sensors, force sensors, displays, and/or the like. Where the device includes mechanical keys or key mechanisms, keyboard input function 120a may include the detection of physical movement of the key mechanisms. Where the device includes virtual keys, keyboard input function 120a may include the detection of touch or force inputs on the virtual keys. In either case or in a combined case, keyboard input function 120a may detect keyboard inputs through an input surface (e.g., top case 132 of device 100).

Integrated interface system 120 may provide any suitable touch input function(s) 120b, which may include the detection of touch-based inputs, such as clicks, taps, gestures (e.g., swiping, pinching), multi-touch inputs, and/or the like. These inputs may be similar to or include inputs conventionally detected by a trackpad. For example, these inputs may include gesture inputs that may be used to control a cursor or element of a graphical user interface on a display of the device. A device (e.g., device 100) may use any suitable input mechanism(s), such as capacitive touch sensors, resistive touch sensors, acoustic wave sensors, or the like, to perform touch input function 120b. Such mechanisms may be associated with or cover substantially the entire user-facing portion of top case 132, such that a touch input function 120b may detect touch inputs applied anywhere on top case 132, including, for example, on a mechanical or virtual keyboard, on a trackpad region below a mechanical or virtual keyboard, and/or on the portions of the top case that are adjacent the lateral sides of a mechanical or virtual keyboard. Alternatively, such mechanisms may be associated with or cover only a specific portion or portions of the top case.

A touch input function 120b may include the detection of touch inputs that are received in a keyboard region of top case 132 (e.g., a keyboard region 134). A keyboard region may correspond to a keyless surface of a virtual keyboard, or it may correspond to a region of a top case that includes mechanical keys. In either case, a touch input function 120b may include the detection of touch inputs, such as clicks, taps, gestures (e.g., swiping, pinching, etc.), and multi-touch inputs, that are applied to a keyboard region. Where mechanical keys or key mechanisms are used, a touch input function 120a may include the detection of touch inputs through the mechanical keys or mechanisms.

A touch input function 120b may also or alternatively include the detection of touch inputs that are applied to a non-key region of a device (e.g., to a non-key region of a top case of a device). For example, any region of top case 132 that does not correspond to a keyboard region (e.g., a non-keyboard region) may be configured to receive touch inputs, and the device may detect touch inputs in these regions as well.

Integrated interface system 120 may provide any suitable force input function(s) 120c that may include the detection of force inputs and/or a force component of a touch input. A device (e.g., device 100) may use any suitable force sensors to provide a force input function 120c. A force input function 120c may include the detection of force inputs at any location on a top case. For example, substantially the entire top surface of top case 132 may be configured to receive and/or detect force inputs applied to substantially any location of the top surface of the top case. Further, where the top case includes a dielectric surface or is formed from a dielectric sheet (e.g., glass, plastic, ceramic, or the like), the dielectric and/or mechanical properties (or other properties) of the dielectric material may facilitate the detection of force inputs at any suitable location on the top case (e.g., in a keyboard region, a non-keyboard region, or any other suitable location). Alternatively, only one or more select regions of a top case may be configured to receive and/or detect force inputs.

A device may be provided with any suitable force sensor(s) or force-sensing capabilities. Generally, any input surface may be configured to detect a magnitude or degree of force applied to the surface of a device by measuring a small level of deflection or displacement of the input surface. A force sensor may be configured to measure the deflection or displacement and produce an electrical response or signal that may correspond to the degree or amount of force applied to the surface of the device.

Force sensors and associated processors and circuitry may be configured to register inputs when a determined force satisfies (e.g., meets and/or exceeds) a force threshold (e.g., and when the location of the determined force is at a particular location). For example, if a force below a force threshold (e.g., a key force threshold) is determined or detected on a key region, the force sensor may ignore that input or otherwise not cause the device to take a particular action (e.g., the device may not register a key input). If the force on the key region exceeds a threshold (e.g., a key force threshold), the device may register the input as a key input and take an appropriate action, such as displaying a letter or character corresponding to that key on a display. The particular threshold that must be satisfied in order for a force sensor or device to register an input in response to a particular input may be any suitable threshold, and the threshold may be changed based on various factors. For example, the threshold may be dynamically set to a first value if it is determined (e.g., based on an average force value detected by the force sensor) that a user has a light typing style. That same device may set the threshold to a second value, higher than the first value, if it is determined that a user has a heavier typing style. Dynamically adjusting the threshold for force inputs may help improve the accuracy of key press detection in some circumstances, as it may easier to ignore inadvertent touches, taps, bumps, or other contacts on an input surface when the force associated with the user's typical typing/key input is known to a greater degree. Further, different thresholds may be established for different locations on an input surface or for different input surfaces of a device or for different user input digits (e.g., a thumb of a user as compared to any finger type of the user, or an index finger as compared to a pinky finger, etc.). As one example, a first key may be associated with a first threshold while a second key different than the first key may be associated with a second threshold that is different than the first threshold. As another example, if it is determined that a user applies more force with an index finger than a pinky finger, a device may establish a lower force threshold for keys or input regions that are typically associated with the pinky finger than for those that are typically associated with an index finger. These and other techniques may be implemented using any suitable force sensor or combination of force (and/or other) sensors (e.g., as described in U.S. Patent Application Publication No. 2018/0218859, which is incorporated by reference herein in its entirety).

Integrated interface system 120 may provide any suitable display function(s) 120e that may include the output of images or other visual information via a top case. For example, a device (e.g., device 100) may include or communicate with displays that are within the device and that produce images viewable on a top case, thereby providing the display function 120e. Displays may be used, for example, to produce images of keys (or other affordances) for a keyboard region. Displays may also be used to define input regions, buttons, or other affordances anywhere on a top case (e.g., to indicate the location and/or function of an input), or to display other graphical objects (e.g., images, videos, text, user interfaces, or the like). Because a top case may be formed from a glass or other transparent material, displays may be integrated with the top case such that the top case may act as a screen, even on surfaces that in conventional computing devices are opaque, such as a trackpad or a portion bordering a keyboard.

Integrated interface system 120 may provide any suitable haptic output function(s) 120f that may include the production of haptic or tactile outputs at a top case. A device (e.g., device 100) may use haptic actuators to perform a haptic output function 120f. Haptic actuators may be coupled to a top case or otherwise cause a top case to physically move to produce haptic outputs at the top case. Haptic outputs may be used for various purposes, such as to indicate that a touch input (e.g., a key selection or a trackpad selection) has been detected by the device. In a given implementation, one or more of haptic components may be arranged with respect to a top case of a portable computer or other electronic device. The arrangement of the haptic components may enable different haptic feedback over different portions of the top case. For example, haptic components that are configured to produce small, localized deformations and/or haptic outputs may be used to produce haptic outputs that are detectable on individual key regions of a keyboard. This may include positioning one haptic actuator at or below each of at least a subset of key regions of a keyboard, and/or assigning a single haptic actuator to a small group of keys or key regions (e.g., one haptic actuator for a group of two, three, four, five, six, or seven keys). In addition, haptic components that are configured to produce larger scale deformations and/or deflections of an input surface may be used to provide other types of feedback other than or in addition to key press feedback. Different haptic actuators of different types may be provided on a single device, where each type may be configured to produce a different type of haptic feedback in response to a different event or action. A first type of haptic component or actuator may be configured to produce a first type of haptic output, such as a lateral-actuating haptic component that may be configured to produce a lateral or side-to-side (e.g., in-plane) movement of a top case or other portion of a device. A second type of haptic component or actuator may be configured to produce a second type of haptic output, such as a surface-normal-actuating haptic component that may be configured to produce a perpendicular or surface-normal (e.g., out-of-plane) movement of a top case or other portion of a device. Any suitable haptic components may be provided, such as those described in U.S. Patent Application Publication No. 2018/0218859. For example, an actuator may be any suitable electromechanical actuator, any suitable electromagnetic actuator (e.g., where the interaction between a coil and a set of magnets may push trackpad region 336 up and down (e.g., along the Z-axis)), any suitable piezo electric actuator (e.g., where a voltage may be applied to a capacitive ceramic device that may buckle when the voltage is applied to move trackpad region 336 up and down (e.g., along the Z-axis)), any suitable actuator that may translate an electrical signal to a mechanical movement (e.g., along the Z-axis), and/or the like.

Integrated interface system 120 may provide any suitable illumination function(s) 120g that may include the illumination of regions or elements of a top case. A device (e.g., device 100) may use any suitable light sources to provide an illumination function. For example, a glass, plastic, or otherwise light-transmissive top case (e.g., top case 132) may act as a light guide. For example, a glass or light-transmissive (e.g., transparent or translucent) top case 132 may act as a light guide to direct light from a light source to other regions of the device, such as under or around keycaps or other key mechanisms. Also, where the top case is entirely transparent or has transparent portions, the transparent portions may allow images from underlying displays to pass through the top case, which may not be possible with opaque top cases. An illumination function 120g may also provide backlighting or other illumination for the displays.

Integrated interface system 120 may provide any suitable additional input and/or sensor function(s) 120d. A device (e.g., device 100) may use any suitable components to receive inputs (e.g., from a user or another computer, device, system, network, etc.) or to detect any suitable property or parameter of the device, the environment surrounding the device, people or things interacting with the device (or nearby the device), or the like. For example, a device may include accelerometers, temperature sensors, position/orientation sensors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, or the like. Such sensors and/or input devices may be located in any suitable portion of or location in the device. For example, sensors and/or input devices maybe located in a display portion or a base portion 104 (or it may include components in both a display portion and a base portion). An input and/or sensor function 120d may use network and/or communications systems to provide input and/or sensing functionality, such as to receive commands, data, information, content (e.g., audio, video, images, webpages), or the like, from other devices or systems.

Figure 3:
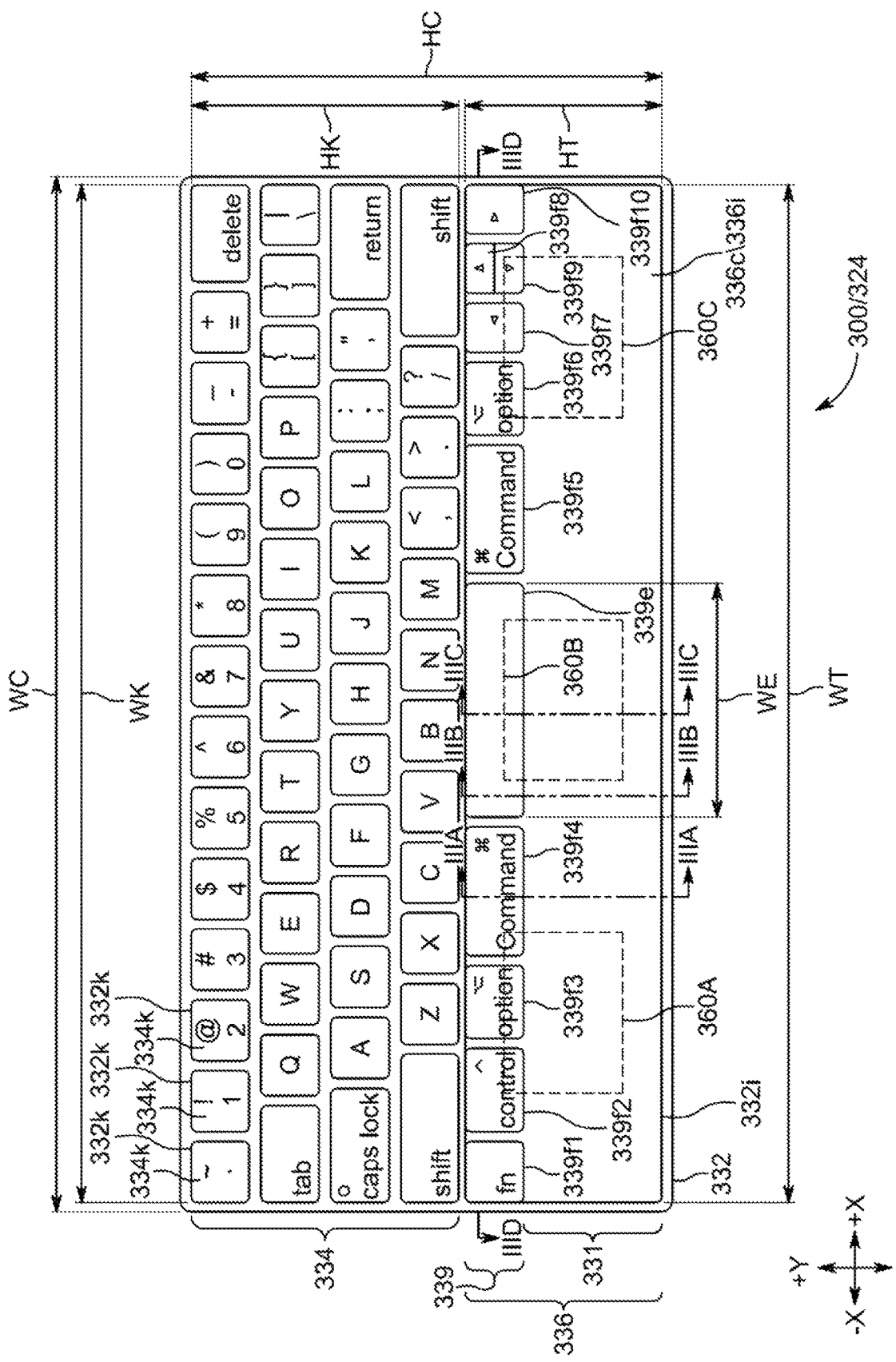
FIG. 3 is a top view of a portion of an illustrative electronic device with an extended trackpad, in accordance with some embodiments.
Figure 3D:
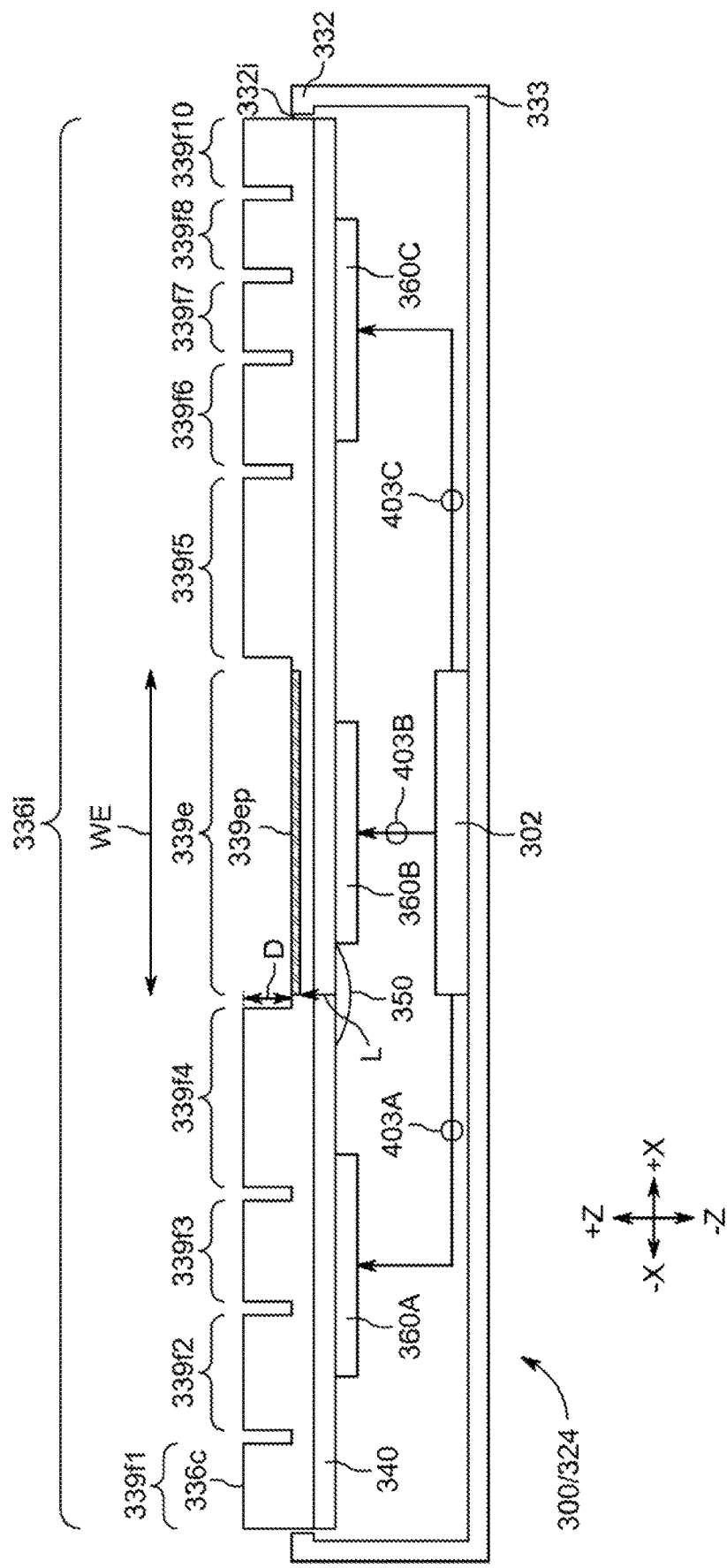
FIG. 3D shows a cross-sectional view of the electronic device of FIGS. 3-3C, taken from line IIID-IIID of FIG. 3.

Certain touch sensors of an integrated interface system may detect whether a user is touching a particular surface or interface area, such as a key of a keyboard region or a certain area of a trackpad region, but may not be capable of differentiating between light touches and more forceful touches. Force sensors may enable a device to differentiate between such inputs. For example, force sensors, may be used to determine whether a touch input applied to a touch-input region is part of a swipe or drag input or a "click" type of input. Where force sensors are used in regions of a computing device where only fingers are typically applied, such as a small trackpad adjacent a keyboard on a notebook computer, the maximum amount of force that is typically applied to the trackpad during normal use may be at or near the amount of force applied by a finger during a click event. For example, the highest force experienced by a trackpad may be typically near the force applied by a finger during a selection (e.g., a click) applied to the trackpad. As shown in FIGS. 1A and 1B, for example, device 100 may include keyboard region 134 and trackpad region 136 that may extend along (and beyond) an entire width of keyboard region 134. Similarly, as shown in FIGS. 3-3D, a device 300, which may be similar to any one or more of devices 100-100''', may include a base portion 324 with a top case 332 and a bottom case 333. As shown, a keyboard region 334 may be provided along or by or through a first portion of top case 332, for example, where a plurality of mechanical keys 334k may be exposed through a respective plurality of key openings 332k in top case 332. Moreover, as shown, a trackpad region 336 may be provided along or by or through a second portion of top case 332, for example, where a trackpad interface 336i (e.g., a top face) of an external trackpad component 336c of trackpad region 336 may be exposed through a trackpad opening 332i in top case 332. External trackpad component 336c of trackpad region 336 may be provided by any suitable material(s), such as the material(s) of or similar to top case 332 or any other suitable material(s) along which or on to which a user may apply a force for providing a detectable user input. In some embodiments, the entirety of keyboard region 334 and trackpad region 336 may be force sensitive using one or more force sensing assemblies, thus facilitating detection of force inputs on any key(s) of keyboard region 334, which may be a mechanical keyboard or a virtual keyboard or a combination thereof, as well as on any portion(s) of trackpad region 336. Alternatively, a first force sensing assembly may be provided to enable trackpad region 336 to be force sensitive while another force sensing assembly may be provided to enable keyboard region 334 to be force sensitive, or keyboard region 334 may not be force sensitive.

Despite providing a trackpad with a trackpad width WT that may extend adjacent to and along an entire width WK of keyboard region 334 (e.g., along the X-axis (e.g., along substantially the entire width WC of top case 332)), trackpad region 336 may be limited in its height HT (e.g., along the Y-axis) to due to height constraints of height HC of top case 332 and/or due to height requirements of a typical keyboard layout that may be provided by keyboard region 334 with a keyboard height HK, which may be in series with height HT of trackpad region 336 along height HC of top case 332. Therefore, in order to expand height HT of trackpad region 336 within a limited height HC of top case 332, at least a portion of a keyboard interface that may normally be provided by keyboard region 334 may be removed or otherwise not provided for reducing height HK of keyboard region 336, and, instead, such a keyboard interface may instead be provided by a portion of the increased height trackpad region 336. For example, as shown, a bottom row of a typical QWERTY keyboard design (e.g., a row with a space bar and one or more function keys) may not be provided by any keys 334k of keyboard region 334, thereby reducing height HK of keyboard region 336. Instead, the functionality of at least a portion of such a keyboard row may be selectively provided by a portion of trackpad region 336, such as by hybrid trackpad section 339 of trackpad region 336. For example, different portions of hybrid trackpad section 339 of trackpad region 336 may be configured to detect different types of inputs with different force thresholds for different user input digits (e.g., a user's thumb as compared to a user's finger, or an index finger as compared to a pinky finger, etc.), such that at least one portion of hybrid trackpad section 339 may be configured to intelligently switch between functioning as a trackpad and functioning as a virtual keyboard button.

As just one example, as shown, trackpad region 336 may include hybrid trackpad section 339 and a dedicated trackpad section 331 that may extend along and adjacent a width of hybrid trackpad section 339 (e.g., an upper boundary of section 331 may abut a lower boundary of section 339). Each one of sections 331 and 339 may be provided by the same trackpad assembly (e.g., trackpad interface 336i (e.g., the top face of external trackpad component 336c of trackpad region 336) may provide the user touchable portion of each one of sections 331 and 339), which may be serviced by the same sensing assembly (e.g., a touch and/or force sensing assembly 340). Trackpad section 331 may be configured to function as a dedicated trackpad section. One or more portions of hybrid trackpad section 339 accessible by a user's touch, such as each one of function key portions 339f1-339f10 of hybrid trackpad section 339, may be configured to function as a dedicated virtual keyboard portion of hybrid trackpad section 339 (e.g., to mimic each respective function key of the keyboard row not provided by keyboard region 334). A different portion of hybrid trackpad section 339 accessible by a user's touch, such as an extension portion 339e of hybrid trackpad section 339, may extend along and adjacent a portion of a width of dedicated trackpad section 331 and may selectively be configured either to function as a trackpad portion of hybrid trackpad section 339 that may combine with trackpad section 331 for providing a trackpad with an extended height HT or to function as a virtual keyboard portion of hybrid trackpad section 339 (e.g., to mimic a space bar key of the keyboard row not provided by keyboard region 334 (e.g., portion 339e may be positioned with respect to keyboard region 334 where a space bar would be for the missing row of the QWERTY design of the key arrangement of keyboard region 334)). Extension portion 339e may be configured to switch between such a trackpad functionality and a keyboard functionality depending on the type of user input digit detected by that extension portion.

Any integrated interface system(s) of device 300 may be configured to distinguish between different types of inputs and/or different force thresholds and/or different user input digits applied to trackpad region 336 using any suitable touch and/or force sensing systems. For example, as shown, any suitable touch and/or force sensing assembly 340 may be associated with (e.g., positioned under and along) trackpad region 336 and may be used in combination with any suitable processor(s) and/or application(s) of device 300 for detecting and distinguishing such user inputs that may be applied to trackpad region 336 (e.g., to trackpad interface 336i). For example, device 300 may be configured to apply any suitable keyboard force threshold requirements to one, some, or each dedicated function key portion 339f of hybrid trackpad section 339, such that if a force and/or touch sensing assembly of trackpad region 336 (e.g., assembly 340) detects an input that satisfies a particular first keyboard force threshold or first keyboard force range being applied to a dedicated function key portion 339f of hybrid trackpad section 339, then a first keyboard input (e.g., a keyboard key "press") may be registered for that function key portion 339f, and such that if a force and/or touch sensing assembly of trackpad region 336 (e.g., assembly 340) detects no input or an input that does not satisfy the first keyboard force threshold or range being applied to a dedicated function key portion 339f, then no keyboard input may be registered for that function key portion 339f. As another example, device 300 may be configured to apply any suitable trackpad force threshold requirements to trackpad section 331, such that if a force and/or touch sensing assembly of trackpad region 336 (e.g., assembly 340) detects an input that satisfies a particular first trackpad force threshold or first trackpad force range being applied to an area of trackpad section 331, then a first trackpad input (e.g., a trackpad "swipe" or "drag") may be registered for that area of trackpad section 331, and such that if a force and/or touch sensing assembly of trackpad region 336 (e.g., assembly 340) detects an input that satisfies a particular second trackpad force threshold or second trackpad force range being applied to an area of trackpad section 331, then a second trackpad input (e.g., a trackpad "click") may be registered for that area of trackpad section 331, and such that if a force and/or touch sensing assembly of trackpad region 336 (e.g., assembly 340) detects no input or an input that does not satisfy either the first or second trackpad force threshold or range being applied to an area of trackpad section 331, then no trackpad input may be registered for that area of trackpad section 331. As another example, device 300 may be configured to apply either any suitable keyboard force threshold requirements or any suitable trackpad force threshold requirements for registering any user inputs to extension portion 339e of hybrid trackpad section 339 based on whether a force and/or touch sensing assembly (e.g., assembly 340) of trackpad region 336 detects a keyboard user input digit type (e.g., a thumb of the user) input or a trackpad user input digit type (e.g., a finger of a user (e.g., any digit of a user's hand other than a thumb)) input at an area of extension portion 339e of hybrid trackpad section 339. This detection of either a keyboard user input digit type (e.g., thumb) input or trackpad user digit type (e.g., finger) input at an area of extension portion 339e may be useful for determining whether a user is intending to interact with extension portion 339e as a keyboard key (e.g., as a missing space bar key of the keyboard QWERTY design of keyboard region 334) or as a trackpad (e.g., as an extension of trackpad section 331 of trackpad region 336). For example, as shown in FIG. 1A, when a user's hands UL and UR are properly positioned with respect to a QWERTY keyboard design, the user's thumbs (e.g., thumb URT of the user's right hand UR) may be hovered over or close to the space bar (e.g., extension portion 339e of FIG. 3) and a thumb may be used to enact the space bar functionality. However, as shown in FIG. 1B, for example, when a user attempts to use a trackpad functionality, the user most often positions a finger (e.g., index finger URI of right hand UR) over a trackpad, such as for clicking or swiping or dragging (e.g., along the X- and/or Y-axes (e.g., along dedicated trackpad section 331 and/or extension portion 339e, the combination of which may provide for a taller X-axis available to such a user trackpad interaction (e.g., for a longer trackpad swipe or drag gesture than may be possible without extension portion 339e))).

Accordingly, a touch and force sensing assembly 340 of device 300 (e.g., in combination with any suitable processor(s) and/or application(s) of device 300) may be used to distinguish between several different types of inputs that may be applied to trackpad region 336 and to cause the device to react differently, such as based on the location of the input, the type of user input digit used to provide the input, the sensed position of another portion (e.g., the rest of the user's hand during the input), and/or the force of the input. For example, a registered keyboard key press input may cause a letter or character to be displayed on a display or a particular function to be enabled, a registered trackpad drag input may cause a mouse cursor or selected element to be moved across a displayed interface, and a registered trackpad click input may cause a mouse cursor to select an element on a displayed interface. As used herein, inputs applied to different areas of a device (e.g., to section 331 or to a portion 339f of section 339 or to portion 339e of section 339 (e.g., a trackpad region, a virtual keyboard key region, a selectively hybrid trackpad/keyboard key region, respectively), etc.) may be referred to as different types of inputs, and inputs having different forces (e.g., a force meeting a first keyboard threshold (e.g., key press), a force meeting a first trackpad threshold (e.g., swipe or drag), a force meeting a second trackpad threshold (e.g., tap or click), or the like) may be referred to as different types of inputs, and inputs provided by different user input digit types (e.g., thumb versus finger) may be referred to as different types of inputs. This may largely mirror the expectation of a user that providing inputs to different regions and/or the same region with different digits and/or with different amounts of force will cause the device to perform different types of functions. Further, different types of haptic outputs may be associated with or produced in response to the detection of different types of inputs.

Different portions of hybrid trackpad section 339 may be made differentiable to a user in any suitable manner, such as visually and/or tactilely. For example, as shown in FIGS. 3A and 3D, each one of virtual key portions 339f1-339f10 of section 339 of interface 336i (e.g., the top face) of external trackpad component 336c of trackpad region 336 may be raised (e.g., using any suitable material) by any suitable depth D with respect to any other portion of interface 336i (e.g., the top face) of external trackpad component 336c of trackpad region 336, such as each portion of section 339 of interface 336i of external trackpad component 336c extending between any two adjacent virtual key portions 339f1-339f10 and/or extension portion 339e of interface 336i of external trackpad component 336c and/or trackpad section 331 of interface 336i of external trackpad component 336c. Such an increased depth D of external trackpad component 336c or distance between different portions of interface 336i of trackpad region 336 may provide to a user both a visual and tactile distinction between such portions of trackpad region 336 (e.g., between distinct virtual key portions 339f1-339f10 and/or between virtual key portions 339f1-339f10 and other portions of trackpad region 336). Additionally or alternatively, purely visual technique(s) may be used to provide to a user a visual distinction between distinct virtual key portions 339f1-339f10 and/or between virtual key portions 339f1-339f10 and other portions of trackpad region 336, such as paint, masks, backlight or any other suitable illumination, and/or the like.

Although providing a raised interface 336i for one or more of virtual key portions 339f1-339f10 may be useful for enabling a user to visually and tactilely distinguish one or more of virtual key portions 339f1-339f10, such a raised interface may not be as useful for distinguishing extension portion 339e of hybrid trackpad section 339 from other portions of trackpad region 336 (e.g., section 331) as it may be more useful to provide a substantially smooth and continuous transition between extension portion 339e of hybrid trackpad section 339 of interface 336i of trackpad component 336c and dedicated trackpad section 331 of interface 336i of trackpad component 336c (e.g., for enabling a comfortable trackpad drag or swipe gesture spanning a portion of each one of dedicated trackpad section 331 and extension portion 339e of hybrid trackpad section 339 with no or substantially no mechanical friction therebetween (e.g., for enabling a trackpad region with an extended height HT (e.g., between the ends of hybrid trackpad section 339 along its width WE) that may be flat and smooth and continuous (e.g., planar or substantially planar))). Instead, any suitable visual feature(s) may be provided for enabling a user to visually distinguish extension portion 339e from other portions of trackpad region 336, such as a painted region 339ep along at least a portion (e.g., periphery of) or the entirety of extension portion 339e of interface 336i, for enabling a user to visually identify the boundaries or general location of extension portion 339e (e.g., for enabling more accurate user input (e.g., for a virtual space bar key)). Of course, any other suitable visual technique(s) may additionally or alternatively be employed, such as providing a light-emitting assembly 350 for emitting light L through or onto at least a portion of extension portion 339e of interface 336i for visually distinguishing extension portion 339e from trackpad section 331. Therefore, in some embodiments, as shown, trackpad region 336 may provide a flat or substantially flat "upside down T" shaped trackpad region (e.g., the combination of extension portion 339e and section 331 that may extend along the lower edge of portion 339e and then beyond that edge in each one of the −X and +X directions (e.g., extension portion 339e and section 331 may be co-planar or substantially co-planar (e.g., save any feature(s) (e.g., paint 339ep or otherwise) that may mostly visually identify the transition from portion 339e to section 331)), while a raised function key portion may be provided adjacent each side edge of extension portion 339e and along a portion of the upper edge of section 331 (e.g., function key portion 339f4 may be positioned adjacent the left side edge of extension portion 339e and along a portion of the upper edge of section 331 while function key portion 339f5 may be positioned adjacent the right side edge of extension portion 339e and along another portion of the upper edge of section 331). Therefore, at least a portion of the periphery of extension portion 339e (e.g., the lower edge of extension portion 339e that may define width WE of extension portion 339e) may abut a portion of the periphery of section 331 (e.g., a portion of an upper boundary of section 331). Portion 339e and section 331 of interface 336i may be co-planar (e.g., in a first shared plane (e.g., a first X-Y plane)) while at least one function key portion (e.g., key portion 339f4) of interface 336i may be above or otherwise outside of the plane shared by portion 339e and section 331 (e.g., raised by dimension D above such a plane).

Figure 3E:
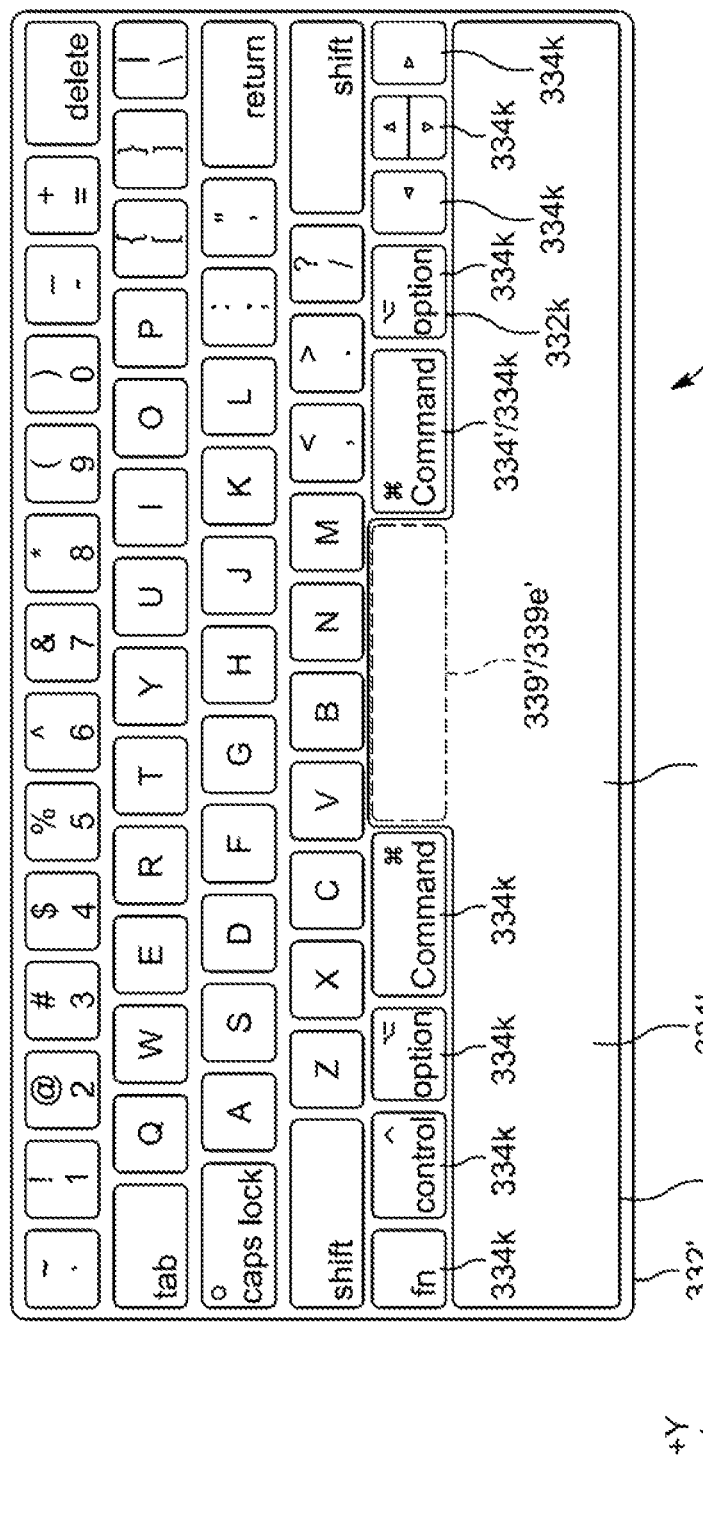
FIG. 3E is a top view of a portion of another illustrative electronic device with an extended trackpad, in accordance with some embodiments.

As just one other example, as shown in FIG. 3E, a device 300', which may be similar to device 300, may include a base portion 324' and a trackpad region 336', where a keyboard region 334' may be provided along or by or through a first portion of top case 332', for example, where a plurality of mechanical keys 334k may be exposed through a respective plurality of key openings 332k in top case 332'. Moreover, as shown, trackpad region 336' may be provided along or by or through a second portion of top case 332', for example, where a trackpad interface 336i' (e.g., a top face) of an external trackpad component 336c' of trackpad region 336' may be exposed through a trackpad opening 332i' in top case 332'. Trackpad region 336' may include a hybrid trackpad section 339' and a dedicated trackpad section 331' that may extend adjacent and along and beyond a width of hybrid trackpad section 339' (e.g., an upper boundary of a portion (e.g., central portion) of section 331' may abut a lower boundary of section 339'). Each one of sections 331' and 339' may be provided by the same trackpad assembly (e.g., trackpad interface 336i' (e.g., the top face of external trackpad component 336c' of trackpad region 336') may provide the user touchable portion of each one of sections 331' and 339'), which may be serviced by the same sensing assembly (e.g., a touch and/or force sensing assembly). Trackpad section 331' may be configured to function as a dedicated trackpad section. One or more portions of hybrid trackpad section 339' accessible by a user's touch, such as portion 339e' of hybrid trackpad section 339', may extend along and adjacent a portion of a width of dedicated trackpad section 331' and may selectively be configured either to function as a trackpad portion of hybrid trackpad section 339' that may combine with trackpad section 331' for providing a trackpad with an extended height or to function as a virtual keyboard portion of hybrid trackpad section 339' (e.g., to mimic a space bar key not provided by a keyboard region 334' including a set of keys 334k). Extension portion 339e' may be configured to switch between such a trackpad functionality and a keyboard functionality depending on the type of user input digit detected by that extension portion. Therefore, unlike device 300, each function key of device 300' may be provided by a key 334k of keyboard region 334' and may be adjacent to and/or in a same X-axis row as extension portion 339e'.

Figure 3F:
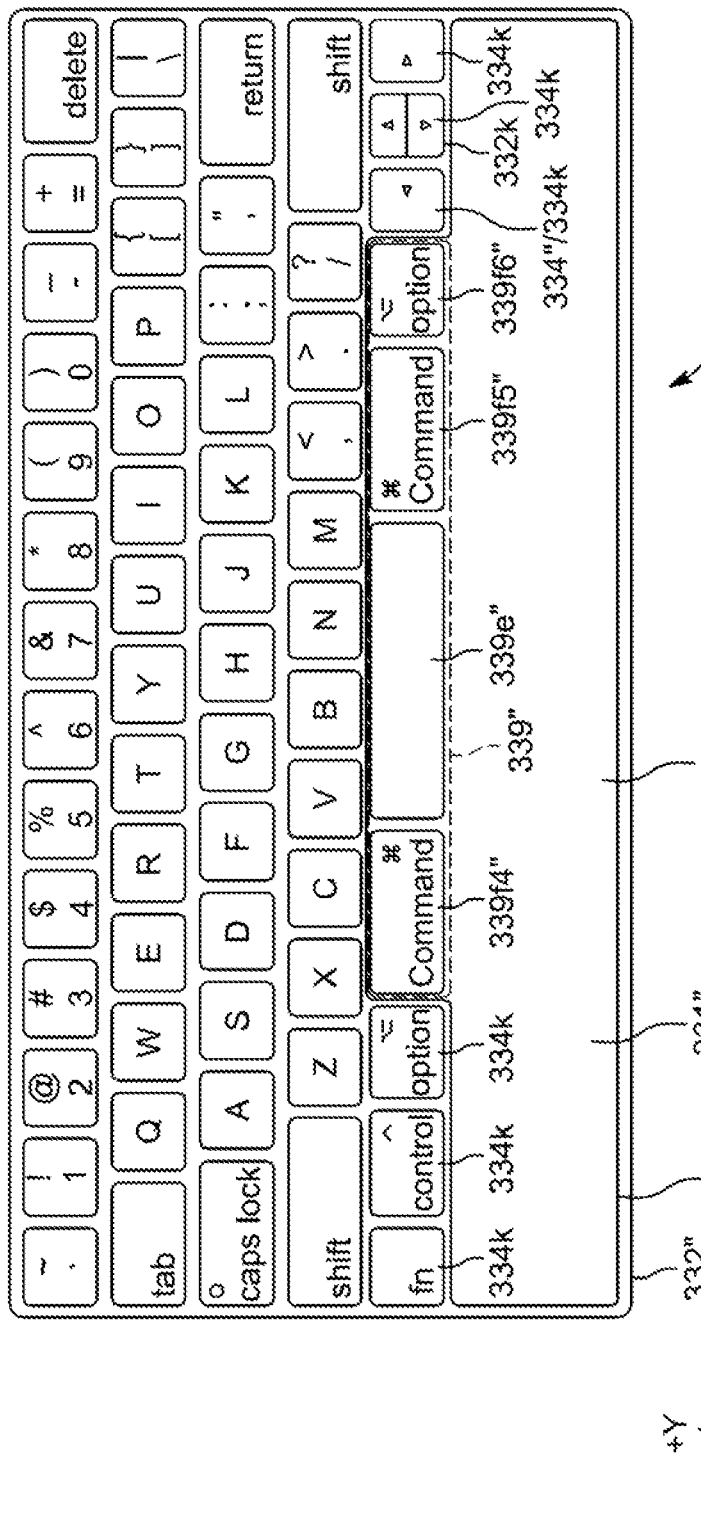
FIG. 3F is a top view of a portion of yet another illustrative electronic device with an extended trackpad, in accordance with some embodiments.

As just one other example, as shown in FIG. 3F, a device 300", which may be similar to device 300, may include a base portion 324" and a trackpad region 336", where a keyboard region 334" may be provided along or by or through a first portion of top case 332", for example, where a plurality of mechanical keys 334k may be exposed through a respective plurality of key openings 332k in top case 332". Moreover, as shown, trackpad region 336" may be provided along or by or through a second portion of top case 332", for example, where a trackpad interface 336i" (e.g., a top face) of an external trackpad component 336c" of trackpad region 336" may be exposed through a trackpad opening 332i" in top case 332". Trackpad region 336" may include a hybrid trackpad section 339" and a dedicated trackpad section 331" that may extend adjacent and along and beyond a width of hybrid trackpad section 339" (e.g., an upper boundary of a portion (e.g., central portion) of section 331" may abut a lower boundary of section 339"). Each one of sections 331" and 339" may be provided by the same trackpad assembly (e.g., trackpad interface 336i" (e.g., the top face of external trackpad component 336c" of trackpad region 336") may provide the user touchable portion of each one of sections 331" and 339"), which may be serviced by the same sensing assembly (e.g., a touch and/or force sensing assembly). Trackpad section 331" may be configured to function as a dedicated trackpad section. One or more portions of hybrid trackpad section 339" accessible by a user's touch, such as each one of function key portions 339f4"-339f6" of hybrid trackpad section 339", may be configured to function as a dedicated virtual keyboard portion of hybrid trackpad section 339" (e.g., to mimic certain respective function keys not provided by keyboard region 334"). A different portion of hybrid trackpad section 339" accessible by a user's touch, such as portion 339e" of hybrid trackpad section 339", may extend along and adjacent a portion of a width of dedicated trackpad section 331" and may selectively be configured either to function as a trackpad portion of hybrid trackpad section 339" that may combine with trackpad section 331" for providing a trackpad with an extended height or to function as a virtual keyboard portion of hybrid trackpad section 339" (e.g., to mimic a space bar key not provided by a keyboard region 334" including a set of keys 334k). Extension portion 339e" may be configured to switch between such a trackpad functionality and a keyboard functionality depending on the type of user input digit detected by that extension portion. Therefore, unlike device 300, some but not all function keys of device 300" may be provided by keys 334k of keyboard region 334" and may be adjacent to and/or in a same X-axis row as extension portion 339e" and/or function key portions 339f4"-339f6" of hybrid trackpad section 339".

Figure 3G:
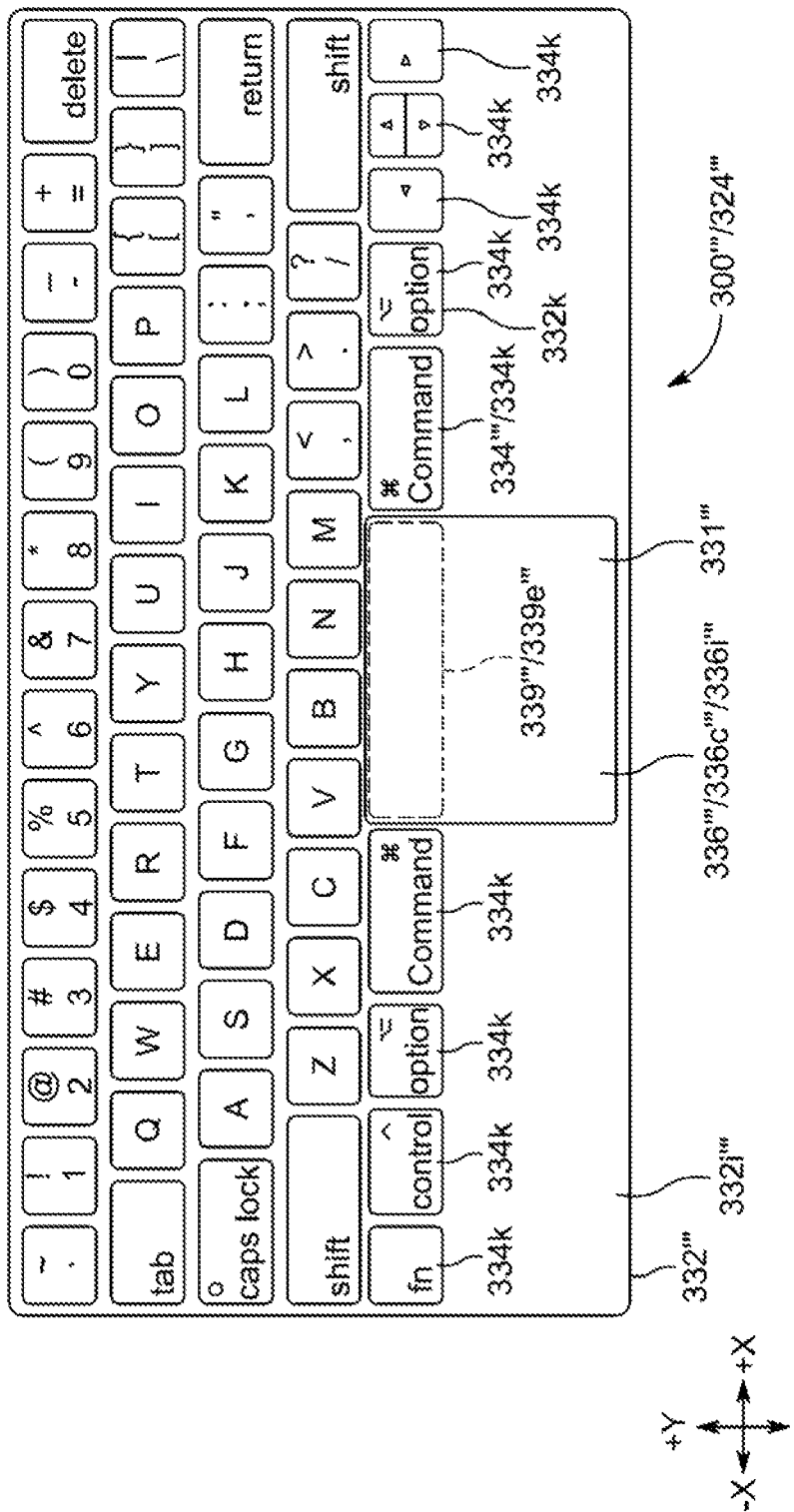
FIG. 3G is a top view of a portion of yet another illustrative electronic device with an extended trackpad, in accordance with some embodiments.

As just one other example, as shown in FIG. 3G, a device 300''', which may be similar to device 300, may include a base portion 324''' and a trackpad region 336''', where a keyboard region 334''' may be provided along or by or through a first portion of top case 332''', for example, where a plurality of mechanical keys 334k may be exposed through a respective plurality of key openings 332k in top case 332'''. Moreover, as shown, trackpad region 336''' may be provided along or by or through a second portion of top case 332''', for example, where a trackpad interface 336i''' (e.g., a top face) of an external trackpad component 336c''' of trackpad region 336''' may be exposed through a trackpad opening 332i''' in top case 332'''. Trackpad region 336''' may include a hybrid trackpad section 339''' and a dedicated trackpad section 331''' that may extend adjacent and along a width of hybrid trackpad section 339''' (e.g., an upper boundary of section 331''' may abut a lower boundary of section 339'''). Each one of sections 331''' and 339''' may be provided by the same trackpad assembly (e.g., trackpad interface 336i''' (e.g., the top face of external trackpad component 336c''' of trackpad region 336''') may provide the user touchable portion of each one of sections 331''' and 339''') which may be serviced by the same sensing assembly (e.g., a touch and/or force sensing assembly). Trackpad section 331''' may be configured to function as a dedicated trackpad section. One or more portions of hybrid trackpad section 339''' accessible by a user's touch, such as portion 339e''' of hybrid trackpad section 339''', may extend along and adjacent a width of dedicated trackpad section 331''' and may selectively be configured either to function as a trackpad portion of hybrid trackpad section 339''' that may combine with trackpad section 331''' for providing a trackpad with an extended height or to function as a virtual keyboard portion of hybrid trackpad section 339''' (e.g., to mimic a space bar key not provided by a keyboard region 334''' including a set of keys 334k). Extension portion 339e''' may be configured to switch between such a trackpad functionality and a keyboard functionality depending on the type of user input digit detected by that extension portion. Therefore, unlike device 300, each function key of device 300''' may be provided by a key 334k of keyboard region 334''' and may be adjacent to and/or in a same X-axis row as extension portion 339e''', while unlike device 300', trackpad interface 336i''' may provide a rectangular or square shape.

Figure 3H:
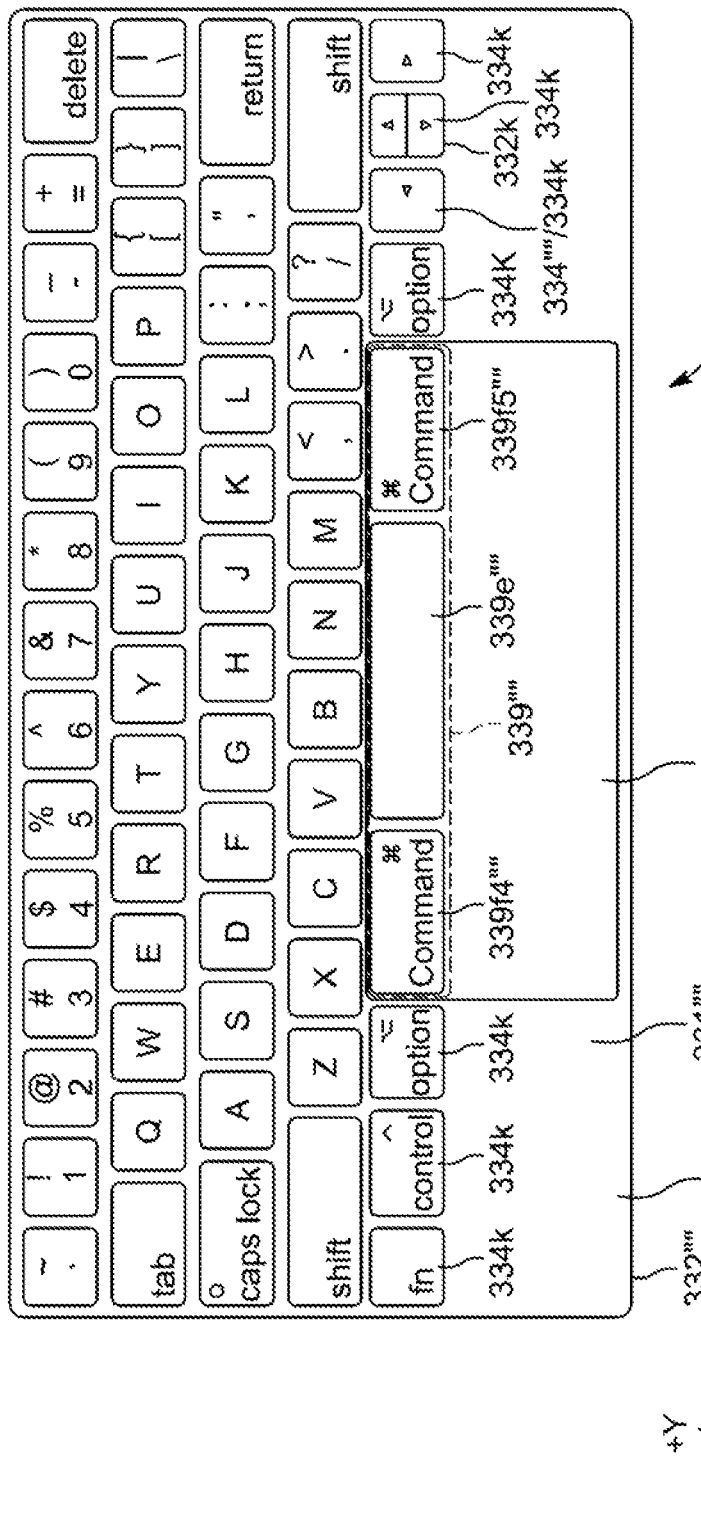
FIG. 3H is a top view of a portion of yet another illustrative electronic device with an extended trackpad, in accordance with some embodiments.

As just one other example, as shown in FIG. 3H, a device 300'''', which may be similar to device 300, may include a base portion 324'''' and a trackpad region 336'''', where a keyboard region 334'''' may be provided along or by or through a first portion of top case 332'''', for example, where a plurality of mechanical keys 334k may be exposed through a respective plurality of key openings 332k in top case 332''''. Moreover, as shown, trackpad region 336'''' may be provided along or by or through a second portion of top case 332'''', for example, where a trackpad interface 336i'''' (e.g., a top face) of an external trackpad component 336c'''' of trackpad region 336'''' may be exposed through a trackpad opening 332i'''' in top case 332''''. Trackpad region 336'''' may include a hybrid trackpad section 339'''' and a dedicated trackpad section 331'''' that may extend adjacent and along a width of hybrid trackpad section 339'''' (e.g., an upper boundary of section 331'''' may abut a lower boundary of section 339''''). Each one of sections 331'''' and 339'''' may be provided by the same trackpad assembly (e.g., trackpad interface 336i'''' (e.g., the top face of external trackpad component 336c'''' of trackpad region 336'''') may provide the user touchable portion of each one of sections 331'''' and 339''''), which may be serviced by the same sensing assembly (e.g., a touch and/or force sensing assembly). Trackpad section 331'''' may be configured to function as a dedicated trackpad section. One or more portions of hybrid trackpad section 339'''' accessible by a user's touch, such as each one of function key portions 339f4'''' and 339f5'''' of hybrid trackpad section 339'''', may be configured to function as a dedicated virtual keyboard portion of hybrid trackpad section 339'''' (e.g., to mimic certain respective function keys not provided by keyboard region 334''''). A different portion of hybrid trackpad section 339'''' accessible by a user's touch, such as portion 339e'''' of hybrid trackpad section 339'''', may extend along and adjacent a portion of a width of dedicated trackpad section 331'''' and may selectively be configured either to function as a trackpad portion of hybrid trackpad section 339'''' that may combine with trackpad section 331'''' for providing a trackpad with an extended height or to function as a virtual keyboard portion of hybrid trackpad section 339'''' (e.g., to mimic a space bar key not provided by a keyboard region 334'''' including a set of keys 334k). Extension portion 339e'''' may be configured to switch between such a trackpad functionality and a keyboard functionality depending on the type of user input digit detected by that extension portion. Therefore, unlike device 300, some but not all function keys of device 300'''' may be provided by keys 334k of keyboard region 334'''' and may be adjacent to and/or in a same X-axis row as extension portion 339e'''' and/or function key portions 339f4'''' and 339f5'''' of hybrid trackpad section 339'''', while unlike device 300'', trackpad interface 336i'''' may provide a rectangular or square shape.

As shown, device 300 may include two or more haptic actuators provided underneath any suitable portion(s) of trackpad component 336c, such as haptic actuators 360A, 360B, and 360C. Each one of such haptic actuators may be any suitable type of haptic actuator that may be configured to produce a haptic output of any suitable type that may be operative to produce any suitable type of movement by at least a portion of trackpad component 336c of trackpad region 336. Any suitable application nm by any suitable processor(s) 302 of device 300 may be configured to generate any suitable control signal(s) that may be operative to control the haptic output of a haptic actuator for providing haptic feedback to a user via trackpad region 336 (e.g., deformation of a portion of trackpad component 336c). For example, as shown, first haptic actuator 360A may be driven by a first control signal 403A having a first waveform 402A, second haptic actuator 360B may be driven by a second control signal 403B having a second waveform 402B, and third haptic actuator 360C may be driven by a third control signal 403C having a third waveform 402C. Any processor(s) of device 300 may be operative to control independently the shape of any two or more of waveforms 402A-402C, such that different, independently controlled waveforms may simultaneously drive respective haptic actuators. Moreover, any two or more haptic actuators may be positioned underneath different portions of trackpad component 336c, such that each of those actuators may be operative to more directly control the movement of a particular respective portion of trackpad component 336c. For example, as shown, first haptic actuator 360A may be positioned underneath a left side (e.g., -X side) portion of trackpad section 331 and/or a portion of one or more left side function key portions (e.g., function key portions 339f2-339f4) and may be controlled to deform a segment of trackpad component 336c proximal these portions, second haptic actuator 360B may be positioned underneath a central portion of trackpad section 331 and/or a portion of extension portion 339e and may be controlled to deform a segment of trackpad component 336c proximal these portions, while third haptic actuator 360C may be positioned underneath a right side (e.g., +X side) portion of trackpad section 331 and/or a portion of one or more right side function key portions (e.g., function key portions 339f6-339f9) and may be controlled to deform a segment of trackpad component 336c proximal these portions. Each haptic actuator may be driven by its own respective independently defined waveform signal so that a combination of simultaneous deformations of different segments of trackpad component 336c due to simultaneously driven haptic actuators may be operative to provide a resulting mechanical response that may be confined to a specific spatial region of trackpad component 336c and stationary elsewhere (e.g., for providing a targeted haptic feedback at that specific spatial region).

Figure 4A:
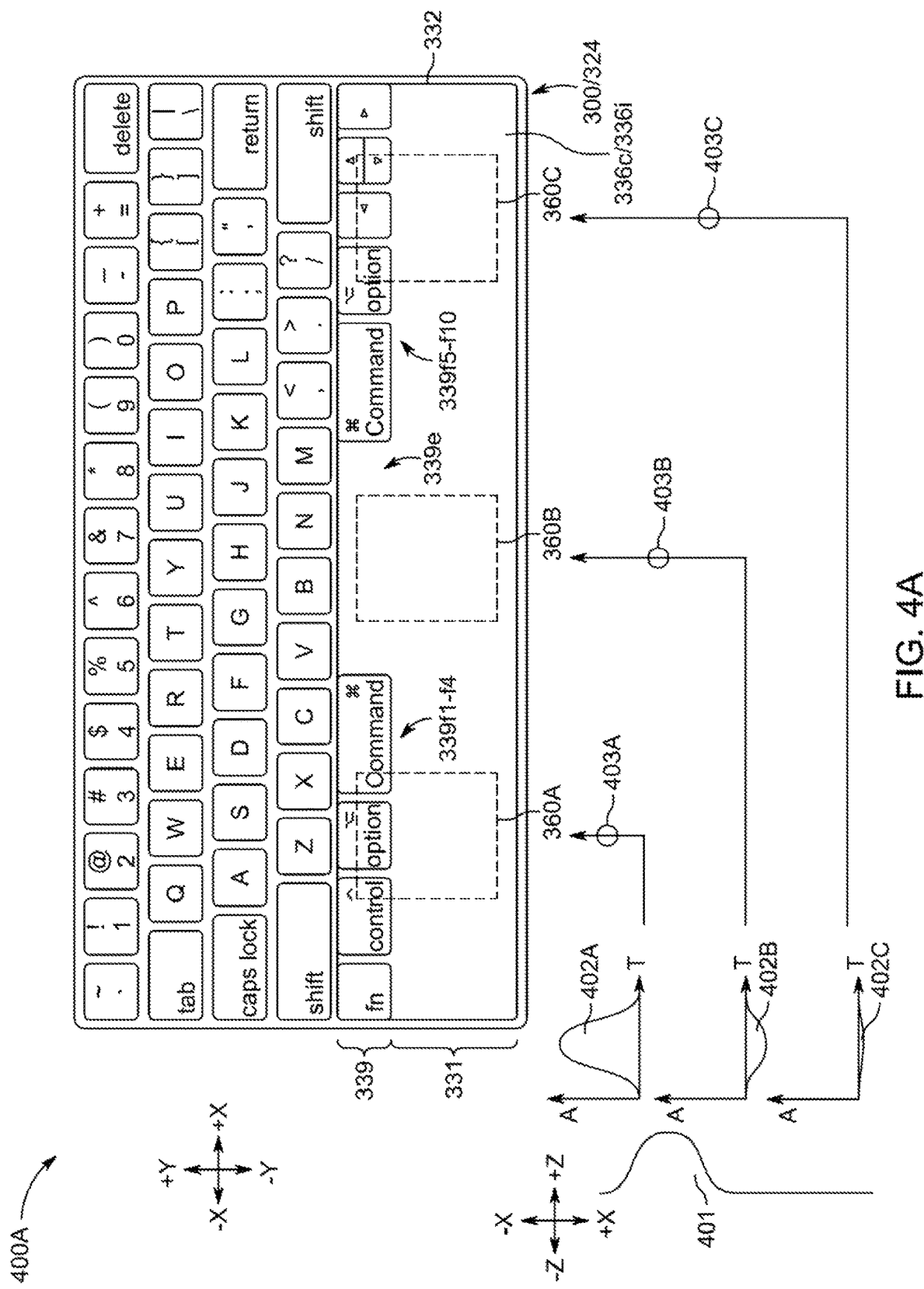
FIGS. 4A and 4B are top views of the electronic device of FIGS. 3-3D, illustrating various situations that may be enabled by various haptic actuator driving processes, in accordance with some embodiments.
Figure 4B:
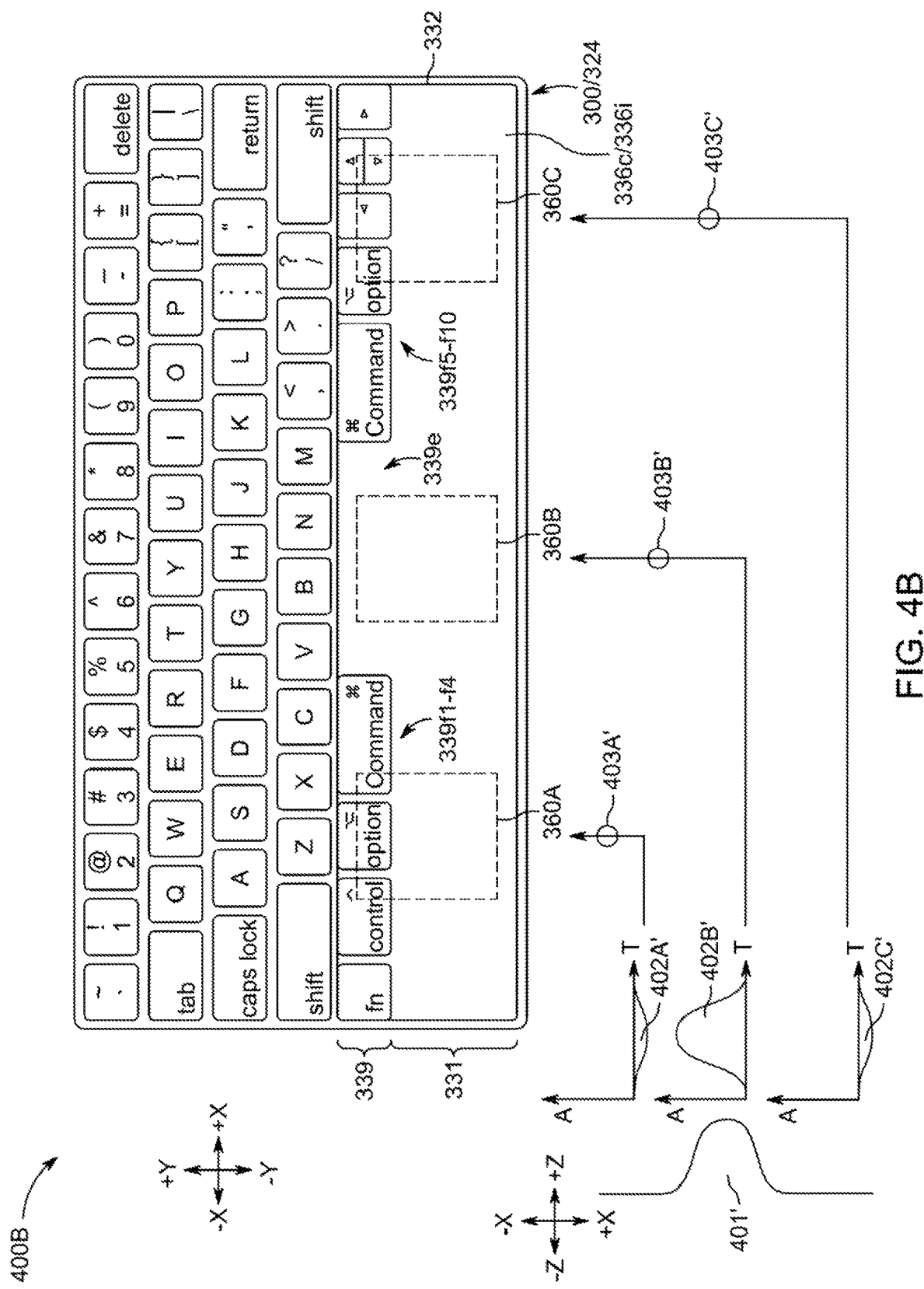

For example, as shown in FIG. 4A, first haptic actuator 360A may be driven by first control signal 403A having first waveform 402A (e.g., large rising then falling positive actuation) at the same time as second haptic actuator 360B may be driven by second control signal 403B having second waveform 402B (e.g., medium falling then rising negative actuation) and at the same time as third haptic actuator 360C may be driven by third control signal 403C having third waveform 402C (e.g., small falling then rising negative actuation), such that the combined effect may be to provide a resulting mechanical response with haptic feedback targeting only the left side of trackpad component 336c (e.g., the left side (e.g., −X side) portion of trackpad section 331 and a portion of one or more left side function key portions (e.g., function key portions 339f2-339f4)) and little to no haptic feedback provided at the central or right sides of trackpad component 336c, as may be indicated by overall feedback surface profile graph 401. This may be useful for providing haptic feedback indicative of a user key press event of one of function key portions 339f1-339f4 and/or a click event at a left side portion of trackpad section 331. As another example, as shown in FIG. 4B, first haptic actuator 360A may be driven by first control signal 403A having a first waveform 402A' (e.g., medium falling then rising negative actuation) at the same time as second haptic actuator 360B may be driven by a second control signal 403B' having a second waveform 402B' (e.g., large rising then falling positive actuation) and at the same time as third haptic actuator 360C may be driven by a third control signal 403C' having a third waveform 402C' (e.g., medium falling then rising negative actuation), such that the combined effect may be to provide a resulting mechanical response with haptic feedback targeting only the center portion of trackpad component 336c and little to no haptic feedback provided at either the left or right side portions of trackpad component 336c, as may be indicated by overall feedback surface profile graph 401' This may be useful for providing haptic feedback indicative of a user key press event of the space bar at extension portion 339e and/or a click event at a central portion of trackpad section 331 by a left index finger that may be felt by that left index finger but that may not also be felt by a right palm resting on another portion (e.g., right side portion) of trackpad section 336. Each waveform and its amplitude may be designed based on mechanical modeling of the trackpad stack and may be calibrated during manufacturing for a particular haptic response. Therefore, a plurality of spatially separated actuators driven by individual waveforms may combine to enable such targeted haptic feedback with a mechanical response confined to a desired spatial region and stationary in other regions. It is to be understood that any suitable number of actuators may be spatially separated in any suitable arrangement under or otherwise adjacent trackpad component 336c. For example, a different actuator could be positioned under each one of function key portions 339f1-339f10 and three different actuators could be positioned under extension portion 339e.

Figure 6:
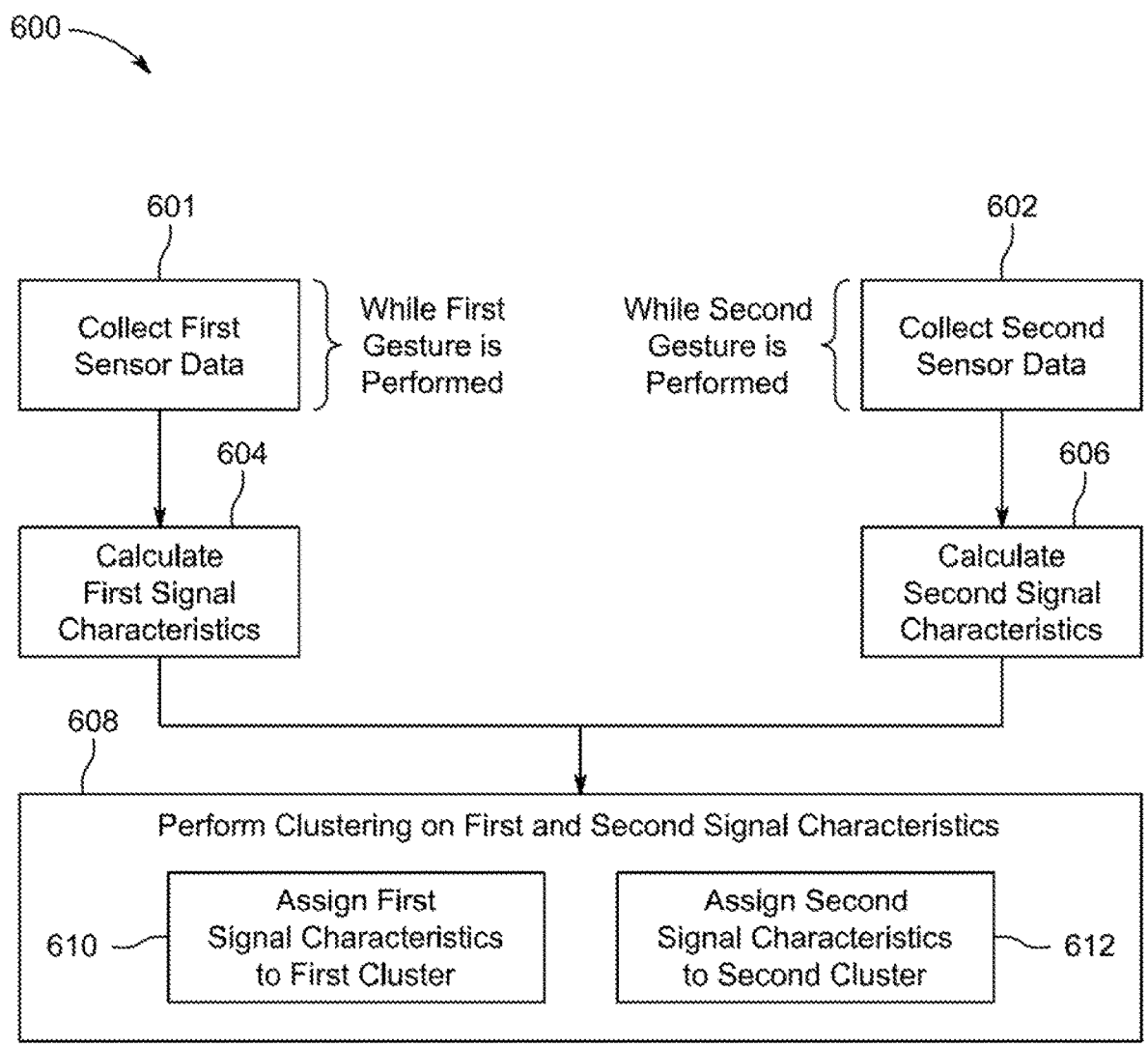
FIGS. 6-9 are flowcharts of illustrative processes for handling user input gestures on an electronic device, in accordance with some embodiments.

FIG. 6 is a flowchart of an illustrative process 600 for training an electronic device for user input gesture detection. Any suitable user interface information may be presented to a user of an electronic device (e.g., any one of devices 100-100''' and/or device 300 and/or the like) or of a proximate training system in order to prompt the user to perform a particular user input gesture on an interface system of the electronic device (e.g., on trackpad region 336 of device 300). For example, a user interface requesting performance of a first user input gesture may be presented to the user during a first period of time (e.g., visually (e.g., via display 121) and/or audibly and/or tactilely) and sensor data may be collected during the first period while the user interface is presented and/or during another period after the user interface is presented while the user may perform the requested gesture. Additional user interfaces may be presented to prompt a user to perform additional user input gestures during additional periods of time to train for detection of the additional gestures. For example, any suitable sensor data, including touch sensor data and/or force sensor data and/or the like, can be collected while the user performs various user input gestures, for example, to train a gesture detection algorithm. At operation 601 of process 600, during a first period in which a user performs a first user input gesture on an interface system of an electronic device (e.g., when prompted by any suitable user interface), a system (e.g., the electronic device itself or a training system) may collect any suitable first sensor data (e.g., touch data from one, some, or each touch sensor of the device, force data from one, some, or each force sensor of the device, and/or any other suitable data from any other suitable sensor(s) of the device (e.g., any suitable touch and/or force sensor data from sensor assembly 140 of device 100 and/or from sensor assembly 340 of device 300)). At operation 602, during a second period in which a user performs a second user input gesture on the interface system of the electronic device (e.g., when prompted by any suitable user interface), a system (e.g., the electronic device itself or a training system) may collect any suitable second sensor data (e.g., touch data from one, some, or each touch sensor of the device, force data from one, some, or each force sensor of the device, and/or any other suitable data from any other suitable sensor(s) of the device (e.g., any suitable touch and/or force sensor data from sensor assembly 140 of device 100 and/or from sensor assembly 340 of device 300)). The first and second gestures may be any suitable different user inputs, such as a right thumb press on extension portion 339e, a left thumb press on extension portion 339e, a right index finger press on key portion 339f10, a left index finger press on key portion 339f1, a right index finger click on extension portion 339e, a left index finger click on extension portion 339e, a right index finger swipe on extension portion 339e, a left index finger swipe on extension portion 339e, a right index finger swipe on section 331, a left index finger swipe on section 331, a right thumb swipe on section 331, a left thumb swipe on section 331, and/or the like. At operation 604 of process 600, any suitable first signal characteristic(s) may be extracted from the first sensor data collected at operation 601 (e.g., shape of touch event, peak force amplitude, force amplitude difference between adjacent peak and trough, length of touch area (e.g., length of user's digit print detected on trackpad region), width of touch area (e.g., width of user's digit print detected on trackpad region), ratio of length of touch area to width of touch area, touch area of user's digits in a keyboard area (e.g., region 334) versus a hybrid area (e.g., region 339), any suitable force data, force applied by event, plot of force applied by event over time, location of event on input region, current status of any running application (e.g., current status of word processing application being used by user, etc.), and/or the like). At operation 606 of process 600, any suitable second signal characteristic(s) may be extracted from the second sensor data collected at operation 602 (e.g., shape of touch event, peak force amplitude, force amplitude difference between adjacent peak and trough, length of touch area (e.g., length of user's digit print detected on trackpad region), width of touch area (e.g., width of user's digit print detected on trackpad region), ratio of length of touch area to width of touch area, touch area of user's digits in a keyboard area (e.g., region 334) versus a hybrid area (e.g., region 339), any suitable force data, force applied by event, plot of force applied by event over time, location of event on input region, current status of any running application (e.g., current status of word processing application being used by user, etc.), and/or the like). At operation 608 of process 600, any suitable clustering may be performed on the first signal characteristic(s) calculated at operation 604 and on the second signal characteristic(s) calculated at operation 606 (e.g., a k-means clustering algorithm or any other suitable clustering algorithm). For example, at operation 610 of process 600, any suitable clustering algorithm may assign one, some, or each first signal characteristic to a first cluster of signal characteristics, and, at operation 612 of process 600, the clustering algorithm may assign one, some, or each second signal characteristic to a second cluster of signal characteristics.

It is understood that the operations shown in process 600 of FIG. 6 are only illustrative and that existing operations may be modified or omitted, additional operations may be added, and the order of certain operations may be altered. In some examples, the device or any suitable training system can assign each cluster to one of the user input gestures as part of the training process. For example, the device/system may be operative to compare the first cluster to the second cluster. Then, based on comparing the first cluster to the second cluster, the device/system may be operative to determine that there are more of the first signal characteristics assigned to the first cluster than to the second cluster. In accordance with such a determination that there are more of the first signal characteristics assigned to the first cluster than to the second cluster, the device/system may be operative to assign the first cluster to the first user input gesture. Similarly, based on comparing the first cluster to the second cluster, the device/system may be operative to determine that there are more of the second signal characteristics assigned to the second cluster than to the first cluster. In accordance with such a determination that there are more of the second signal characteristics assigned to the second cluster than to the first cluster, the device/system may be operative to assign the second cluster to the second user input gesture. In some examples, the clustering process can be seeded by initially clustering the signal characteristics based on the time period in which the data was collected. For example, the first cluster can be initially assigned all the signal characteristics corresponding to the first period during which the first user input gesture was performed, and the second cluster can be initially assigned all the signal characteristics corresponding to the second period during which the second user input gesture was performed. Following this initial assignment, a clustering algorithm (e.g., k-means clustering) can be performed to optimize the clusters, potentially moving some points from the first cluster to the second cluster, moving some points from the second cluster to the first cluster, and/or moving some points from the first and second clusters to other clusters. In some examples, the device/system may be operative to generate a template for each of the first and second user input gestures to aid in the gesture detection process. For example, the device/system may be operative to calculate first mean signal characteristics for the first cluster (e.g., as part of a k-means clustering process), and the first mean signal characteristics may be used as a template for the first cluster. Similarly, the device/system may be operative to calculate second mean signal characteristics for the second cluster (e.g., as part of a k-means clustering process), and the second mean signal characteristics may be used as a template for the second cluster. In another example, some or all of the first sensor data may be stored as the first template for the first cluster, and some or all of the second sensor data may be stored as the second template for the second cluster. In some examples, a generic template for each gesture may be stored and used as a starting point for the training process before any user-specific data has been collected. Then, each template can be adjusted based on user-specific data collected during training. Any such template and/or cluster data may be stored by the device/system (e.g., as user input gesture cluster data 105 of memory assembly 104). In some examples, additional training can be conducted to train the device to detect when the user is not performing either the first gesture or the second gesture. The system may be operative to collect additional sensor data during a period in which the user does not perform the first gesture or the second gesture. Signal characteristics can be calculated based on the additional sensor data, and these signal characteristics can be assigned to a third cluster. The third cluster can be a cluster that is associated with some third gesture (e.g., if the user performed a third gesture during the training period) or it can be a cluster that is not associated with any gesture. This process may be at least partially repeated for any number of gestures during any suitable time periods during which various external/ambient attributes/conditions may be varied, such as the user itself (e.g., age of the user, size of the user's hands, strength of the user's fingers, etc.), such that operation 608 may be effective for clustering signal characteristics for different gestures no matter the conditions. Such training may be done for one or more test devices using one or more different test users and any suitable input gestures, and then the training results (e.g., model(s) 105$m$ and/or any other suitable data 105) may be loaded onto or otherwise made accessible to any device to be used by an end user.

Figure 7:
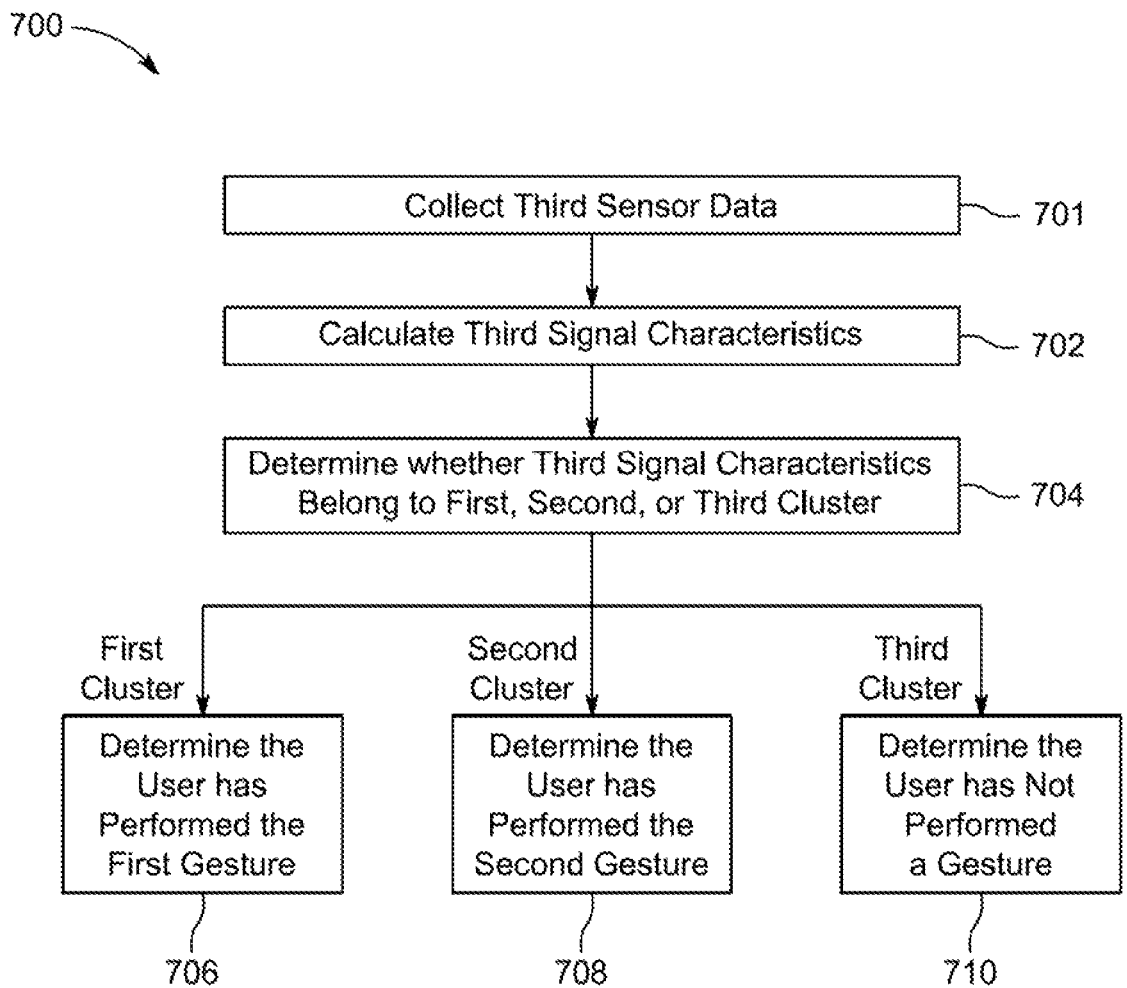

FIG. 7 is a flowchart of an illustrative process 700 for monitoring a user of an electronic device by detecting a user input gesture. For example, after any suitable training or other suitable process for generating and/or acquiring any suitable user input gesture template and/or cluster data (e.g., user input gesture cluster data 105), one or more user input gestures can be detected by collecting new sensor data and then using the clusters associated with each gesture of the cluster data to determine if one of the gestures has been performed. For example, at operation 701 of process 700, during a third period (e.g., during use of a user electronic device after process 600 has been performed (e.g., after user input gesture cluster data has been made accessible to the device)), an electronic device (e.g., any one of devices 100-100''' and/or device 300 and/or the like) may collect third sensor data from one, some, or each available sensor assembly of the device (e.g., touch data from one, some, or each touch sensor of the device, force data from one, some, or each force sensor of the device, and/or any other suitable data from any other suitable sensor(s) of the device (e.g., any suitable touch and/or force sensor data from sensor assembly 140 of device 100 and/or from sensor assembly 340 of device 300)). At operation 702 of process 700, any suitable third signal characteristic(s) may be extracted from the third sensor data collected at operation 701 (e.g., shape of touch event, peak force amplitude, force amplitude difference between adjacent peak and trough, length of touch area (e.g., length of user's digit print detected on trackpad region), width of touch area (e.g., width of user's digit print detected on trackpad region), ratio of length of touch area to width of touch area, touch area of user's digits in a keyboard area (e.g., region 334) versus a hybrid area (e.g., region 339), any suitable force data, force applied by event, plot of force applied by event over time, location of event on input region, current status of any running application (e.g., current status of word processing application being used by user, etc.), and/or the like). At operation 704 of process 700, to perform gesture detection, the device may determine whether the third signal characteristics calculated at operation 702 belong to a first cluster (e.g., as may be defined by any accessible first cluster data (e.g., as may be defined at operation 610)), a second cluster (e.g., as may be defined by any accessible second cluster data (e.g., as may be defined at operation 612)), or a third cluster or any other cluster that may have previously been clustered (e.g., at operation 608). The third cluster can be a cluster that is associated with some third gesture, different from the first gesture associated with the first cluster and different from the second gesture associated with the second cluster, or it can be a cluster that is not associated with any gesture. Based on determining which cluster the third signal characteristics belong to, the device may detect the first gesture, the second gesture, or no gesture. For example, in accordance with a determination at operation 704 that the third signal characteristics belong to the first cluster (e.g., a cluster associated with a first user input gesture), the device may determine at operation 706 that the user has performed the first user input gesture. In accordance with a determination at operation 704 that the third signal characteristics belong to the second cluster (e.g., a cluster associated with a second user input gesture), the device may determine at operation 708 that the user has performed the second user input gesture. In accordance with a determination at operation 704 that the third signal characteristics belong to the third cluster (e.g., a cluster associated with some third gesture or no gesture whatsoever), the device may determine at operation 710 that the user has not performed either the first user input gesture or the second user input gesture.

It is understood that the operations shown in process 700 of FIG. 7 are only illustrative and that existing operations may be modified or omitted, additional operations may be added, and the order of certain operations may be altered. In some examples, determining whether the third signal characteristics belong to the first cluster, the second cluster, or the third cluster may include performing clustering (e.g., a k-means clustering algorithm, or other clustering algorithm) on the third signal characteristics with respect to the first, second, and third clusters. The cluster membership of the third signal characteristics may be determined by the results of the clustering. In some examples, determining whether the third signal characteristics belong to the first cluster, the second cluster, or the third cluster may include comparing the third signal characteristics to first, second, and/or third templates corresponding to the first, second, and third clusters, respectively. The device may thereby be operative to determine whether the third signal characteristics are closer to the first cluster or the second cluster based on the templates. For example, if each template includes mean signal characteristics, then the device may be operative to calculate a first distance from the third signal characteristics to the first template (e.g., the first mean signal characteristics of the first cluster) and calculate a second distance from the third signal characteristics to the second template (e.g., the second mean signal characteristics of the second cluster). As just one example, the distance calculation can be a Euclidean distance calculation between two points in multi-dimensional space. In accordance with a determination that the first distance is shorter than the second distance, the device may be operative to determine that the third signal characteristics belong to the first cluster. In accordance with a determination that the second distance is shorter than the first distance, the device may be operative to determine that the third signal characteristics belong to the second cluster. In some examples, the device may also be operative to compare the third signal characteristics to a third template in the same manner, or, if both the first and second distances are longer than a predetermined threshold distance, the device may be operative to determine that the third signal characteristics belong to a third cluster by default. Based on determining which cluster the third signal characteristics belong to, the device may then be operative to detect the first gesture, the second gesture, or no gesture (e.g., at operations 706, 708, and/or 710). After detecting the first gesture or the second gesture, the device may be operative to perform an operation associated with the detected gesture. For example, if the device detects the first gesture, the system may be operative to perform an operation in response, such as adjusting a function or display of an application, generating certain haptic feedback, and/or any other suitable functionality (e.g., the device may determine and share a determined user input gesture as at least a portion of sensor mode data 524 with at least one managed element 590 of the device at least partially based on the received sensor state data 522 (e.g., third signal characteristics), where such sensor mode data 524 may be received by managed element 590 for controlling at least one characteristic of managed element 590). In some examples, sensor data (e.g., the first, second, or third sensor data described above) can be further processed before extracting signal characteristics (e.g., the first, second, or third signal characteristics described above). For example, a band pass filter may be applied to sensor data to filter out certain frequencies from the sensor data.

The above provides just a few examples as to how user input gesture template and/or cluster data (e.g., user input gesture cluster data 105) may be obtained and/or used to determine an appropriate user input gesture of a user interacting with an input interface of an electronic device (e.g., trackpad region 336 of device 300). For example, a user input gesture model may be developed and/or generated (e.g., as user input gesture data 105) for use in evaluating and/or predicting and/or estimating and/or determining a particular user input gesture for a particular type of device by a particular user (e.g., for an experiencing entity (e.g., a particular user or a particular subset or type of user or all users generally (e.g., using a particular type of device))). For example, a user input gesture model may be a learning engine for any experiencing entity, such as for a particular device type and for any general user and/or for a particular user (e.g., with a particular hand size and/or finger sized and/or thumb sizes shape and/or particular gesture mannerisms), where the learning engine may be operative to use any suitable machine learning to use certain sensor data (e.g., one or more various types or categories of sensor data that may be detected by any suitable sensor assembly(ies) of the device (e.g., touch data from one, some, or each touch sensor of the device, force data from one, some, or each force sensor of the device, and/or any other suitable data from any other suitable sensor(s) of the device (e.g., any suitable touch and/or force sensor data from sensor assembly 140 of device 100 and/or from sensor assembly 340 of device 300)) in order to predict, estimate, and/or otherwise determine a current input gesture of the user. For example, the learning engine may include any suitable neural network (e.g., an artificial neural network) that may be initially configured, trained on one or more sets of sensor data that may be generated during the performance of one or more known input gestures, and then used to predict a particular user input gesture based on another set of sensor data. A neural network or neuronal network or artificial neural network may be hardware-based, software-based, or any combination thereof, such as any suitable model (e.g., an analytical model, a computational model, etc.), which, in some embodiments, may include one or more sets or matrices of weights (e.g., adaptive weights, which may be numerical parameters that may be tuned by one or more learning algorithms or training methods or other suitable processes) and/or may be capable of approximating one or more functions (e.g., non-linear functions or transfer functions) of its inputs. The weights may be connection strengths between neurons of the network, which may be activated during training and/or prediction. A neural network may generally be a system of interconnected neurons that can compute values from inputs and/or that may be capable of machine learning and/or pattern recognition (e.g., due to an adaptive nature). A neural network may use any suitable machine learning techniques to optimize a training process. The neural network may be used to estimate or approximate functions that can depend on a large number of inputs and that may be generally unknown. The neural network may generally be a system of interconnected "neurons" that may exchange messages between each other, where the connections may have numeric weights (e.g., initially configured with initial weight values) that can be tuned based on experience, making the neural network adaptive to inputs and capable of learning (e.g., learning pattern recognition). A suitable optimization or training process may be operative to modify a set of initially configured weights assigned to the output of one, some, or all neurons from the input(s) and/or hidden layer(s). A non-linear transfer function may be used to couple any two portions of any two layers of neurons, including an input layer, one or more hidden layers, and an output (e.g., an input to a hidden layer, a hidden layer to an output, etc.). Different input neurons of the neural network may be associated with respective different types of sensor data categories and may be activated by sensor data of the respective sensor data categories (e.g., any suitable location or touch data, such as shape of a user's input gesture (e.g., length of touch area (e.g., length of user's digit print detected on trackpad region), width of touch area (e.g., width of user's digit print detected on trackpad region), ratio of length of touch area to width of touch area, etc.), location of a user's touch on input region, touch area of user's digits in a keyboard area (e.g., region 334) versus a hybrid area (e.g., region 339), and/or the like, any suitable force data (e.g., force applied by a user's input gesture, plot of force applied by input gesture over time, etc.), current status of any running application (e.g., current status of word processing application being used by user, etc.), and/or the like, each of which may be associated with one or more particular respective input neurons of the neural network and sensor category data for each particular sensor category may be operative to activate the associated input neuron(s)). The weight assigned to the output of each neuron may be initially configured (e.g., at operation 802 of process 800 of FIG. 8) using any suitable determinations that may be made by a custodian or processor (e.g., device 100) of the user input gesture or sensor model (e.g., user input gesture data 105) based on the data available to that custodian.

The initial configuring of the learning engine or user input gesture model for the experiencing entity (e.g., the initial weighting and arranging of neurons of a neural network of the learning engine) may be done using any suitable data accessible to a custodian of the user input gesture model (e.g., a manufacturer of device 100 or of a portion thereof (e.g., a model 105m of user input gesture data 105), and/or the like), such as data associated with the configuration of other learning engines (e.g., learning engines or user input gesture models for similar experiencing entities), data associated with the experiencing entity (e.g., initial background data accessible by the model custodian about the experiencing entity's composition, size, shape, age, any suitable biometric information, past experiences, and/or the like), data assumed or inferred by the model custodian using any suitable guidance, and/or the like. For example, a model custodian may be operative to capture any suitable initial background data about the experiencing entity in any suitable manner, which may be enabled by any suitable user interface provided to the device or any appropriate subsystem accessible to one, some, or each experiencing entity (e.g., a model app or website). The model custodian may provide a data collection portal for enabling any suitable entity to provide initial background data for the experiencing entity. The data may be uploaded in bulk or manually entered in any suitable manner. In a particular embodiment where the experiencing entity is a particular user or a group of users, the following is a list of just some of the one or more potential types of data that may be collected by a model custodian (e.g., for use in initially configuring the model): sample questions for which answers may be collected may include, but are not limited to, questions related to an experiencing entity's age, hand shape of each hand, shape of each thumb, shape of each finger, and/or the like.

A user input gesture model custodian may receive from the experiencing entity (e.g., at operation 804 of process 800 of FIG. 8) not only device sensor category data for at least one device sensor category for a gesture that the experiencing entity is currently experiencing or conducting or carrying out, but also a score for that gesture experience (e.g., a score that the experiencing entity may supply as an indication of the gesture that the experiencing entity experienced from experiencing the gesture). This may be enabled by any suitable user interface provided to any suitable experiencing entity by any suitable user input gesture model custodian (e.g., a user interface app or website that may be accessed by the experiencing entity). The user input gesture model custodian may provide a data collection portal for enabling any suitable entity to provide such data. The score (e.g., user input gesture score) for the gesture may be received and may be derived from the experiencing entity in any suitable manner. For example, a single questionnaire or survey may be provided by the model custodian for deriving not only experiencing entity responses with respect to user input sensor category data for a gesture, but also an experiencing entity score for (e.g., identification of the type of) the gesture. The model custodian may be configured to provide best practices and standardize much of the evaluation, which may be determined based on the experiencing entity's goals and/or objectives as captured before the gesture may have been experienced. In some embodiments, in order to train one or more models, a user may manually or actively provide information to the device that is indicative of one or more gestures known by the user to have been carried out by the user, where such information may be used to define one or more outputs of one or more models (e.g., information indicative of a particular gesture that the user intentionally carried out while user input sensor data was collected by the device, such as pressing a virtual space bar key of extension portion 339e with a right thumb, clicking a portion of trackpad section 331 with a left index finger, swiping from a portion of trackpad section 331 to a section of extension portion 339e with a right index finger, pressing function key portion 339f4 with a left index finger, pressing function key portion 339f7 with a right thumb, clicking a portion of trackpad section 331 with a left thumb, and/or the like).

A learning engine or user input gesture model for an experiencing entity may be trained (e.g., at operation 806 of process 800 of FIG. 8) using the received sensor category data for the gesture (e.g., as inputs of a neural network of the learning engine) and using the received score for the gesture (e.g., as an output of the neural network of the learning engine). Any suitable training methods or algorithms (e.g., learning algorithms) may be used to train the neural network of the learning engine, including, but not limited to, Back Propagation, Resilient Propagation, Genetic Algorithms, Simulated Annealing, Levenberg, Nelder-Meade, and/or the like. Such training methods may be used individually and/or in different combinations to get the best performance from a neural network. A loop (e.g., a receipt and train loop) of receiving sensor category data and a score for a gesture and then training the user input gesture model using the received sensor category data and score (e.g., a loop of operation 804 and operation 806 of process 800 of FIG. 8) may be repeated any suitable number of times for the same experiencing entity and the same learning engine for more effectively training the learning engine for the experiencing entity, where the received sensor category data and the received score received of different receipt and train loops may be for different gestures or for the same gesture (e.g., at different times) and/or may be received from the same source or from different sources of the experiencing entity (e.g., from different users of the same or a similar device) (e.g., a first receipt and train loop may include receiving sensor category data and a score from a first user of a first age with respect to that user's experience with a first gesture (e.g., virtual space bar thumb press), while a second receipt and train loop may include receiving sensor category data and a score from a second user of a second age with respect to that user's experience with that first gesture, while a third receipt and train loop may include receiving sensor category data and a score from a third user of the first age with respect to that user's experience with a second gesture (e.g., swiping from a portion of trackpad section 331 to a section of extension portion 339e with a right index finger), and/or the like), while the training of different receipt and train loops may be done for the same learning engine using whatever sensor category data and score was received for the particular receipt and train loop. The number and/or type(s) of the one or more sensor categories for which sensor category data may be received for one receipt and train loop may be the same or different in any way(s) than the number and/or type(s) of the one or more sensor categories for which sensor category data may be received for a second receipt and train loop.

A user input gesture model custodian may access (e.g., at operation 808 of process 800 of FIG. 8) sensor category data for at least one sensor category for another gesture that is different than any gesture considered at any sensor category data receipt of a receipt and train loop for training the learning engine for the experiencing entity. In some embodiments, this other gesture may be a gesture that has not been specifically experienced by any experiencing entity prior to use of the gesture model in an end user use case. Although, it is to be understood that this other gesture may be any suitable gesture. The sensor category data for this other gesture may be accessed from or otherwise provided by any suitable source(s) using any suitable methods (e.g., from one or more sensor assemblies of the device) for use by the gesture model custodian (e.g., processor assembly 102 of device 100).

This other gesture (e.g., gesture of interest) may then be scored (e.g., at operation 810 of process 800 of FIG. 8) using the learning engine or gesture model for the experiencing entity with the sensor category data accessed for such another gesture. For example, the sensor category data accessed for the gesture of interest may be utilized as input(s) to the neural network of the learning engine (e.g., at operation 810 of process 800 of FIG. 8) similarly to how the sensor category data accessed at a receipt portion of a receipt and train loop may be utilized as input(s) to the neural network of the learning engine at a training portion of the receipt and train loop, and such utilization of the learning engine with respect to the sensor category data accessed for the gesture of interest may result in the neural network providing an output indicative of a gesture score or gesture level or gesture state that may represent the learning engine's predicted or estimated gesture to have been experienced by the experiencing entity.

Figure 5:
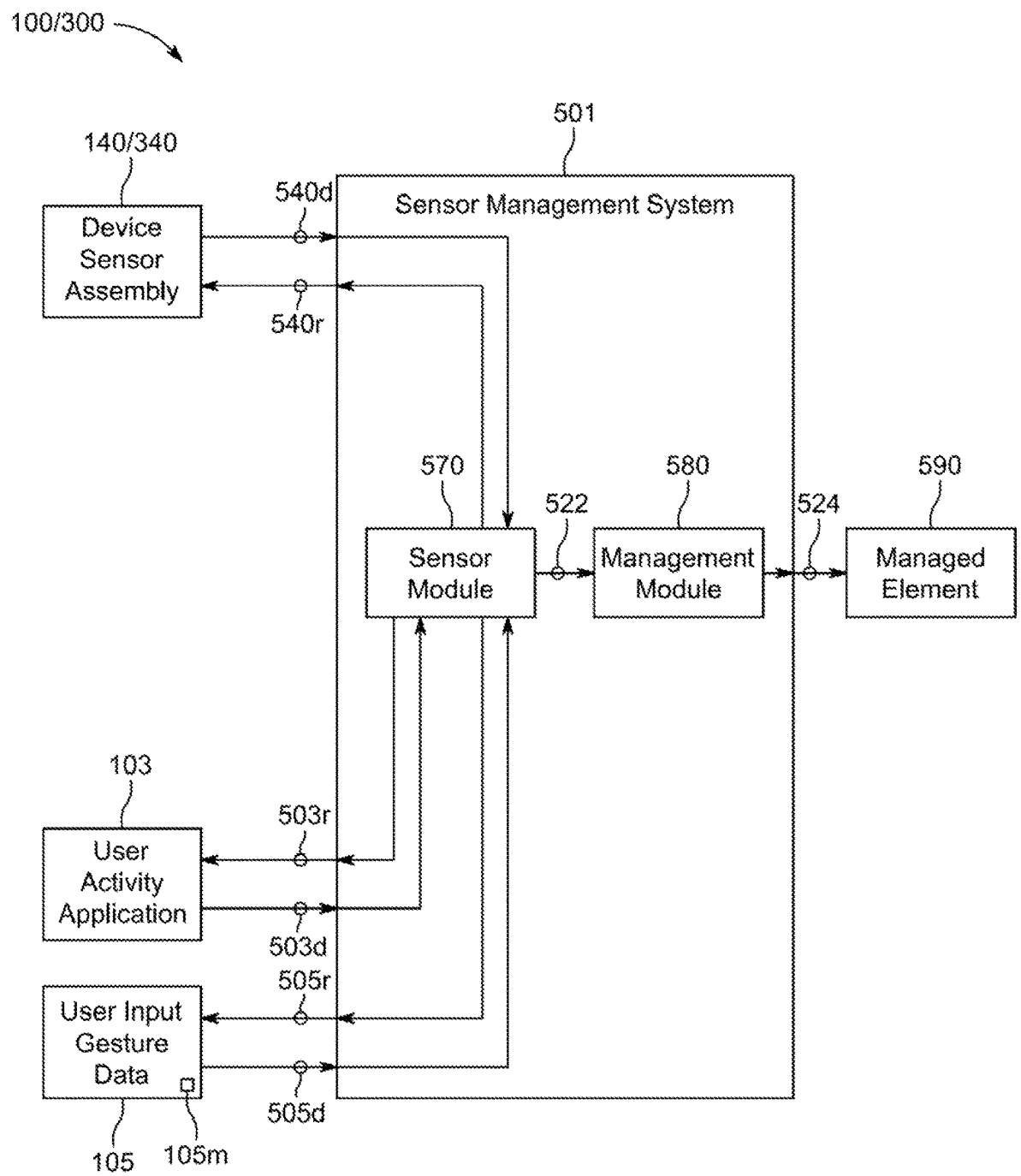
FIG. 5 is a schematic view of an illustrative portion of any of the electronic devices of FIGS. 1-4B, in accordance with some embodiments.

After a gesture score (e.g., any suitable gesture state data (e.g., gesture state data or user state data or sensor state data 522 of FIG. 5)) is determined (e.g., estimated or predicted by the model) for a gesture of interest (e.g., for a current gesture being experienced by an experiencing entity (e.g., for a particular time and/or during a particular activity)), it may be determined (e.g., at operation 812 of process 800 of FIG. 8) whether the realized gesture score satisfies a particular condition of any suitable number of potential conditions, and, if so, the model custodian or any other suitable processor assembly or otherwise (e.g., of device 100 or device 300) may generate any suitable control data (e.g., sensor mode data (e.g., sensor mode data 524 of system 501 of FIG. 5)) that may be associated with that satisfied condition for controlling any suitable functionality of any suitable assembly of device 100 or of device 300 or otherwise (e.g., for adjusting a user interface presentation to a user (e.g., to present an indication of a glyph associated with a pressed space bar key or of a function associated with a pressed function key or of a swipe or drag function (e.g., move cursor or advance to a new screen) associated a swipe or drag on a trackpad), and/or the like) and/or for controlling any suitable functionality of any suitable sensor assembly of device 100 or otherwise (e.g., for turning on or off a particular type of sensor and/or for adjusting the functionality (e.g., the accuracy) of a particular type of sensor (e.g., to gather any additional suitable sensor data)), and/or the like). A gesture score may be indicative of a probability of one or more gestures having been intended or carried out (e.g., voluntarily and/or involuntarily) or endured by the experiencing entity and/or of a characteristic of one or more gestures. For example, a score may be indicative of 90% likelihood that the user pressed a virtual space bar at extension portion 339e with a right thumb. As just one other example, a score may be indicative of 83% likelihood that the user clicked a portion of extension portion 339e with a right index finger. In some embodiments, a first model may be trained and later used to score a first type of gesture while a second model may be trained and later used to score a second type of gesture. Certain types or all types of sensor data for a particular moment may be provided as inputs to certain ones or to each available gesture model, such that various models may each provide a respective output score for that moment, where each output score may be analyzed with respect to one or more different respective conditions depending on the type of model providing the output score. For example, all various sensor data generated when a user acts a certain way during a certain moment may be provided as inputs to one or more different models, each of which may generate a different output score, each of which may be compared to one or more different conditions, for determining one or more gestures or gesture conditions most likely to have been carried out or endured or experienced by the user during that moment. For example, a first model may be a right thumb model to determine a likelihood of whether the user input was made by a right thumb, a second model may be a left thumb model to determine a likelihood of whether the user input was made by a left thumb, a third model may be a right index finger model to determine a likelihood of whether the user input was made by a right index finger, a fourth model may be a left index-middle finger model to determine a likelihood of whether the user input was made by a combination of a left index finger and a left middle finger, a fifth model may be a key press model to determine a likelihood of whether the user input was a key press event, a sixth model may be a trackpad click model to determine a likelihood of whether the user input was a trackpad click, and/or the like. Alternatively, a single model may be used in order to determine whether the user input was made by a thumb (e.g., either a right thumb or a left thumb) or by a non-thumb (e.g., any finger on the right hand or any finger on the left hand). A certain condition may be defined by a certain threshold (e.g., a determined likelihood of a right thumb gesture on portion 339e being at least 90% or a determined likelihood of a right index finger gesture on portion 339e being at least 85%, etc.) above which the predicted gesture score(s) ought to result in an adjusted device functionality being provided to the experiencing entity. A threshold score or condition may be defined or otherwise determined (e.g., dynamically) in any suitable manner and may vary between different experiencing entities and/or between different gestures of interest and/or between different combinations of such experiencing entities and gestures and/or in any other suitable manner.

In some embodiments, a gesture model custodian may be operative to compare a predicted gesture score for a particular gesture of interest with an actual experiencing entity provided gesture score for the particular gesture of interest that may be received after or while the experiencing entity may be actually experiencing the gesture of interest and enabled to actually score the gesture of interest (e.g., using any suitable user behavior information, which may or may not include an actual user provided score feedback). Such a comparison may be used in any suitable manner to further train the learning engine and/or to specifically update certain features (e.g., weights) of the learning engine. For example, any algorithm or portion thereof that may be utilized to determine a gesture score may be adjusted based on the comparison. A user (e.g., experiencing entity (e.g., an end user of device 100)) may be enabled by the gesture model custodian to adjust one or more filters, such as a profile of gestures they prefer to or often experience and/or any other suitable preferences or user profile characteristics (e.g., hand size, finger preference, force preference per digit, etc.) in order to achieve such results. This capability may be useful based on changes in an experiencing entity's capabilities and/or objectives as well as the gesture score results. For example, if a user loses its ability to use its thumb or is wearing a band-aid on the thumb that might impact sensor data, this information may be provided to the model custodian, whereby one or more weights of the model may be adjusted such that the model may provide appropriate scores in the future.

Therefore, any suitable gesture model custodian may be operative to generate and/or manage any suitable gesture model or gesture learning engine that may utilize any suitable machine learning, such as one or more artificial neural networks, to analyze certain gesture data (e.g., user input sensor data) of a performed or detected gesture to predict/estimate the gesture score or intended gesture of that performed gesture for a particular user (e.g., generally, and/or at a particular time, and/or with respect to one or more planned activities (e.g., while a word processing application is being interacted with by the user, while a media playback application is being interacted with by the user, and/or the like), which may enable intelligent suggestions be provided to the user and/or intelligent system functionality adjustments be made for improving the user's experiences. For example, a gesture engine may be initially configured or otherwise developed for an experiencing entity based on information provided to a model custodian by the experiencing entity that may be indicative of the experiencing entity's specific preferences for different gestures and/or gesture types (e.g., generally and/or for particular times and/or for particular planned activities) and/or of the experiencing entity's specific experience with one or more specific gestures. An initial version of the gesture engine for the experiencing entity may be generated by the model custodian based on certain assumptions made by the model custodian, perhaps in combination with some limited experiencing entity-specific information that may be acquired by the model custodian from the experiencing entity prior to using the gesture engine, such as the experiencing entity's hand size, typing proficiency, and/or the like. The initial configuration of the gesture engine may be based on data for several user input sensor categories, each of which may include one or more specific user input sensor category data values, each of which may have any suitable initial weight associated therewith, based on the information available to the model custodian at the time of initial configuration of the engine (e.g., at operation 802 of process 800 of FIG. 8). As an example, a user input sensor category may be force detected by a force sensor, and the various specific user input sensor category data values for that user input sensor category may include any force less than A force, any force between B force and C force, any force between C force and D force, and/or the like, each of which may have a particular initial weight associated with it.

It is to be understood that device 100, device 300, or any other suitable device or remote system accessible thereto (e.g., via communications component 106) may be a model custodian for at least a portion or all of one or more gesture models (e.g., of gesture data 105). A particular model (e.g., a particular one of one or more gesture models 105*m* of gesture data 105) may be for one or more particular users and/or one or more particular devices and/or one or more particular gestures.

To accurately determine a user input gesture of a user on a device, the device may be configured to use various information sources in combination with any available user input gesture data 105 (e.g., any suitable one or more gesture models) in order to classify or predict a current user input gesture of the user. For example, any suitable processing circuitry or input assembly (e.g., a sensor assembly) of the device may be configured to gather and to process various types of sensor data, in conjunction with user input gesture data 105, to determine what type of user input gesture has been performed or is being performed by the user. For example, any suitable sensor data from one or more of any or each sensor assembly of the device, and any application data of any application being run by the device (e.g., current state of a word processing application being presented to the user, etc.) may be utilized in conjunction with any suitable user input gesture data, such as with a gesture model 105*m* of user input gesture data 105, to determine a user input gesture of the user efficiently and/or effectively.

FIG. 5 shows a schematic view of a sensor management system 501 of device 100 or 300 that may be provided to manage sensor states of the device (e.g., to determine a user input gesture of a user interacting with the device and, based on the determined sensor state, to manage a mode of operation of the device and/or of any other suitable device in communication with the device). In addition to or as an alternative to using any device sensor data 540*d* that may be generated by any suitable sensor data channel(s) of any suitable sensing assemblies (e.g., assembly 140, assembly 340, etc.) of the device (e.g., as may be automatically transmitted to sensor management system 501 and/or received by sensor management system 501 in response to a device sensor request data 540*r*), sensor management system 501 may use various other types of data accessible to the device in order to determine a current sensor state of the device (e.g., in conjunction with one or more gesture models 105*m* of user input gesture data 105), such as any suitable data provided by any activity application (e.g., application 103) of the device (e.g., data 503*d* that may be provided by an activity application (e.g., automatically and/or in response to request data 503*r*) and that may be indicative of one or more current activities of the user (e.g., current state of a video game being played by the user, current state of word processing application being used by the user, etc.). In response to determining the current sensor state (e.g., at least a recent user input gesture performed by the user), sensor management system 501 may apply at least one sensor-based mode of operation to at least one managed element 590 (e.g., any suitable assembly or component or module or functionality or feature of the device) based on the determined sensor state (e.g., to control the functionality of one or more system assemblies) for improving a user's experience. For example, as shown in FIG. 5, sensor management system 501 may include a sensor module 570 and a management module 580.

Sensor module 570 of sensor management system 501 may be configured to use various types of data accessible to the device in order to determine (e.g., characterize) a sensor state (e.g., a current user input gesture of a user of the device with or without any other characteristic(s)). As shown, sensor module 570 may be configured to receive any suitable device sensor data 540*d* that may be generated and shared by any suitable device sensor assembly (e.g., sensor assembly 140 or sensor assembly 340 or the like) when the device is interacted with by a user (e.g., automatically or in response to any suitable request type of device sensor request data 540*r* that may be provided to any sensor assembly), any suitable activity application status data 503*d* that may be generated and shared by any suitable activity application (e.g., any suitable application 103) that may be indicative of one or more user activities of the user on the device (e.g., automatically or in response to any suitable request type of activity application request data 503*r* that may be provided to activity application 103), and sensor module 570 may be operative to use such received data in any suitable manner in conjunction with any suitable user input gesture model data and/or any suitable user input gesture cluster data (e.g., any suitable gesture model(s) 105*m* of user input gesture data 105) to determine any suitable sensor state (e.g., with user input gesture data 505*d* that may be any suitable portion or the entirety of user input gesture data 105, which may be accessed automatically and/or in response to any suitable request type of user input gesture request data 505*r* that may be provided to a provider of user input gesture data 105 (e.g., memory assembly 104 of device 100)). Any suitable portions of one or more of data 540*d* and 503*d* may be used as category data inputs for one or more models of data 505*d*.

Once sensor module 570 has determined a current sensor state for a user of the device (e.g., based on any suitable combination of one or more of any suitable received data 540*d*, 503*d*, and 505*d*), sensor module 570 may be configured to generate and transmit sensor state data 522 to management module 580, where sensor state data 522 may be indicative of at least one determined sensor state for the user of the device (e.g., one or more of a current location of a user input gesture on trackpad region 336, a current force of a user input gesture on trackpad region 336, a current speed and/or direction of a user input gesture on trackpad region 336, a user input digit type (e.g., thumb or index finger or pinky finger, etc.) of a user input gesture on trackpad region 336, etc.). In response to determining a sensor state or one or more gestures of a user of the device by receiving sensor state data 522, management module 580 may be configured to apply at least one sensor-based mode of operation to at least one managed element 590 of the device based on the determined sensor state. For example, as shown in FIG. 5, sensor management system 501 may include management module 580, which may be configured to receive sensor state data 522 from sensor module 570, as well as to generate and share sensor mode data 524 with at least one managed element 590 of the device at least partially based on the received sensor state data 522, where such sensor mode data 524 may be received by managed element 590 for controlling at least one characteristic of managed element 590. Managed element 590 may be any suitable assembly of the device (e.g., any processor 102, any application 103, any memory 104 and/or any data stored thereon, any communications component 106, any power supply 108, any input component 110, any output component 112 (e.g., one or more haptic actuators, display, etc.), and/or the like), and sensor mode data 524 may control managed element 590 in any suitable way, such as by enhancing, enabling, disabling, restricting, and/or limiting one or more certain functionalities associated with such a managed element (e.g., controlling any functionality of any application, turning on or off any illumination source of the device, driving control signal(s) for moving haptic actuator(s), dragging any cursor, etc.).

Sensor mode data 524 may be any suitable device control data for controlling any suitable functionality of any suitable assembly of the device as a managed element 590 (e.g., any suitable device output control data for controlling any suitable functionality of any suitable output component of the device (e.g., for adjusting a user interface presentation to user U (e.g., to move a cursor or select a highlighted option or enter a glyph, etc.)), and/or any suitable device sensor control data (e.g., a control type of device sensor request data 540*r*) for controlling any suitable functionality of any suitable sensor assembly of the device (e.g., for turning on or off a particular type of sensor and/or for adjusting the functionality (e.g., the accuracy) of a particular type of sensor (e.g., to gather any additional suitable sensor data)), and/or any suitable activity application control data (e.g., a control type of activity application request data 503*r*) for updating or supplementing any input data available to an activity application that may be used to determine a current activity, and/or the like). Additionally or alternatively, sensor mode data 524 may be any suitable user input gesture update data (e.g., an update type of user input gesture request data 505*r*) for providing any suitable data to user input gesture data 105 as a managed element 590 (e.g., any suitable user input gesture update data for updating a model or cluster of user input gesture data 105 (e.g., a model 105*m*) in any suitable manner).

Figure 8:
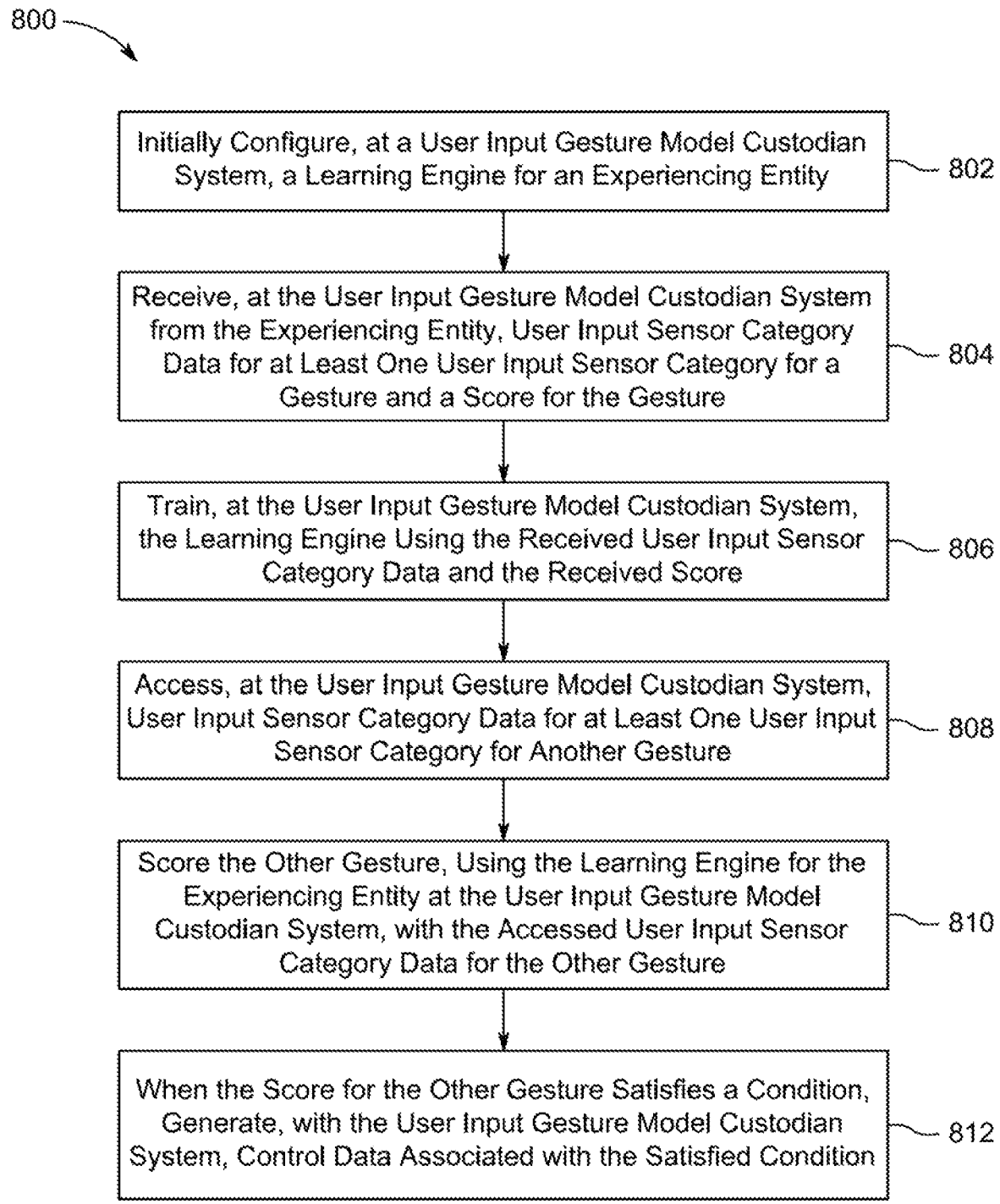

FIG. 8 is a flowchart of an illustrative process 800 for monitoring a user of an electronic device (e.g., an electronic device with a hybrid trackpad region operative to distinguish between finger and thumb interactions by a user). At operation 802 of process 800, a user input gesture model custodian (e.g., a gesture model custodian system) may initially configure a learning engine (e.g., gesture model 105*m*) for an experiencing entity. At operation 804 of process 800, the user input gesture model custodian may receive, from the experiencing entity, user input sensor category data for at least one user input sensor category for a gesture and a score for the gesture. At operation 806 of process 800, the user input gesture model custodian may train the learning engine using the received user input sensor category data and the received score. At operation 808 of process 800, the user input gesture model custodian may access user input sensor category data for the at least one user input sensor category for another gesture. At operation 810 of process 800, the user input gesture model custodian may score the other gesture, using the learning engine, with the accessed user input sensor category data for the other gesture. At operation 812 of process 800, when the score for the other gesture satisfies a condition, the user input gesture model custodian may generate control data associated with the satisfied condition.

It is understood that the operations shown in process 800 of FIG. 8 are only illustrative and that existing operations may be modified or omitted, additional operations may be added, and the order of certain operations may be altered.

Figure 9:
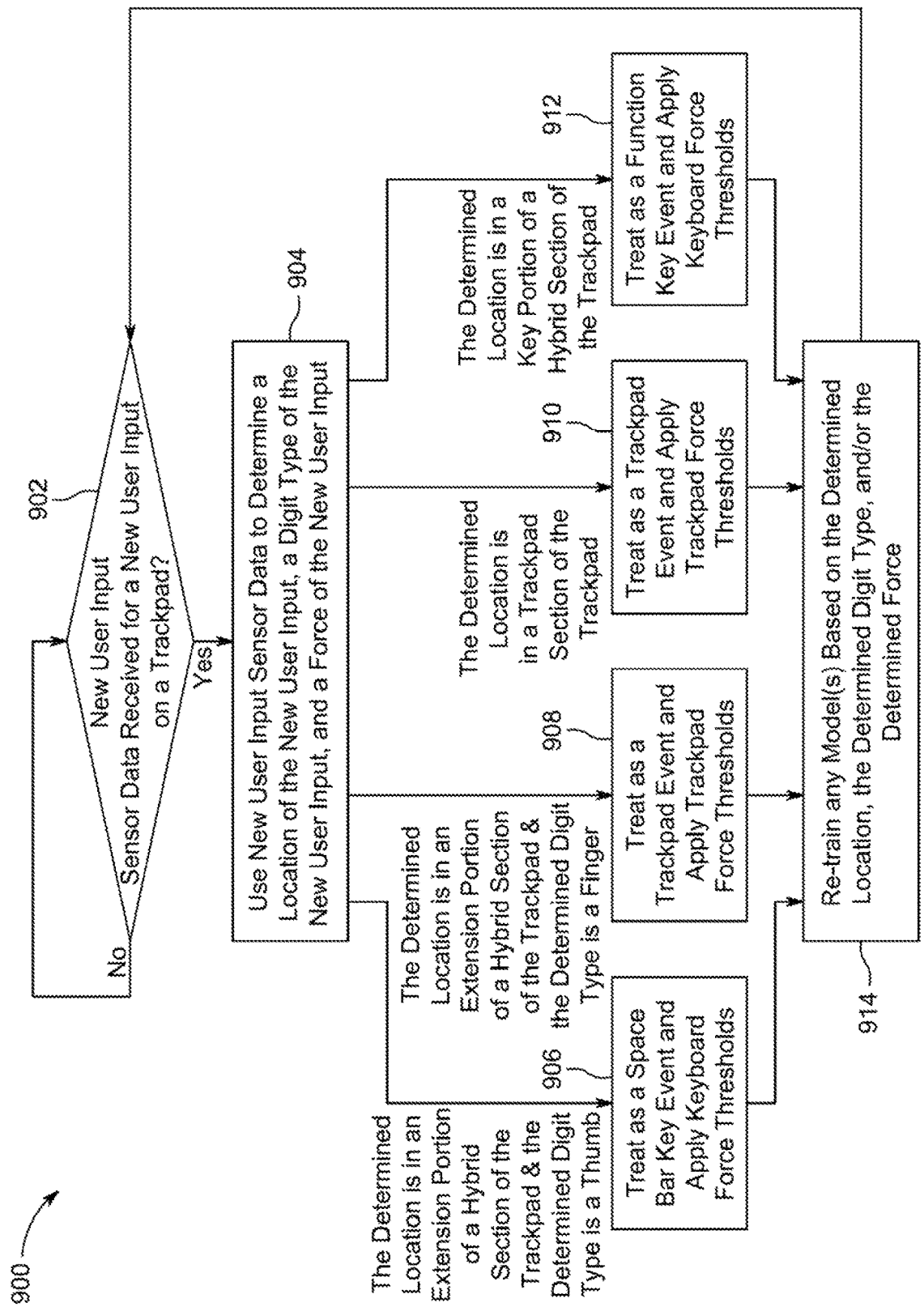

FIG. 9 is a flowchart of an illustrative process 900 for monitoring a user of an electronic device (e.g., an electronic device with a hybrid section of a trackpad region operative to distinguish between finger and thumb interactions by a user). At operation 902 of process 900, it may be determined whether any new user input sensor data has been received for a new user input on a trackpad of the electronic device (e.g., new user input sensor data as may be detected by any one or more suitable sensor assemblies of the electronic device (e.g., sensor assembly 340 of device 300 for a new user input on trackpad component 336*c* of trackpad 336)). If no new user input sensor data is received at operation 902, process 900 may repeat operation 902. If new user input sensor data is received at operation 902, process 900 may proceed to operation 904, at which the new user input sensor data received at operation 902 may be used to determine a location of the new user input, a digit type of the new user input, and a force of the new user input (e.g., any suitable sensor assembly(ies) and/or any suitable application(s) and/or any suitable model(s) may be utilized in combination with the new user input sensor data and any other data that may be available for making such determinations).

If the location of the new user input is determined at operation 904 to be in an extension portion of a hybrid section of the trackpad and the digit type of the new user input is determined at operation 904 to be a thumb, then process 900 may advance to operation 906, at which the new user input may be treated as a space bar key user input event and any suitable keyboard force threshold(s) may be applied for handling the space bar key user input event. For example, if the location of the new user input is determined to be within extension portion 339*e* of hybrid section 339 of trackpad component 336*c* of trackpad 336 and if the digit type of the new user input is determined to be a thumb, then the new user input may be treated as a space bar key user input event and any suitable force threshold(s) (e.g., force threshold(s) with respect to key engagement and/or force threshold(s) with respect to key release) may be utilized to evaluate the determined force of the new user input for properly handling the new user input (e.g., if the determined force of the new user input satisfies each engagement and/or release threshold for a space bar key press event, then the new user input may be determined to be a space bar key press event and that space bar key press event may be utilized accordingly (e.g., to add a space to a currently running word processing application and/or to generate an appropriate haptic actuator response for the space bar key press event), or if the determined force of the new user input does not satisfy one or some or each engagement and/or release threshold for any space bar key event, then the new user input may be determined not to be an event and may be handled accordingly (e.g., by not adjusting any functionality of the device)).

Alternatively, if the location of the new user input is determined at operation 904 to be in an extension portion of a hybrid section of the trackpad and the digit type of the new user input is determined at operation 904 to be a finger or a combination of two or more digits (e.g., for a multi-touch event), then process 900 may advance to operation 908, at which the new user input may be treated as a trackpad event user input event and any suitable trackpad force threshold(s) may be applied for handling the trackpad user input event. For example, if the location of the new user input is determined to be within extension portion 339*e* of hybrid section 339 of trackpad component 336*c* of trackpad 336 and if the digit type of the new user input is determined to be a finger or a combination of two or more digits (e.g., for a multi-touch event), then the new user input may be treated as a trackpad user input event and any suitable force threshold(s) (e.g., force threshold(s) with respect to trackpad engagement and/or force threshold(s) with respect to trackpad release) may be utilized to evaluate the determined force of the new user input for properly handling the new user input (e.g., if the determined force of the new user input satisfies each engagement and/or release threshold for a trackpad click event, then the new user input may be determined to be a trackpad click event and that trackpad click event may be utilized accordingly (e.g., to make a selection at a current location of a cursor in a currently running interface application and/or to generate an appropriate haptic actuator response for the trackpad click event), or if the determined force of the new user input satisfies each engagement and/or release threshold for a trackpad drag event, then the new user input may be determined to be a trackpad drag event and that trackpad drag event may be utilized accordingly (e.g., to drag the location of a cursor in a currently running interface application and/or to generate an appropriate haptic actuator response for the trackpad drag event), or if the determined force of the new user input does not satisfy, one or some or each engagement and/or release threshold for any trackpad event, then the new user input may be determined not to be an event and may be handled accordingly (e.g., by not adjusting any functionality of the device)).

Alternatively, if the location of the new user input is determined at operation 904 to be in a trackpad section (e.g., a dedicated trackpad section) of the trackpad, then process 900 may advance to operation 910, at which the new user input may be treated as a trackpad event user input event and any suitable trackpad force threshold(s) may be applied for handling the trackpad user input event. For example, if the location of the new user input is determined to be within trackpad section 331 of trackpad component 336c of trackpad 336 (e.g., regardless of the digit type of the new user input), then the new user input may be treated as a trackpad user input event and any suitable force threshold(s) (e.g., force threshold(s) with respect to trackpad engagement and/or force threshold(s) with respect to trackpad release) may be utilized to evaluate the determined force of the new user input for properly handling the new user input (e.g., if the determined force of the new user input satisfies each engagement and/or release threshold for a trackpad click event, then the new user input may be determined to be a trackpad click event and that trackpad click event may be utilized accordingly (e.g., to make a selection at a current location of a cursor in a currently running interface application and/or to generate an appropriate haptic actuator response for the trackpad click event), or if the determined force of the new user input satisfies each engagement and/or release threshold for a trackpad drag event, then the new user input may be determined to be a trackpad drag event and that trackpad drag event may be utilized accordingly (e.g., to drag the location of a cursor in a currently running interface application and/or to generate an appropriate haptic actuator response for the trackpad drag event), or if the determined force of the new user input does not satisfy one or some or each engagement and/or release threshold for any trackpad event, then the new user input may be determined not to be an event and may be handled accordingly (e.g., by not adjusting any functionality of the device)).

Alternatively, if the location of the new user input is determined at operation 904 to be in a key portion of a hybrid section of the trackpad, then process 900 may advance to operation 912, at which the new user input may be treated as a function key user input event and any suitable keyboard force threshold(s) may be applied for handling the function key user input event. For example, if the location of the new user input is determined to be within virtual key portion 339f1 of hybrid section 339 of trackpad component 336c of trackpad 336 (e.g., regardless of the digit type), then the new user input may be treated as a first function key user input event and any suitable force threshold(s) (e.g., force threshold(s) with respect to key engagement and/or force threshold(s) with respect to key release) may be utilized to evaluate the determined force of the new user input for properly handling the new user input (e.g., if the determined force of the new user input satisfies each engagement and/or release threshold for a first function key press event, then the new user input may be determined to be a first function key press event and that first function key press event may be utilized accordingly (e.g., to enact a first function (e.g., an "fn" function to a currently running word processing application and/or to generate an appropriate haptic actuator response for the function key press event), or if the determined force of the new user input does not satisfy one or some or each engagement and/or release threshold for any function key event, then the new user input may be determined not to be an event and may be handled accordingly (e.g., by not adjusting any functionality of the device)). Different haptic actuator responses may be generated for a space bar key press event at the extension portion than for a trackpad click event at the extension portion (e.g., the waveform(s) used to drive the response for one or more actuators for a space bar key press event at the extension portion may be narrower and/or higher bandwidth than for a trackpad click event at the extension portion).

Following or concurrently with any one of operations 906, 908, 910, or 912, process 900 may proceed to operation 914 at which any appropriate model(s) (e.g., model 105m) may be re-trained using any of the new user input sensor data received at operation 902 and/or using any of the location, digit type, and/or force determined at operation 904, and, then, process 900 may return to operation 902. Any model re-trained at operation 914 may then be used again at a later iteration of operation 904. Therefore, at least some detected user thumb and finger inputs may be used to adaptively re-train a model library to improve detection accuracy over time. For example, over time, a boundary of a cluster (e.g., a cluster for an input digit type and/or for an input force range) may move as actual user inputs are detected and used for re-training or cluster adjusting. For example, if a particular user's thumb presses exert less force than the force exerted by a thumb during the initial training or clustering, then, over time, the particular user's thumb press exertion force may come to be recognized as the expected thumb press exertion force.

It is understood that the operations shown in process 900 of FIG. 9 are only illustrative and that existing operations may be modified or omitted, additional operations may be added, and the order of certain operations may be altered. It is to be understood that, although process 900 may specifically reference a space bar key event with respect to when the determined location is in an extension portion of a hybrid section and when the determined digit is a thumb (e.g., at operation 906), any other suitable type of key event may be associated with such an extension portion and/or more than one type of key event may be associated with such an extension portion when the determined digit is a thumb (e.g., a left side sub-portion of the extension portion may be associated with a first type of key event (e.g., a left tab key event), a central sub-portion of the extension portion may be associated with a second type of key event (e.g., a space bar key event), and a right side sub-portion of the extension portion may be associated with a third type of key event (e.g., a right tab key event)), while the entire extension portion may still be associated with a trackpad event when the determined digit is a finger or two or more digits. Additionally or alternatively, although an extension portion of a hybrid section may be described herein to be used as a virtual keyboard key when a thumb is detected at that extension portion and to be used as a trackpad when a finger is detected at that extension portion, it is to be understood that in certain embodiments the extension portion may be used as a trackpad when a thumb is detected at that extension portion (e.g., when a trackpad drag event using a thumb is initiated within trackpad section 331 and then continues up into extension portion 339e of hybrid section 339). Therefore, if a drag or swipe or other such event is determined to be initiated within trackpad section 331 but is then detected to continue into extension portion 339e of hybrid section 339 using a thumb, then that thumb detection may not prevent the trackpad drag or swipe event from being determined to occur within extension portion 339e. For example, if a first iteration of operations 902 and 904 determine a particular digit to be in a trackpad section of the trackpad such that process 900 flows to operation 910, then, as long as no lift event by that particular digit is detected (e.g., as long as the particular digit is not detected to have been removed from the trackpad for at least a threshold period of time (e.g., as may be detected at operation 902)), a subsequent iteration of operations 902 and 904 determining the particular digit to be in an extension portion of a hybrid section of the trackpad may flow to operation 908 rather than operation 906 even if the particular digit is a thumb, such that a thumb's trackpad drag or swipe event spanning across the trackpad section and extension portion of the hybrid section may be handled as such.

In some embodiments, at operation 904, in addition to using the new user input sensor data received at operation 902 to determine that a location of the new user input is in an extension portion of a hybrid section of the trackpad, operation 904 may also determine whether or not another user input is detected on a keyboard region of the device. For example, in addition to detecting whether any new user input is in an extension portion of a hybrid section of the trackpad, any concurrent other user input detected in a keyboard region may be used to further determine whether process 900 proceeds from operation 904 to operation 906 or operation 908. For example, as shown in FIG. 1A, when a user's right thumb URT may be interacting with an extension portion of a hybrid section of a trackpad, one or more fingers (e.g., finger URI) may be positioned on top of (e.g., hovering over but not touching or touching) one or more keys of a keyboard region when the hand is in a common operating position. Alternatively, as shown in FIG. 1B, when a user's right index finger URI may be interacting with an extension portion of a hybrid section of a trackpad, one or more other fingers of that hand may not be positioned on top of (e.g., hovering over but not touching or touching) one or more keys of a keyboard region when the hand is in a common operating position. Such common interactions may be used by process 900 to aid in the determination of whether a new user input determined to be in an extension portion of a hybrid section of a trackpad is a finger or a thumb and, thus, whether to advance from operation 904 to operation 906 or from operation 904 to operation 908. For example, any suitable force and/or location sensor(s) that may be provided by the electronic device (e.g., any suitable key cap sensor(s)) may be used for detecting the position (or lack thereof) of one or more fingers over one or more keys of a keyboard regions (e.g., at operation 904) and may be used to help determine whether a digit detected within an extension portion of a hybrid section of a trackpad is a thumb or a finger (e.g., using any suitable clustering and/or models and/or the like). For example, if a confidence of a digit detected within an extension portion of a hybrid section of a trackpad is substantially the same for each one of a thumb and finger, than any suitable detection (or lack thereof) of any finger(s) on a keyboard region (e.g., on the side of the keyboard region closest to the position of the detected digit in the extension portion (e.g., detection of right hand fingers if a digit is detected in the right side of the extension portion or detection of left hand fingers if a digit is detected in the left side of the extension portion)) may be used to help make the best determination possible at operation 904. For example, if the location of the new user input is determined at operation 904 to be in an extension portion of a hybrid section of the trackpad and the digit type of the new user input is determined at operation 904 to be a thumb and/or the associated hand (e.g., right hand for right thumb, left hand for left thumb) is detected on the keyboard region (e.g., right side of keyboard for right hand, left side of keyboard for left hand) if such sensing capability is available to the keyboard region, then process 900 may advance from operation 904 to operation 906. For example, if the location of the new user input is determined to be within extension portion 339e of hybrid section 339 of trackpad component 336c of trackpad 336 and if the digit type of the new user input is determined to be a thumb (e.g., left thumb) and/or the left hand digits are detected to be touching the keyboard 334, then the new user input may be treated as a space bar key user input event. As another example, if the location of the new user input is determined at operation 904 to be in an extension portion of a hybrid section of the trackpad and the digit type of the new user input is determined at operation 904 to be a finger or a combination of two or more digits (e.g., for a multi-touch event) and the associated hand (e.g., right hand for right thumb, left hand for left thumb) is absent from the keyboard region (e.g., right side of keyboard for right hand, left side of keyboard for left hand) if such sensing capabilities are afforded to the keyboard region, then process 900 may advance to operation 908, at which the new user input may be treated as a trackpad event user input event and any suitable trackpad force threshold(s) may be applied for handling the trackpad user input event. For example, if the location of the new user input is determined to be within extension portion 339e of hybrid section 339 of trackpad component 336c of trackpad 336 and if the digit type of the new user input is determined to be a finger (e.g., a right hand finger) or a combination of two or more digits (e.g., for a multi-touch event) and either no other digits are sensed to be touching keyboard 334 or no right hand digits are touching the right side of keyboard 334 (e.g., all left hand digits are accounted for and sensed to be touching the keyboard on the left side already), then process 900 may advance from operation 904 to operation 908.

Moreover, the processes described with respect to one or more of FIGS. 1-9, as well as any other aspects of the disclosure, may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and optical data storage devices. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of devices 100-100''' and 300 and/or the like may be provided as a software construct, firmware construct, one or more hardware components, or a combination thereof, and may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any of the devices are only illustrative, and that the number, configuration, functionality, and interconnection of existing modules may be modified or omitted, additional modules may be added, and the interconnection of certain modules may be altered.

As mentioned, an input component 110 of device 100 may include a touch input component that can receive touch input for interacting with other components of device 100 via wired or wireless bus 114. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, trackpad, a touch screen functioning as a trackpad (e.g., a touch screen replacing the trackpad of a laptop), a touch screen or trackpad combined or incorporated with any other input device (e.g., a touch screen or trackpad disposed on a keyboard), or any multi-dimensional object having a touch sensitive surface for receiving touch input. In some embodiments, the terms touch screen and touchpad and trackpad may be used interchangeably.

In some embodiments, a touch input component 110 embodied as a touch screen may include a transparent and/or semitransparent touch sensitive panel partially or wholly positioned over, under, and/or within at least a portion of a display output component 112. In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

An electronic device may drive a display with graphical data to display a graphical user interface ("GUI"). Such a GUI may be configured to receive touch input via a touch input component 110. Embodied as a touch screen (e.g., touch input component 110 with a display output component 112 as an I/O component 111), such a touch screen may display a GUI. Alternatively, a GUI may be displayed on a display (e.g., a display output component 112) separate from a touch input component 110. A GUI may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110f, which may be associated with the graphical elements of a GUI. In other embodiments, the user may perform gestures at one or more locations that are independent of the locations of graphical elements of a GUI. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touchpad or trackpad may generally provide indirect interaction. Gestures may also affect non-displayed GUI elements (e.g., causing user interfaces to appear) or may affect other actions of a device or system (e.g., affect a state or mode of a GUI, application, or operating system). Gestures may or may not be performed on a touch input component 110 in conjunction with a displayed cursor. For instance, in the case in which gestures are performed on a trackpad, a cursor or pointer may be displayed on a display screen or touch screen and the cursor or pointer may be controlled via touch input on the trackpad to interact with graphical objects on a display screen. In other embodiments, in which gestures are performed directly on a touch screen, a user may interact directly with objects on the touch screen, with or without a cursor or pointer being displayed on the touch screen. Feedback may be provided to the user in response to or based on the touch or near touches on a touch input component 110. Feedback may be transmitted optically, mechanically, electrically, olfactory, acoustically, or the like or any combination thereof and in a variable or non-variable manner.

While there have been described systems, methods, and computer-readable media for handling user input gestures on an extended trackpad of an electronic device, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as "up" and "down," "front" and "back," "top" and "bottom" and "side," "above" and "below," "length" and "width" and "thickness" and "diameter" and "cross-section" and "longitudinal," "X-" and "Y-" and "Z-," and "upper" and "lower," and the like, may be used herein only for convenience, and that no fixed or absolute directional or orientational limitations are intended by the use of these terms. For example, the components of a device can have any desired orientation. If reoriented, different directional or orientational terms may need to be used in their description, but that will not alter their fundamental nature as within the scope and spirit of the subject matter described herein in any way.

Therefore, those skilled in the art will appreciate that the invention(s) can be practiced by other than the described embodiments, which are presented for purposes of illustration rather than of limitation.

What is claimed is:

1. A system comprising:
a trackpad component comprising a trackpad interface, wherein the trackpad interface provides:
a first interface section; and
a second interface section, wherein:
the first interface section and a first portion of the second interface section are in a shared plane; and
a second portion of the second interface section is outside the shared plane;
a sensor assembly configured to detect user inputs on the trackpad interface; and
a keyboard assembly, wherein:
an upper boundary of the first portion of the second interface section extends along a first portion of a lower boundary of the keyboard assembly;
an upper boundary of the second portion of the second interface section extends along a second portion of the lower boundary of the keyboard assembly; and
a portion of the upper boundary of the first portion of the second interface section is linear with a portion of the upper boundary of the second portion of the second interface section.

2. The system of claim 1, wherein an upper boundary of the first interface section abuts a lower boundary of the second interface section.

3. The system of claim 1, wherein the keyboard assembly comprises a row of keys, and wherein an upper boundary of the second interface section extends along a lower boundary of the row of keys.

4. The system of claim 3, wherein an upper boundary of the first interface section abuts a lower boundary of the second interface section.

5. The system of claim 1, wherein the keyboard assembly comprises a plurality of rows of keys arranged in a keyboard design but without a bottom row of keys of the keyboard design.

6. The system of claim 5, wherein an upper boundary of the second interface section extends adjacent and parallel to a lower boundary of the plurality of rows of keys.

7. The system of claim 6, wherein the first portion of the second interface section is positioned where at least a first key of the bottom row of keys of the keyboard design would be, and wherein the second portion of the second interface section is positioned where at least a second key of the bottom row of keys of the keyboard design would be.

8. The system of claim 5, wherein:
the first portion of the second interface section is positioned where at least a first key of the bottom row of keys of the keyboard design would be; and
the second portion of the second interface section is positioned where at least a second key of the bottom row of keys of the keyboard design would be.

9. The system of claim 1, wherein:
a third portion of the second interface section is outside the shared plane;
the first portion of the second interface section is positioned between the second portion of the second interface section and the third portion of the second interface section.

10. The system of claim 9, wherein the second portion of the second interface section and the third portion of the second interface section are co-planar.

11. The system of claim 1, further comprising a processor, wherein, when a user input is detected by the sensor assembly on the first portion of the second interface section, the processor is configured to determine whether a finger or a thumb made the detected user input.

12. The system of claim 11, wherein:
when the processor determines that a finger made a user input detected by the sensor assembly on the first portion of the second interface section, the processor is further configured to apply at least one trackpad force threshold to the user input; and
when the processor determines that a thumb made a user input detected by the sensor assembly on the first portion of the second interface section, the processor is further configured to apply at least one keyboard force threshold to the user input.

13. The system of claim 11, wherein:
when the processor determines that a finger made a user input detected by the sensor assembly on the first portion of the second interface section, the processor is further configured to apply at least one trackpad force threshold to the user input for selectively enabling a trackpad functionality of the system; and
when the processor determines that a thumb made a user input detected by the sensor assembly on the first portion of the second interface section, the processor is further configured to apply at least one keyboard force threshold to the user input that is different than the at least one trackpad force threshold for selectively enabling a keyboard functionality of the system that is different than the trackpad functionality of the system.

14. The system of claim 1, further comprising:
a first haptic actuator at least partially positioned underneath the first portion of the second interface section;
a second haptic actuator at least partially positioned underneath the second portion of the second interface section; and
a processor configured to concurrently:
drive the first haptic actuator with a first control signal defined by a first waveform; and
drive the second haptic actuator with a second control signal defined by a second waveform, wherein the processor is configured to control a shape of the first waveform independently from a shape of the second waveform.

15. A system comprising:
a trackpad component comprising a trackpad interface, wherein the trackpad interface provides:
a first interface section; and
a second interface section, wherein:
the first interface section and a first portion of the second interface section are in a shared plane; and
a second portion of the second interface section is outside the shared plane;

a sensor assembly configured to detect user inputs on the trackpad interface;
a keyboard assembly; and
a processor, wherein, when a user input is detected by the sensor assembly on the first portion of the second interface section, the processor is configured to:
 determine that a digit of a hand made the detected user input;
 determine whether any digit of the hand is detected on the keyboard assembly when the user input is detected by the sensor assembly on the first portion of the second interface section;
 apply at least one trackpad force threshold to the user input when the processor determines that no digit of the hand is detected on the keyboard assembly; and
 apply at least one keyboard force threshold to the user input that is different than the at least one trackpad force threshold when the processor determines that any digit of the hand is detected on the keyboard assembly.

16. A system comprising:
a trackpad component comprising a trackpad interface, wherein the trackpad interface provides:
 a first interface section; and
 a second interface section, wherein:
  the first interface section and a first portion of the second interface section are in a shared plane; and
  a second portion of the second interface section is outside the shared plane;
a sensor assembly configured to detect user inputs on the trackpad interface; and
a processor, wherein:
 when a user input is detected by the sensor assembly on the first portion of the second interface section, the processor is configured to:
  determine whether a finger or a thumb made the detected user input on the first portion of the second interface section;
  when the processor determines that a thumb made the detected user input on the first portion of the second interface section, apply to the detected user input at least a first keyboard force threshold for selectively carrying out a first keyboard functionality of the system; and
  when the processor determines that a finger made the detected user input on the first portion of the second interface section, apply to the detected user input at least a first trackpad force threshold that is different than the first keyboard force threshold for selectively carrying out a first trackpad functionality of the system that is different than the first keyboard functionality of the system;
 when a user input is detected by the sensor assembly on the first interface section, the processor is configured to apply to the detected user input at least a second trackpad force threshold for selectively carrying out a second trackpad functionality of the system; and
 when a user input is detected by the sensor assembly on the second portion of the second interface section, the processor is configured to apply to the detected user input at least a second keyboard force threshold for selectively carrying out a second keyboard functionality of the system that is different than the first keyboard functionality of the system.

17. The system of claim 16, wherein the first trackpad force threshold is the same as the second trackpad force threshold.

18. The system of claim 16, wherein:
the system further comprises a keyboard assembly comprising a plurality of rows of keys arranged in a keyboard design but without the bottom row of keys of the keyboard design;
the first portion of the second interface section is positioned where at least a first key of the bottom row of keys of the keyboard design would be; and
the second portion of the second interface section is positioned where at least a second key of the bottom row of keys of the keyboard design would be.

19. The system of claim 16, further comprising a keyboard assembly, wherein:
an upper boundary of the first portion of the second interface section extends along a first portion of a lower boundary of the keyboard assembly; and
an upper boundary of the second portion of the second interface section extends along a second portion of the lower boundary of the keyboard assembly.

20. The system of claim 16, wherein:
the first interface section and the first portion of the second interface section and a third portion of the second interface section are in the shared plane; and
when a user input is detected by the sensor assembly on the third portion of the second interface section, the processor is configured to:
 determine whether a finger or a thumb made the detected user input on the third portion of the second interface section;
 when the processor determines that a thumb made the detected user input on the third portion of the second interface section, apply to the detected user input at least a third keyboard force threshold for selectively carrying out a third keyboard functionality of the system that is different than the first keyboard functionality of the system and that is different than the second keyboard functionality of the system; and
 when the processor determines that a finger made the detected user input on the third portion of the second interface section, apply to the detected user input at least a third trackpad force threshold for selectively carrying out a third trackpad functionality of the system.

21. The system of claim 20, wherein, when a user input is detected by the sensor assembly on the first portion of the second interface section, the processor is configured to:
the first interface section and the first portion of the second interface section and the third portion of the second interface section and a fourth portion of the second interface section are in the shared plane; and
when a user input is detected by the sensor assembly on the fourth portion of the second interface section, the processor is configured to:
 determine whether a finger or a thumb made the detected user input on the fourth portion of the second interface section;
 when the processor determines that a thumb made the detected user input on the fourth portion of the second interface section, apply to the detected user input at least a fourth keyboard force threshold for selectively carrying out a fourth keyboard functionality of the system that is different than the first keyboard functionality of the system and that is different than the second keyboard functionality of the system and that is different than the fourth keyboard functionality; and when the processor determines that a finger made the detected user input on the fourth portion of the second interface section, apply to the detected user input at least a fourth trackpad force threshold for selectively carrying out a fourth trackpad functionality of the system.

\* \* \* \* \*